(12) United States Patent
Instanes et al.

(10) Patent No.: US 10,704,901 B2
(45) Date of Patent: Jul. 7, 2020

(54) MEASURING WALL THICKNESS LOSS FOR A STRUCTURE

(71) Applicants: University Of Cincinnati, Cincinnati, OH (US); Cincinnati NDE, Ltd., Cincinnati, OH (US)

(72) Inventors: Geir Instanes, Nesttun-Bergen (NO); Peter B. Nagy, Cincinnati, OH (US); Francesco Simonetti, Cincinnati, OH (US); Carson L. Willey, Celina, OH (US)

(73) Assignees: University of Cincinnati, Cincinnati, OH (US); Cincinnati NDE, Ltd., Cincinnati, OH (US)

( * ) Notice: Subject to any disclaimer, the term of this patent is extended or adjusted under 35 U.S.C. 154(b) by 397 days.

(21) Appl. No.: 15/632,725

(22) Filed: Jun. 26, 2017

(65) Prior Publication Data
US 2017/0292835 A1 Oct. 12, 2017

Related U.S. Application Data

(62) Division of application No. 14/168,374, filed on Jan. 30, 2014, now Pat. No. 9,689,671.
(Continued)

(51) Int. Cl.
*G01B 17/02* (2006.01)
(52) U.S. Cl.
CPC .................... *G01B 17/02* (2013.01)
(58) Field of Classification Search
CPC ....................................................... G01B 17/02
See application file for complete search history.

(56) References Cited

U.S. PATENT DOCUMENTS

| 4,100,809 A | | 7/1978 | Bobrov et al. |
| 5,581,037 A | * | 12/1996 | Kwun .................... G01N 29/14 73/623 |

(Continued)

FOREIGN PATENT DOCUMENTS

| EP | 1959229 A1 | 8/2008 |
| WO | 2012047107 A1 | 4/2012 |

OTHER PUBLICATIONS

D. P. Jansen and D. A. Hutchins, "Lamb wave tomography," in IEEE 1990 Ultrasonics Symp., Honolulu, HI, pp. 1017-1020.
(Continued)

*Primary Examiner* — Xin Y Zhong
(74) *Attorney, Agent, or Firm* — Wood Herron & Evans LLP

(57) ABSTRACT

Systems, methods and computer storage mediums accurately measure wall thickness in a region of interest included in complex curved structures. Embodiments of the present disclosure relate to generating a wall thickness loss distribution map of a region of interest that provides an accurate representation of wall thickness for the region of interest included in a complex curved structure. The wall thickness loss distribution map is generated from a two-dimensional model of the wall thickness loss distribution of the region of interest. The two-dimensional model is converted from a three-dimensional representation of the wall thickness loss distribution of the region of interest. The three-dimensional representation of the wall thickness is generated by ultrasonic waves generated by a transducer system that propagated through the region of interest.

34 Claims, 26 Drawing Sheets

Related U.S. Application Data

(60) Provisional application No. 61/758,433, filed on Jan. 30, 2013.

(56) References Cited

U.S. PATENT DOCUMENTS

| | | |
|---|---|---|
| 7,474,092 B1 | 1/2009 | Kwun et al. |
| 2009/0235748 A1 | 9/2009 | Geir et al. |
| 2011/0191035 A1 | 8/2011 | Volker et al. |
| 2013/0263667 A1* | 10/2013 | Volker .................. G01B 17/02 73/598 |

OTHER PUBLICATIONS

K. R. Leonard, E.V. Malyarenko, and M. K. Hinders, "Ultrasonic Lamb wave tomography," Inverse Probl., vol. 18, pp. 1795-1808, 2002.

E. V. Malyarenko and M. K. Hinders, "Fan beam and double crosshole Lamb wave tomography for mapping flaws in aging aircraft structures," J. Acoust. Soc. Am., vol. 108, pp. 1631-1639, 2000.

K. R. Leonard and M. K. Hinders, "Guided wave helical ultrasonic tomography of pipes," J. Acoust. Soc. Am., vol. 114, pp. 767-774, 2003.

P. Belanger, P. Cawley, and F. Simonetti, "Guided wave diffraction tomography within the Born approximation," IEEE Trans. Ultrason. Ferroelectr. Freq. Control, vol. 57, pp. 1405-1418, 2010.

R. G. Pratt, "Seismic waveform inversion in the frequency domain, Part 1: theory and verification in a physical scale model," Geophysics, vol. 64, pp. 888-901, 1999.

G. Instanes, A. Pedersen, M. Toppe, and P. B. Nagy, "Constant group velocity ultrasonic guided wave inspection for corrosion and erosion monitoring in pipes," Review of Progress in Quantitative Nondestructive Evaluation, 2009, vol. 28, pp. 1386-1393.

A. Hormati, I. Jovanovic, O. Roy, and M. Vetterli, "Robust ultrasound travel-time tomography using the bent ray model," in SPIE vol. 7629, 76290I, 2010.

P. Huthwaite and F. Simonetti, "Damage detection through sound speed reconstruction," Review of Progress in Quantitative Nondestructive Evaluation, 2012, vol. 1430, pp. 777-784.

F. Simonetti and L. Huang, "From beamforming to diffraction tomography," J. Appl. Phys., vol. 103, pp. 103-110, 2008.

P. Huthwaite and F. Simonetti, "High-resolution imaging without iteration: A fast and robust method for breast ultrasound tomography," J. Acoust. Soc. Am., vol. 130, pp. 1721-1734, 2011.

Volker A. et al: "The application of guided wave travel time tomography to bends," AIP Conference Proceedings, American Institute of Physics, New York, vol. 1211, Feb. 22, 2010, pp. 774-781, XP002625035.

Moilanen Petro et al: "Ultrasonically determined thickness of long cortical bones: Two-dimensional simulations of in vitro experiments", The Journal of the Acoustical Society of America, American Institute of Physics for the Acoustical Society of America, vol. 122, No. 3, Sep. 1, 2007, pp. 1818-1826, XP012102463.

International Search Report and Written Opinion from the International Searching Authority in corresponding International Patent Application No. PCT/US2014/013843 dated Apr. 17, 2014, 10 pages.

\* cited by examiner

MEASURING WALL THICKNESS LOSS FOR A STRUCTURE

CROSS-REFERENCE TO RELATED APPLICATIONS

This application is a divisional of U.S. Nonprovisional application Ser. No. 14/168,374 filed on Jan. 30, 2014 which claims the benefit of U.S. Provisional Application No. 61/758,433 filed on Jan. 30, 2013, both of which are incorporated herein by reference in their entirety.

BACKGROUND

Accurate thickness mapping of large structures is critical to assess the residual life of structures subject to erosion or corrosion damage. Conventional gauging devices require a handheld sensor to scan across a region of interest of a structure. Conventional gauging devices are limited to assess regions of interest that are easily accessible to be scanned. Conventional gauging devices are not suitable for regions of interest that are difficult to access for scanning or require continuous monitoring.

Another conventional thickness mapping approach includes guided wave tomography (GWT). Conventional GWT transmits waves through the region of interest. The signals resulting from the propagated waves are processed to generate a representation of the wall thickness loss distribution for the region of interest. Conventional GWT implements a conventional straight ray model to generate the representation based on the assumption that the waves travel on straight paths. The conventional straight ray model fails to accurately describe ultrasonic waves that propagate through structures with non-uniform thickness, such as corroded pipes, thus resulting in poor estimations of wall thickness loss for the structures.

BRIEF SUMMARY

Embodiments of the present disclosure relate to generating a wall thickness loss distribution map that accurately depicts the wall thickness for structures with non-uniform thickness. In an example embodiment, wall thickness of a region of interest included in a structure is measured. The structure may include a complex curved structure, such a pipe. The region of interest may include a portion of the pipe that includes non-uniform wall thickness loss distribution. A control system sends initial electronic signals to a transducer system that is located on the structure of interest. The transducer system converts the initial electronic signals into an ultrasonic wave and propagates the ultrasonic wave through the region of interest. The transducer system converts the propagated ultrasonic waves into propagated electronic signals. The propagated electronic signals encode a three-dimensional representation of the wall thickness loss distribution for the region of interest.

The transducer system provides the propagated electronic signals to the control system. The control system digitizes the propagated electronic signals and provides the digitized propagated electronic signals to a pre-processing system. A pre-processing system converts the three-dimensional representation encoded by the digitized propagated electrical signals to a two-dimensional model for analysis of the wall thickness loss. An inversion system generates a wall thickness loss distribution map from the two-dimensional model. The wall thickness loss distribution map provides an accurate representation of the wall thickness loss for the complex thickness distributions included in the region of interest. An operator terminal provides an interface for an operator to analyze the wall thickness loss distribution map.

In an embodiment, a system measures wall thickness in a region of interest included in a structure. A transducer system is configured to transmit ultrasonic waves through the region of interest and convert the ultrasonic waves to propagated electrical signals that encode a three-dimensional representation of the wall thickness loss distribution of the region of interest. A pre-processing system is configured to convert the three-dimensional representation encoded by the digitized propagated electrical signals to a two-dimensional model for analysis of the wall thickness loss. An inversion system is configured to generate a wall thickness loss distribution map from the two-dimensional model. The wall thickness loss distribution model map provides wall thickness loss for the region of interest.

In an embodiment, a method measures wall thickness in a region of interest included in a structure. Ultrasonic waves may be transmitted through the region of interest and converted to propagated electrical signals that encode a three-dimensional representation of the wall thickness loss distribution of the region of interest. The three-dimensional representation encoded by the digitized propagated electrical signals may be converted by a pre-processing system to a two-dimensional model for analysis of the wall thickness loss. A wall thickness loss distribution map may be generated from the two-dimensional model. The wall thickness loss distribution map provides wall thickness loss for the region of interest.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements.

DETAILED DESCRIPTION

In the Detailed Description herein, references to "one embodiment", "an embodiment", an "example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

Overview

Figure 1:
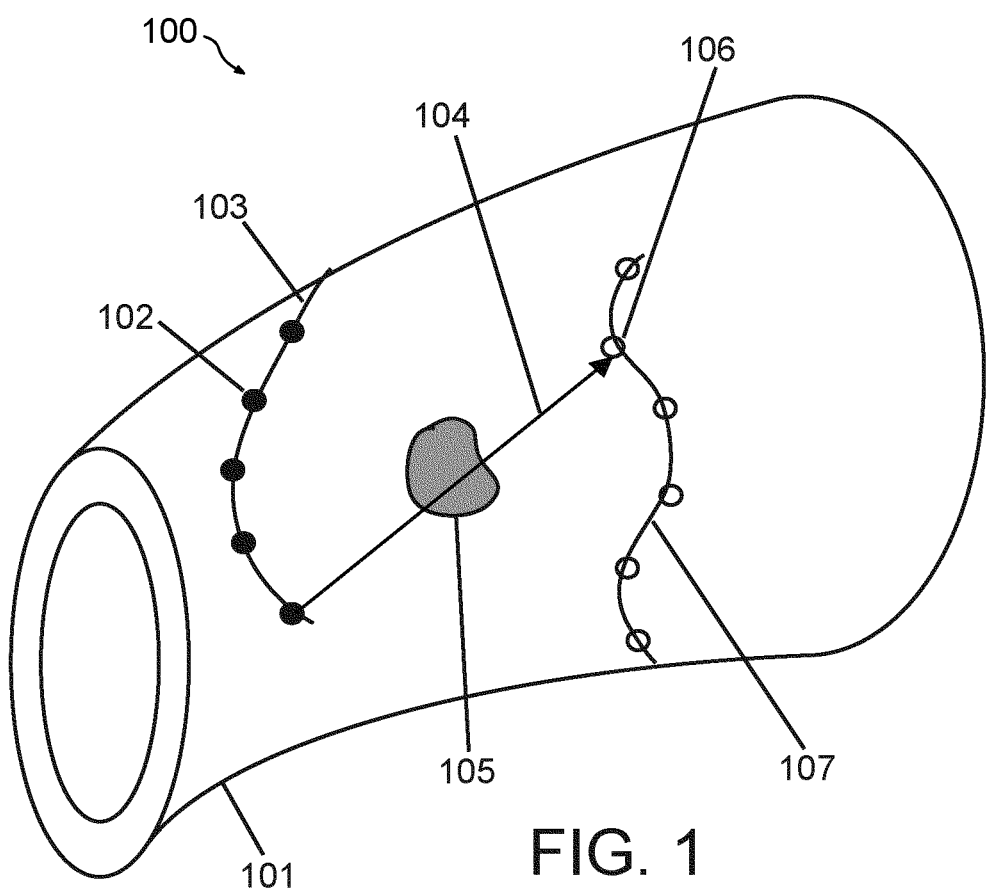
FIG. 1 illustrates a thickness mapping configuration, according to an embodiment.

FIG. 1 depicts a thickness mapping configuration 100. Thickness mapping configuration includes a complex structure 101, a plurality of transmit ultrasonic transducers 102, a transmit aperture 103, a plurality of guided ultrasonic waves 104, a region of interest 105, a plurality of receive ultrasonic transducers 106, and a receive aperture 107.

Complex structure 101 may depict a three-dimensional structure that is hollow so that an open space exists between the walls of complex structure 101. For example, complex structure may include a pipe. The pipe is a three-dimensional cylindrical structure that is hollow with an open space between the walls of the pipe. As will be discussed in detail below, complex structure 101 may include any type of hollow three-dimensional structure where an ultrasonic wave may be adequately guided from plurality of transmit ultrasonic transducers 102 to plurality of receive ultrasonic transducers 106 that will be apparent to those skilled in the relevant art(s) without departing from the spirit and scope of the present disclosure. However, for ease of discussion, complex structure 101 will be referenced to as pipe 101.

Pipe 101 may be designed to guide the flow of gas and/or liquids through pipe 101 where the gas and/or liquids enter a first end of pipe 101 and are guided through pipe 101 to a second end of pipe 101 where the gas and/or liquids depart pipe 101. The gas and/or liquids guided by pipe 101 may have a structural impact on the walls of pipe 101 where corrosion and/or erosion damage of pipe 101 may occur. Corrosion is the gradual destruction of the walls of pipe 101 due to a chemical reaction that results from the gas and/or liquid that is guided by pipe 101 and/or from environmental conditions that pipe 101 may be exposed. Erosion is the decrease in wall thickness for pipe 101 due to the flow of the gas, liquids, and/or solid particles guided by pipe 101. For example, pipe 101 may guide oil and be located in an oil refinery. The oil guided by pipe 101 may over time result in corrosion and/or erosion of pipe 101 while the high temperatures of the oil refinery where pipe 101 is located may also have a significant impact on the corrosion and/or erosion of pipe 101. As pipe 101 continuously guides the gas and/or liquids and/or is exposed to severe environmental conditions, eventually the weakened portions of pipe 101 may fail resulting in damage to pipe 101 and/or the environment surrounding pipe 101.

Non-uniformity in the wall thickness of pipe 101 may be an indicator of wall weakness. Each wall of pipe 101 may have a thickness that when initially manufactured is substantially uniform throughout each wall. The uniform thickness of each wall indicates that the thickness of each wall is substantially the same for substantially every portion of each wall. However, exposure of pipe 101 to corrosion/erosion elements over time with usage of pipe 101 may have an impact on the uniformity of wall thickness. Portions of walls that weaken may have their thickness reduced while other portions that are not weakened may maintain substantially the same thickness as when the pipe was initially manufactured. The difference in thickness between different portions of the walls results in non-uniformity in the wall thickness. Examining pipe 101 for non-uniformity in the wall thickness may provide an indicator of which portions of the walls are weakening so that pre-emptive maintenance may be performed on the weakened portions before damage to pipe 101 occurs.

In order to adequately measure the non-uniformity in the wall thickness of pipe 101, substantially every portion of pipe 101 may be continuously monitored. Selectively monitoring portions of pipe 101 while not monitoring other portions may adequately monitor the non-uniformity in the wall thickness for those monitored portions. However, the non-monitored portions of pipe 101 may have significant non-uniformity in wall thickness that is overlooked and eventually results in damage to pipe 101 and/or the environment surrounding pipe 101. Also, monitoring pipe 101 for a period of time and terminating the monitoring may also result in non-uniformity in the wall thickness that develops when pipe 101 is not being monitored which is overlooked and eventually results in damage to pipe 101 and/or the environment surrounding pipe 101.

Thickness mapping configuration 100 may continuously monitor the non-uniformity in wall thickness for the portion of pipe 101 that is located between transmit ultrasonic transducers 102 and receive ultrasonic transducers 106. Transmit ultrasonic transducers 102 and receive ultrasonic transducers 106 may be positioned around the circumference of pipe 101 so that each transducer is substantially equally spaced from each other around the circumference of pipe 101. Transmit ultrasonic transducers 102 and receive ultrasonic transducers 106 may also be positioned on any portion of pipe 101 so that the portion of pipe 101 located between each may be continuously monitored. For example, if the entire pipe 101 is to be monitored, transmit ultrasonic transducers 102 may be positioned on the first end of pipe 101 and receive ultrasonic transducers 106 may be positioned on the second end of pipe 101 so that the entire pipe 101 is monitored for non-uniform wall thickness.

Transmit ultrasonic transducers 102 may include N quantity of transmit ultrasonic transducers where N is an integer greater than or equal to one. Receive ultrasonic transducers 106 may include M quantity of receive ultrasonic transducers where M is an integer greater than or equal to one. In an embodiment, the N quantity of transmit ultrasonic transducers 102 may differ from the M quantity of receive ultrasonic transducers. In another embodiment, N quantity of transmit ultrasonic transducers may be equal to the M quantity of receive ultrasonic transducers.

Each transmit ultrasonic transducer 102 may excite a corresponding guided ultrasonic wave 104. Guided ultrasonic waves 104 may be ultrasonic waves that are guided by the walls of pipe 101 so that guided ultrasonic waves 104 propagate throughout the walls of pipe 101 from transmit ultrasonic transducers 102 to receive ultrasonic transducers 106. The L quantity of guided ultrasonic waves 104 may be an integer greater than or equal to one and corresponds to the quantity of guided ultrasonic waves 104 excited by transmit ultrasonic transducers 102 and receive ultrasonic transducers 106. Although guided ultrasonic waves 104 propagate throughout the walls of pipe 101, for ease of discussion it may be referred that guided ultrasonic waves 104 propagate through pipe 101.

Each guided ultrasonic wave 104 may propagate through region of interest 105 which is located between transmit ultrasonic transducers 102 and receive ultrasonic transducers 106. Region of interest 105 may be a portion of pipe 101 that is under continuous analysis to determine whether non-uniformity in the wall thickness for region of interest 105 exists. FIG. 1 depicts region of interest 105 as a portion of the total area of pipe 101 located between transmit ultrasonic transducers 102 and receive ultrasonic transducers 106 but region of interest 105 may extend to include the total area between transmit ultrasonic transducers 102 and receive ultrasonic transducers 106.

Each guided ultrasonic wave 104 excited by each corresponding transmit ultrasonic transducer 102 may propagate from each corresponding transmit ultrasonic transducer 102 through region of interest 105 and then may be received by each corresponding receive ultrasonic transducer 106. Each guided ultrasonic wave 104 may propagate through pipe 101 at a constant phase velocity when each portion of pipe 101 is at a substantially uniform wall thickness so that each guided ultrasonic wave 104 is not delayed as it propagates through pipe 101 from transmit ultrasonic transducers 102 to receive ultrasonic transducers 106. However, a portion of pipe that has non-uniform wall thickness, such as region of interest 105, may delay the propagation of each guided ultrasonic wave 104 as they propagate through region of interest 105. As a result, there is a delay in each ultrasonic wave 104 in reaching receive ultrasonic transducers 106 from transmit ultrasonic transducers 102 due to the non-uniform wall thickness of region of interest 105.

For example, region of interest 105 includes a portion of pipe 101 where non-uniform wall thickness exists. Each guided ultrasonic wave 104 that is excited by each transmit ultrasonic transducers 102 may begin propagating through the portions of pipe 101 with uniform wall thickness at a constant phase velocity. However, each guided ultrasonic wave 104 may slow down as each propagates through region of interest 105 due to the non-uniform wall thickness of region of interest 105. Each guided ultrasonic wave 104 may then speed up after exiting region of interest 105 due to the uniform wall thickness of the portions of pipe 101 positioned between region of interest 105 and receive ultrasonic transducers 106.

Each transmit ultrasonic transducer 102 may excite each guided ultrasonic wave 104 at a fixed frequency each time each guided ultrasonic wave 104 is generated. Each guided ultrasonic wave 104 may then propagate through pipe 101 at the fixed frequency from each transmit ultrasonic transducer 102 to each corresponding receive ultrasonic transducer 106. As noted above, each guided ultrasonic wave 104 may be delayed in reaching each corresponding receive ultrasonic transducer 106 when propagating through region of interest 105 due to the non-uniform wall thickness of region of interest 105. The delay in a unit of time may be measured at each corresponding receive ultrasonic transducer 106 for each guided ultrasonic wave 104.

As noted above, the phase velocity of each guided ultrasonic wave 104 may slow down when each guided ultrasonic wave 104 propagates through region of interest 105 and then speed back up to their initial constant phase velocity before entering region of interest 105. With the time delay measured for each guided ultrasonic wave 104 at receive ultrasonic transducers 106, point by point phase velocities may be determined for each guided ultrasonic wave 104 for each point along the travel path of guided ultrasonic wave 104 through pipe 101. As a result, the decrease in phase velocity for each guided ultrasonic wave 104 during propagation through region of interest 105 may be determined relative to the increase in phase velocity for each when propagating through other portions of pipe 101 with uniform wall thickness.

With the propagation frequency for each guided ultrasonic wave 104 fixed and the point by point phase velocity for each guided ultrasonic wave 104 determined, the thickness of the walls of pipe 101 may be determined. The thickness data may then be digitized into pixels and displayed to an operator with a resolution via an operator terminal so that the operator may visually identify the portions of pipe 101 that have non-uniform wall thickness. As a result, the operator may easily identify that region of interest 105 has non-uniform wall thickness based on the discoloration of the pixels associated with region of interest 105 as compared to other portions of pipe 101 that have uniform wall thickness. The operator may evaluate from the map the maximum wall thickness loss that has occurred given as a percentage of the intact wall thickness or as an absolute value. The operator may then take pre-emptive measures to treat region of interest 105 to prevent region of interest 105 from failing and causing damage to pipe 101 and/or the surrounding environment of pipe 101.

Figure 2:
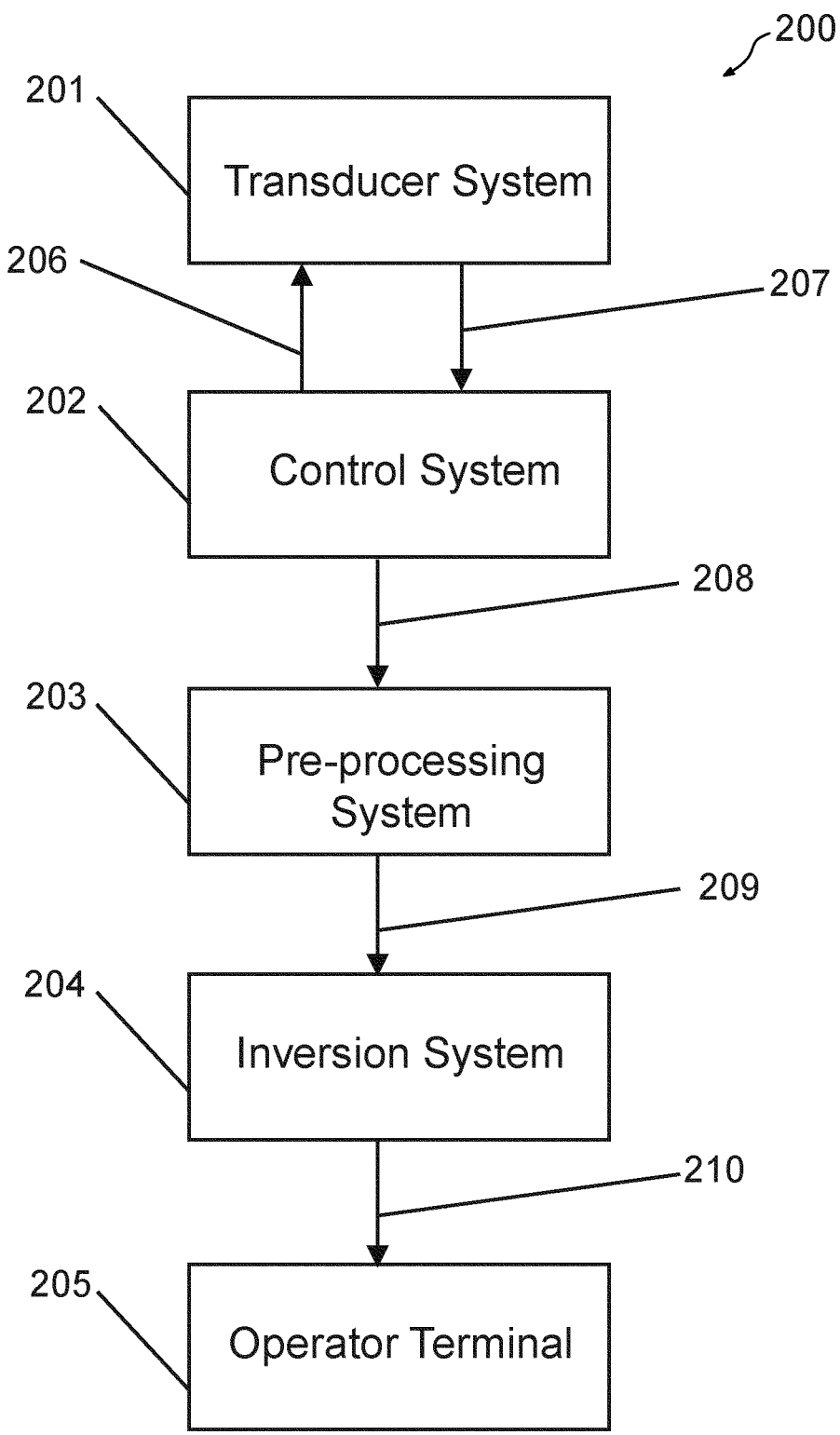
FIG. 2 illustrates a detailed view of a thickness mapping system for accurate thickness mapping of large engineering structures, according to an embodiment.

FIG. 2 depicts a detailed view of a thickness mapping system 200 for accurate thickness mapping of large engineering structures. Thickness mapping system 200 includes a transducer system 201, a control system 202, a pre-processing system 203, an inversion system 204, and an operator terminal 205. Signal and data transfer systems may be used to transport information interchangeably between transducer system 201, control system 202, pre-processing system 203, inversion system 204, and operator terminal 205.

Transducer system 201 is depicted in FIG. 1. Transducer system 201 includes transmit ultrasonic transducers 102 and receive ultrasonic transducers 106. As noted above, transmit ultrasonic transducers 102 excite guided ultrasonic waves 104 that propagate through pipe 101 and are received by receive ultrasonic transducers 106. Any delay measured at receive ultrasonic transducers 106 for guided ultrasonic waves 104 may then be used to determine non-uniform wall thickness in pipe 101.

Transmit ultrasonic transducers 102 excite guided ultrasonic waves 104 by generating magnetic flux and induces current into pipe 101 that results in forces being generated within pipe 101. The forces then excite guided ultrasonic waves 104 that then propagate through pipe 101. Transmit ultrasonic transducers 102 and receive ultrasonic transducers 106 may be electromagnetic acoustic transducers (EMATs) and/or any other type of transducer that excites guided ultrasonic waves 104 by generating forces that will be apparent to those skilled in the relevant art(s) without departing from the spirit and scope of the present disclosure.

Figure 3:
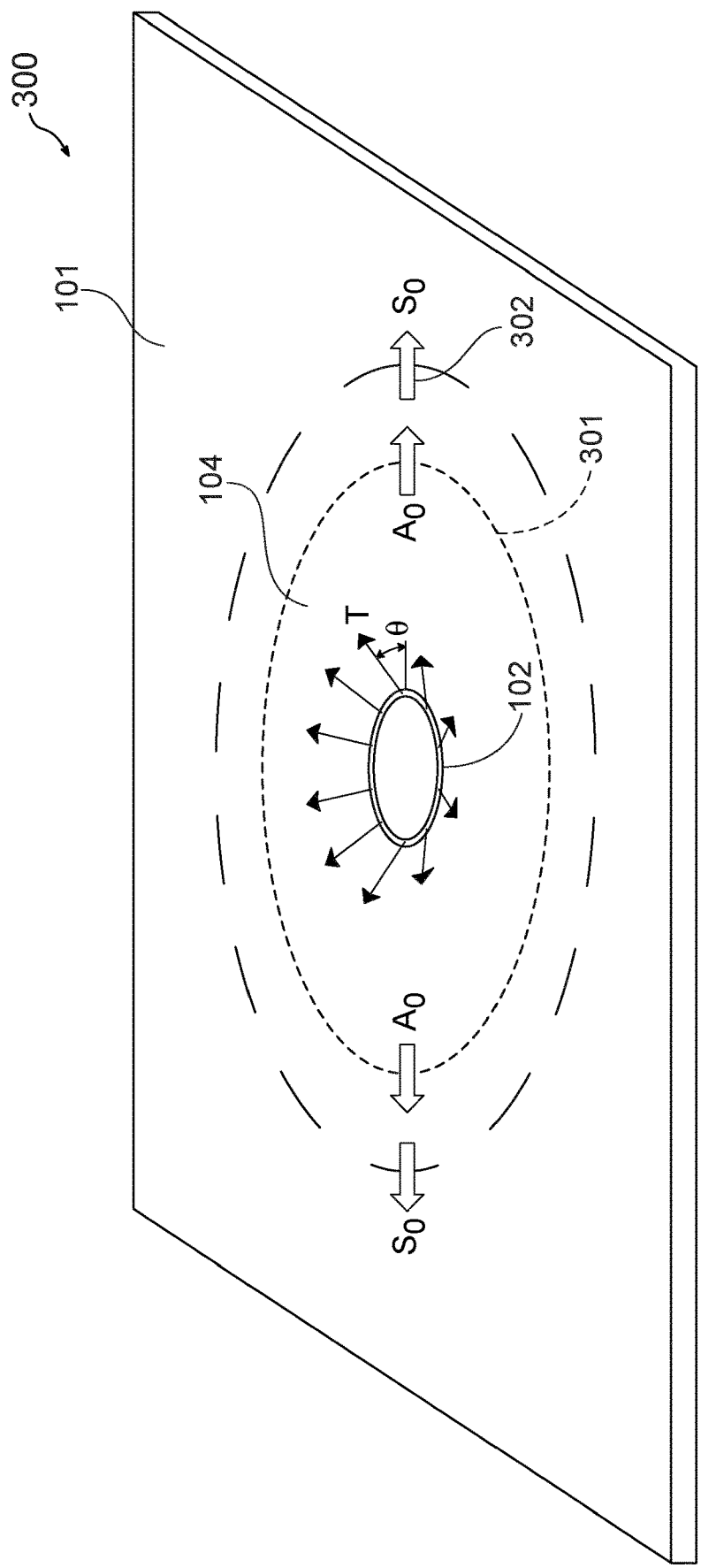
FIG. 3 depicts an example wall of a pipe that depicts the generation of a guided ultrasonic wave by a transmit ultrasonic transducer, according to an embodiment.

Transmit ultrasonic transducers 102 generate guided ultrasonic waves 104 that spread out within the walls of pipe 101 similar to the visible water waves generated in a pond when a pebble engages the water. FIG. 3 depicts an example wall 300 of pipe 101 that depicts the generation of guided ultrasonic wave 104 by transmit ultrasonic transducer 102. Transmit ultrasonic transducer 102 generates magnetic flux and induces current into wall 300 that results in electromagnetic forces within wall 300 that generate guided ultrasonic wave 104. With conventional transducer technology, guided ultrasonic wave 104 may include multiple modes. In this example, the ultrasonic wave field 104 consists of two Lamb waves that are the cylindrically diverging modes $A_0$ 301 and $S_0$ 302.

Although FIG. 3 depicts an ultrasonic wave field 104 consisting of two Lamb modes. However, many more Lamb modes can propagate as the frequency of the signal increases. The modes are grouped into two families depending on their characteristic displacement distribution through the thickness. The antisymmetric family contains guided modes $A_0$, $A_1$, $A_2$, and so on while the symmetric family contains modes $S_0$, $S_1$, $S_2$, and so on. If more than one mode propagate at the same time, the estimation of time delays becomes difficult.

In order for any delay in propagation for guided ultrasonic waves 104 to be adequately measured at receive ultrasonic transducers 106, a single mode is to be excited so that the single mode propagates through pipe 101 to receive ultrasonic transducers 106. Exciting guided ultrasonic waves 104 so that multiple modes are excited and propagate through pipe 101 to receive ultrasonic transducers 106 significantly increases the difficulty in measuring any time delay in guided ultrasonic waves 104 at receive ultrasonic transducers 106. Without being able to measure any timed delay, the point by point phase velocities for guided ultrasonic waves 104 cannot be determined resulting in the wall thickness for pipe 101 also not being determined. As a result, a single mode associated with guided ultrasonic waves 104 is to be excited so that the wall thickness for pipe 101 can eventually be determined.

A preferred mode for guided ultrasonic wave 104 may be excited by transmit ultrasonic transducer 102 by guiding the magnetic flux generated by transmit ultrasonic transducer 102 so that the magnetic flux is bent at an angle relative to pipe 101 so that a preferred mode for guided ultrasonic wave 104 may be excited while any other unwanted modes are not excited. The exclusive excitation of the preferred mode while not exciting any other unwanted modes enables the preferred mode of guided ultrasonic wave 104 to propagate through pipe 101 and reach receive ultrasonic transducers 106 while minimizing the propagation of any other unwanted mode so any delay in guided ultrasonic wave 104 may be adequately measured.

Figure 4:
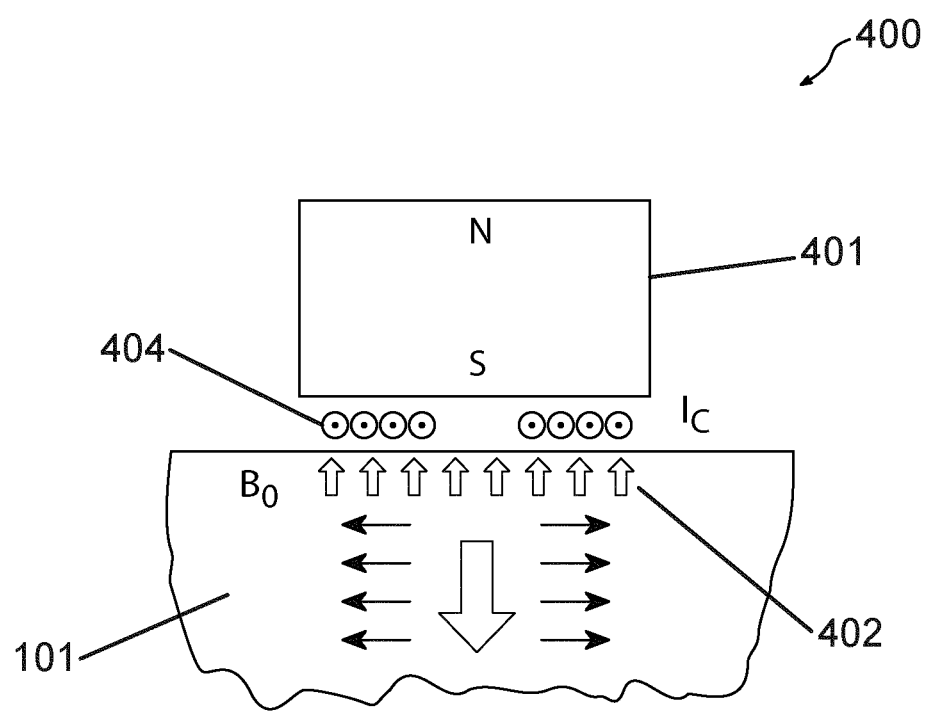
FIG. 4 depicts a conventional transmit transducer configuration.

FIG. 4 depicts a conventional transmit transducer configuration 400. Conventional transmit transducer configuration 400 includes a conventional cylindrical magnet 401. Conventional cylindrical magnet 401 generates substantially normal magnetic flux density $B_0$ 402 where magnetic flux density $B_0$ 402 is substantially normal to pipe 101. Magnetic flux density $B_0$ 402 being substantially normal to pipe 101 is not bent at an angle to exclusively excite a preferred mode without exciting any unwanted modes. Rather, magnetic flux density $B_0$ 402 being substantially normal to pipe 101 excites multiple modes included in guided ultrasonic wave 104 preventing the measurement of any time delay that may result from guided ultrasonic wave 104 propagating through non-uniform wall thickness in pipe 101.

Figure 5A:
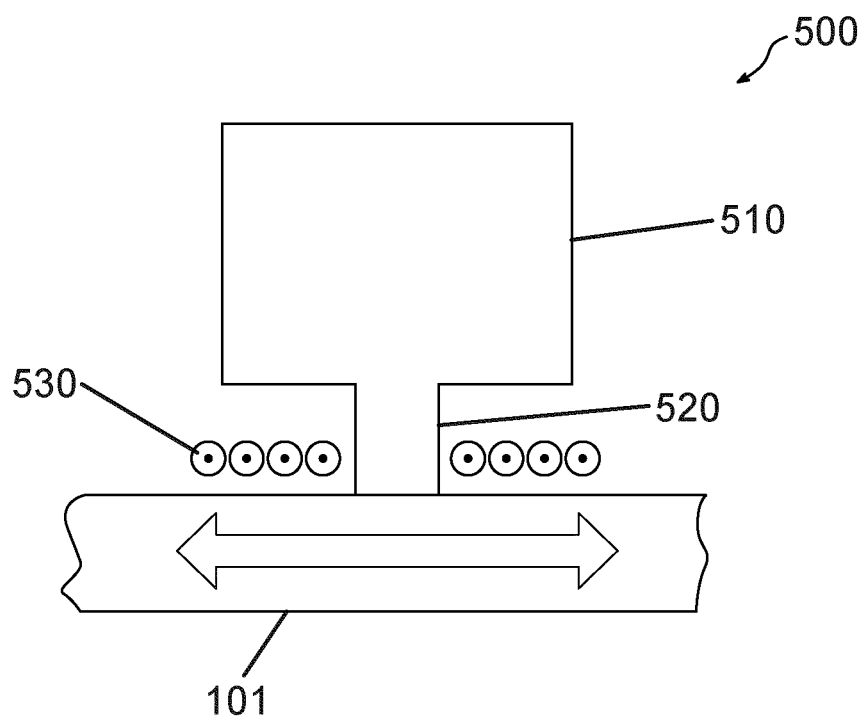
FIG. 5A depicts a spacer magnetic flux concentrator that may be implemented with transmit ultrasonic transducers to accentuate the curvature and concentrate the magnetic flux generated by transmit ultrasonic transducers so that exclusive excitation of the preferred mode occurs, according to an embodiment.
Figure 5B:
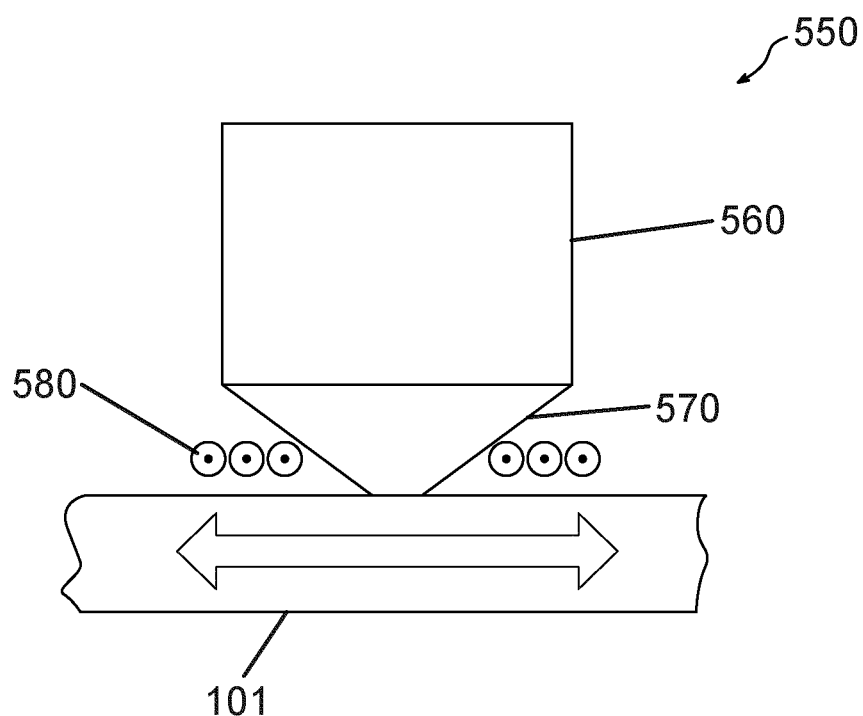
FIG. 5B depicts a spacer cone flux concentrator that may be implemented with transmit ultrasonic transducers to accentuate the curvature and concentrate the magnetic flux generated by transmit ultrasonic transducers so that exclusive excitation of the preferred mode occurs, according to an embodiment.

FIGS. 5A and 5B depict two examples of magnetic flux concentrators that may be implemented with transmit ultrasonic transducers 102 so that the magnetic flux generated by transmit ultrasonic transducers 102 may be guided so that exclusive excitation of the preferred mode occurs without exciting any other unwanted modes. FIG. 5A depicts a spacer magnetic flux concentrator 500 that may be implemented with transmit ultrasonic transducers 102 to accentuate the curvature and concentrate the magnetic flux generated by transmit ultrasonic transducers 102 so that exclusive excitation of the preferred mode occurs. Spacer magnetic flux concentrator 500 includes a cylindrical magnet 510 and a small-diameter spacer magnet 520 coupled to cylindrical magnet 510. Cylindrical magnet 510 may generate the magnetic flux. Small-diameter spacer magnet 520 that has a smaller diameter than cylindrical magnet 510 may then be coupled to pipe 101 and acts as a magnetic flux guide to guide the magnetic flux generated by cylindrical magnet 510 without any significant loss in magnetic flux density. The distance between cylindrical magnet 510 and pipe 101 which is the length of small-diameter spacer magnet 520 may generate a stand-off distance between cylindrical magnet 510 and pipe 101 that minimizes spurious eddy currents in cylindrical magnet 510 and thus contributes to maximizing the transmission of guided ultrasonic wave 104 in the preferred mode. As a result, exclusive excitation of the preferred mode occurs without exciting any other unwanted modes.

FIG. 5B depicts a spacer cone flux concentrator 550 that may be implemented with transmit ultrasonic transducers 102 to accentuate the curvature and concentrate the magnetic flux by generated by transmit ultrasonic transducers 102 so that exclusive excitation of the preferred mode occurs. Spacer cone flux concentrator 550 includes a cylindrical magnet 560 and a spacer cone 570 coupled to cylindrical magnet 560. Cylindrical magnet 560 may generate the magnetic flux. Spacer cone 570 may be a magnet that is coupled to pipe 101 and acts a magnetic flux guide to guide the magnetic flux generated by cylindrical magnet 560 without any significant loss in magnetic flux density. The distance between cylindrical magnet 560 and pipe 101 which is the length of spacer cone 570 may generate a stand-off distance between cylindrical magnet 560 and pipe 101 that minimizes spurious eddy currents in cylindrical magnet 560 and thus contributes to maximizing the transmission of guided ultrasonic wave 104 in the preferred mode. As a result, exclusive excitation of the preferred mode occurs without exciting any other unwanted modes.

Although spacer magnetic flux concentrator 500 includes a cylindrical magnetic flux guide positioned between a cylindrical magnet and pipe 101 and spacer cone flux concentrator 550 includes a conical magnetic flux guide positioned between a cylindrical magnet and pipe 101, any type of magnetic flux guide may be positioned between a magnet that generates magnetic flux and pipe 101 to guide the magnetic flux so that exclusive excitation of the preferred mode occurs without exciting any other unwanted modes that will be apparent to those skilled in the relevant art(s) without departing from the spirit and scope of the present disclosure. Further the geometries of the magnet and magnetic flux guide may include any geometrical relationship so that exclusive excitation of the preferred mode occurs without exciting any other unwanted modes that will be apparent to those skilled in the relevant art(s) without departing from the spirit and scope of the present disclosure. Further the stand-off distance between the magnet and pipe 101 which is the distance of the magnetic flux guide may be any stand-off distance so that exclusive excitation of the preferred mode occurs without exciting any other unwanted modes that will be apparent to those skilled in the relevant art(s) without departing from the spirit and scope of the present disclosure.

Figure 6A:
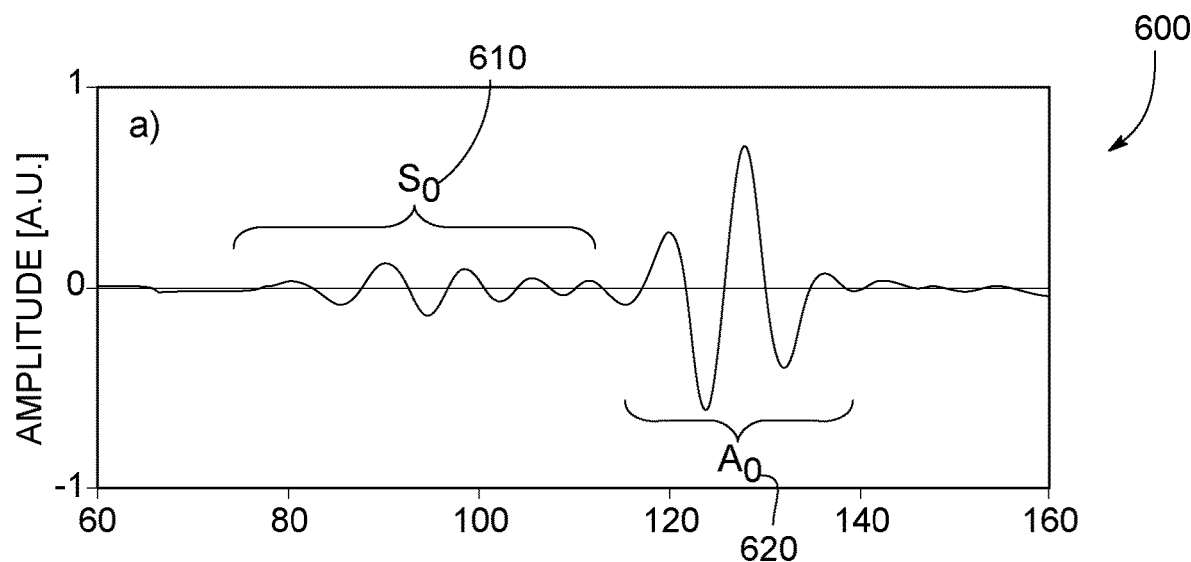
FIG. 6A depicts example conventional guided ultrasonic wave generated from a conventional transmit transducer configuration.

FIG. 6A depicts example conventional guided ultrasonic wave 600 generated from conventional transmit transducer configuration 400 shown in FIG. 4. Example conventional guided ultrasonic wave 600 was generated by magnetic flux density $B_0$ 402 that was substantially normal to pipe 101 so that magnetic flux density $B_0$ 402 was not bent relative to pipe 101. As a result, multiple modes, $S_0$ 610 and $A_0$ 620, are depicted in example conventional guided ultrasonic wave 600. As noted above, multiple guided wave modes that are excited and propagate through pipe 101 may be significantly difficult to analyze so that any time delay in example conventional guided ultrasonic wave 600 cannot be determined. Without determining the time delay, any non-uniform wall thickness in pipe 101 is not determined as well.

Figure 6B:
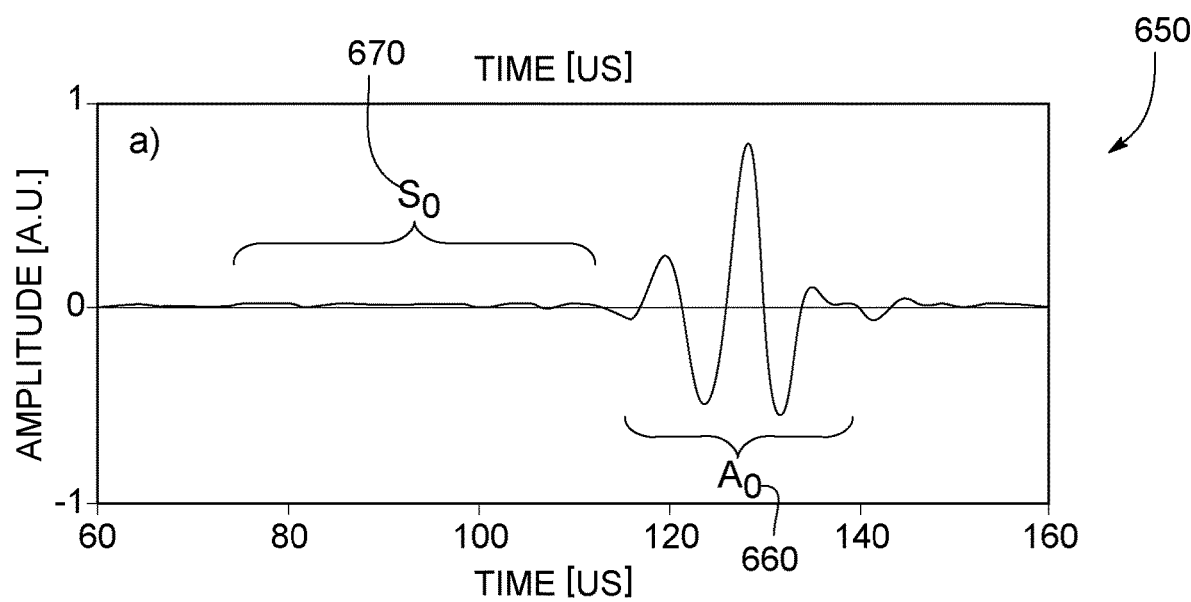
FIG. 6B depicts example guided ultrasonic wave generated from a spacer magnetic flux concentrator and/or a spacer cone flux concentrator, according to an embodiment.

However, FIG. 6B depicts example guided ultrasonic wave 650 generated from spacer magnetic flux concentrator 500 shown in FIG. 5A and/or spacer cone flux concentrator 550 shown in FIG. 5B. Example guided ultrasonic wave 650 was generated by a bend in magnetic flux generated by small-diameter spacer magnet 520 in FIG. 5A and/or spacer cone 570 in FIG. 5B. The bend in magnetic flux results in exclusive excitation of a preferred mode $A_0$ 660 without exciting an unwanted mode $S_0$ 670. As noted above, exclusive excitation of a preferred mode $A_0$ 660 that propagates through pipe 101 while preventing the propagation of unwanted mode $S_0$ 670 enables preferred mode $A_0$ 660 to be analyzed so that any time delay in example guided ultrasonic wave 650 can be determined so that any non-uniform wall thickness in pipe 101 may also eventually be determined. Although the preferred mode is shown as $A_0$, any exclusive excitation of a single mode without exciting any other mode may be implemented that will be apparent to those skilled in the relevant art(s) without departing from the spirit and scope of the present disclosure.

Returning to FIG. 2, control system 202 may engage in communication with transducer system 201. Control system 202 may send an initial electronic signal 206 to transmit ultrasonic transducers 102 to initiate transmit ultrasonic transducers 102 to begin exciting guided ultrasonic waves 104. Transmit ultrasonic transducers 102 may convert initial electronic signal 206 into guided ultrasonic waves 104 which then propagate through pipe 101 as discussed in detail above.

After guided ultrasonic waves 104 have propagated through pipe 101 and have been received by receive ultrasonic transducers 106, receive ultrasonic transducers 106 may send guided ultrasonic wave data 207 to control system 202. Guided ultrasonic wave data 207 may include three-dimensional analog data associated with guided ultrasonic waves 104 that have propagated through pipe 101 and have been received by ultrasonic transducers. Control system 202 may digitize the guided ultrasonic wave data 207 from three-dimensional analog data into digitized guided ultrasonic wave data 208. Control system 202 may then provide digitized guided ultrasonic wave data 208 to be analyzed by pre-processing system 203. Digitizing the analog data provided by guided ultrasonic wave data 207 into digitized guided ultrasonic wave data 208 presents the data to pre-processing system 203 in a digitized format that is compatible with pre-processing system 203.

As noted above, the thickness data representing the wall thickness of pipe 101 may be digitized into pixels and displayed to an operator terminal as a wall thickness map with a resolution so that the operator may visually identify the portions of pipe 101 that have non-uniform wall thickness. Pre-processing system 203 may process digitized guided ultrasonic wave data 208 so that the wall thickness map eventually generated is of high resolution so that the operator may easily examine the wall thickness map while being an accurate representation of the wall thickness. Pre-processing system 203 may also remove any data artifacts from digitized guided ultrasonic wave data 208 so that the wall thickness display is accurate.

Digitized guided ultrasonic wave data 208 may be three-dimensional data associated with guided ultrasonic waves 104. Pre-processing system 203 may convert the three-dimensional data associated with digitized guided ultrasonic wave data 208 into two-dimensional processed data 209 that may be processed by inversion system 204 with any artifacts included in digitized guided ultrasonic wave data 208 removed from two-dimensional processed data 209.

Each guided ultrasonic wave 104 may propagate through different paths in pipe 101 when propagating from each transmit ultrasonic transducer 102 to each corresponding receive ultrasonic transducer 106. For example, a first guided ultrasonic wave 104 may propagate directly from a first transmit ultrasonic transducer along pipe 101 to a first receive ultrasonic transducer 106. A second guided ultrasonic wave 104 may wrap around pipe 101 a single time when propagating from a second transmit ultrasonic transducer 102 to a second receive ultrasonic transducer 106. A third guided ultrasonic wave 104 may wrap around pipe 101 two times when propagating from a third transmit ultrasonic transducer 102 to a third receive ultrasonic transducer 106 and so on. Pre-processing system 203 may model the wrapping around pipe 101 by guided ultrasonic waves 104 and capture the data generated from the wrapping.

Rather than attempting to analyze the three-dimensional data generated by the wrapping of guided ultrasonic waves 104 around pipe 101, pre-processing system 203 may convert the three-dimensional data of first guided ultrasonic wave 104 that propagates through pipe 101 directly from first transmit ultrasonic transducer 102 to first receive ultrasonic transducer 106 without wrapping around pipe 101 into two-dimensional data. In doing so, pre-processing system 203 captures the three-dimensional data generated by first guided ultrasonic wave 104 as first guided ultrasonic wave 104 propagates through pipe 101 directly from first transmit ultrasonic transducer 102 to first receive ultrasonic transducer without wrapping around pipe 101. Pre-processing system 203 may then convert the three-dimensional data to two-dimensional data. Pre-processing system 203 may take the three-dimensional data associated with a three-dimensional cylindrical section of pipe 101 where first guided ultrasonic wave 104 propagated directly through pipe 101 without wrapping around pipe 101. Pre-processing system 203 may then convert the three-dimensional data associated with the three-dimensional cylindrical section of pipe 101 into two-dimensional data associated with a two-dimensional rectangular section of pipe 101. The two-dimensional rectangular section of pipe 101 represents the three-dimensional cylindrical section of pipe 101 converted into two-dimensions. As a result, the information included in the three-dimensional data is transferred to the two-dimensional data.

Figure 7A:
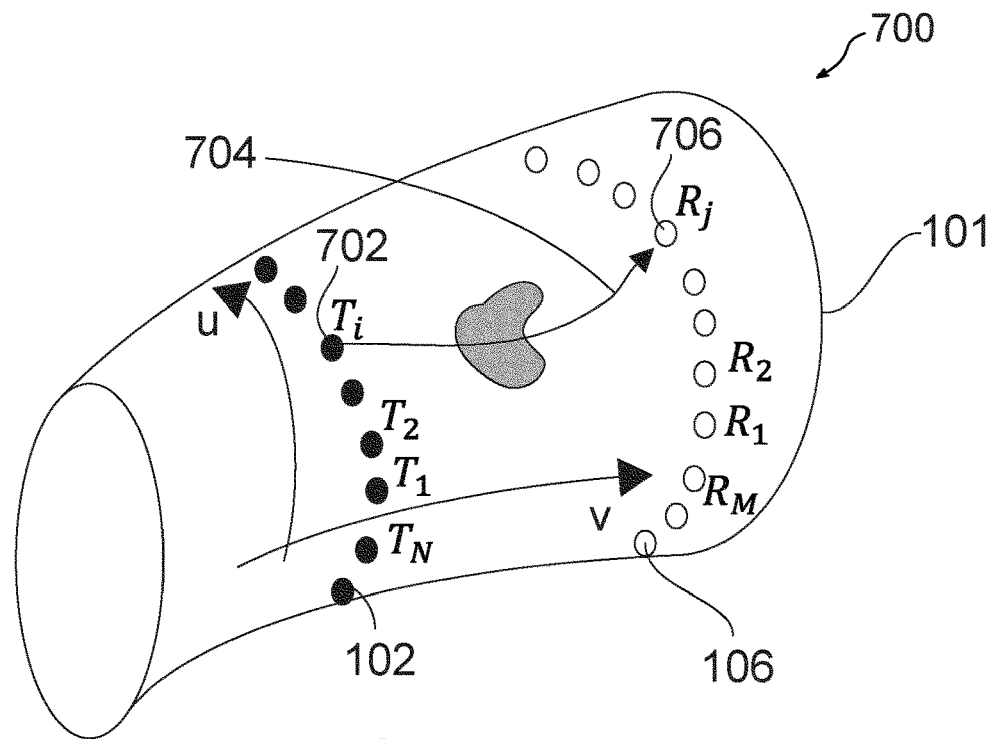
FIG. 7A depicts a tubular thickness mapping configuration where a direct guided ultrasonic wave propagates directly through a pipe from a first transmit ultrasonic transducer to a first receive ultrasonic transducer in three-dimensions without wrapping around a pipe, according to an embodiment.

FIG. 7A depicts a tubular thickness mapping configuration 700 where a direct guided ultrasonic wave 704 propagates directly through pipe 101 from first transmit ultrasonic transducer 702 to first receive ultrasonic transducer 706 in three-dimensions without wrapping around pipe 101. The three-dimensional data generated by direct guided ultrasonic wave 704 may be mapped to two-dimensional data by unwrapping the tubular thickness mapping configuration 700 shown in FIG. 7A into unwrapped thickness mapping configuration 750 shown in FIG. 7B. Unwrapped thickness mapping configuration 750 converts the three-dimensional data generated from direct guided ultrasonic wave 704 directly propagating through pipe 101 from first transmit ultrasonic transducer 702 to first receive ultrasonic transducer 706 into two-dimensional data. Pipe 101 and the three-dimensional data generated from direct guided ultrasonic wave 704 is no longer associated with a three-dimensional cylinder but rather is converted to be associated with a two-dimensional rectangle 755.

However, as noted above, other guided ultrasonic waves 104 may wrap around pipe 101 a single and/or multiple times when propagating from transmit ultrasonic transducers 102 to receive ultrasonic transducers 106. Converting the three-dimensional data generated from each guided ultrasonic wave 104 that wraps around pipe 101 a single and/or multiple times into two-dimensional data may be a difficult endeavor. However, simply converting the three-dimensional data generated by direct guided ultrasonic wave 704 that propagates directly from first transmit ultrasonic transducer 702 to first receive ultrasonic transducer 706 may not provide a sufficient wall thickness map to the operator to adequately monitor the wall thickness of pipe 101 when digitized into pixels. Additional two-dimensional data generated by guided ultrasonic waves 104 that wrap around pipe 101 a single and/or multiple times may be necessary to generate a sufficient wall thickness map to the operator to adequately monitor the wall thickness of pipe 101.

Pre-processing system 203 may virtually replicate the two-dimensional data mapped from the three-dimensional data generated from direct guided ultrasonic wave 704 that propagates directly from first transmit ultrasonic transducer 702 to first receive ultrasonic transducer 706 to adequately model the guided ultrasonic waves 104 that wrap around pipe a single and/or multiple times. Additionally, pre-processing system 203 may virtually replicate the two-dimensional data mapped from the three-dimensional data generated by guided ultrasonic waves 104 that may have been excited by virtual transmit ultrasonic transducers.

For example, the quantity of transmit ultrasonic transducers 102 and receive ultrasonic transducers 106 positioned on pipe 101 is sixteen. Pre-processing system 203 may virtually replicate the two-dimensional data mapped from the three-dimensional data generated by guided ultrasonic waves 104 that were excited by an additional thirty-two virtual transducers. Rather than having two-dimensional data mapped from the three-dimensional data generated by sixteen different guided ultrasonic waves 104, pre-processing may virtualize two-dimensional data from thirty-two additional virtual guided ultrasonic waves. As a result, the amount of two-dimensional data used to generate the wall thickness display for the operator may increase from forty-eight guided ultrasonic waves 104 thus improving the resolution of the wall thickness display for the operator to adequately monitor the wall thickness of pipe 101. The quantity of virtual two-dimensional data generated by pre-processing system 203 may include any quantity of virtual guided ultrasonic waves to provide an adequate wall thickness display to the operator that will be apparent to those skilled in the relevant art(s) without departing from the spirit and scope of the present disclosure.

Figure 7B:
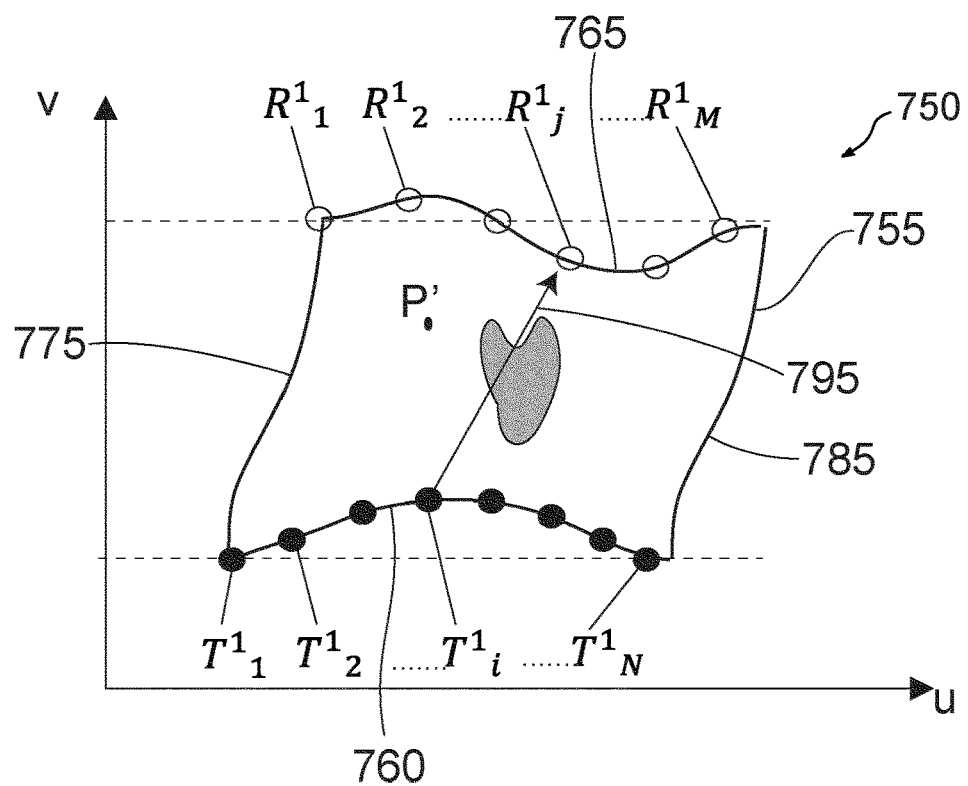
FIG. 7B depicts an unwrapped thickness mapping configuration, according to an embodiment.
Figure 8:
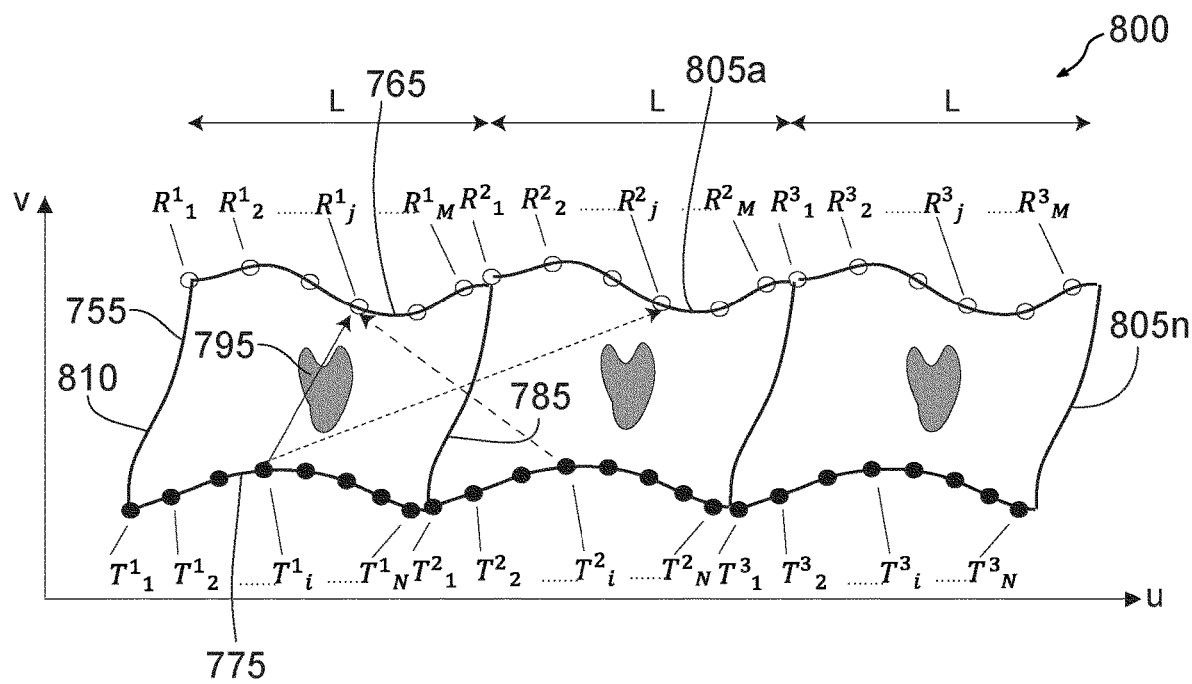
FIG. 8 depicts a tubular thickness mapping configuration where the two-dimensional data mapped from the three-dimensional data generated by a direct guided ultrasonic wave that propagates directly from a first transmit ultrasonic transducer to a first receive ultrasonic transducer, according to an embodiment.

FIG. 8 depicts a tubular thickness mapping configuration 800 where the two-dimensional data mapped from the three-dimensional data generated by direct guided ultrasonic wave 704 that propagates directly from first transmit ultrasonic transducer 702 to first receive ultrasonic transducer 706 in FIG. 7B may be replicated multiple times. The two-dimensional data mapped from three-dimensional data generated from direct guided ultrasonic wave 704 that propagates directly from first transmit ultrasonic transducer 702 to first receive ultrasonic transducer 706 is depicted as original data 810 in FIG. 8. The replicated data in FIG. 8 is depicted as first replicated data 805*a* and second replicated data 805*n* where n is an integer equal to or greater than one. First replicated data 805*a* and second replicated data 805*n* may represent two-dimensional data mapped from three-dimensional data generated from virtual guided ultrasonic waves that wrapped around pipe 101 a single and/or multiple times. First replicated data 805*a* and second replicated data 805*n* may also represent two-dimensional data mapped from three-dimensional data generated from virtual guided ultrasonic waves that were generated from virtual transmit ultrasonic transducers. First replicated data 805*a* and second replicated data 805*n* may improve the resolution of the wall thickness map that is displayed to the operator so that the operator may adequately monitor the wall thickness of pipe 101. Each additional replicated data incrementally improves the quality of the wall thickness map.

Figure 9:
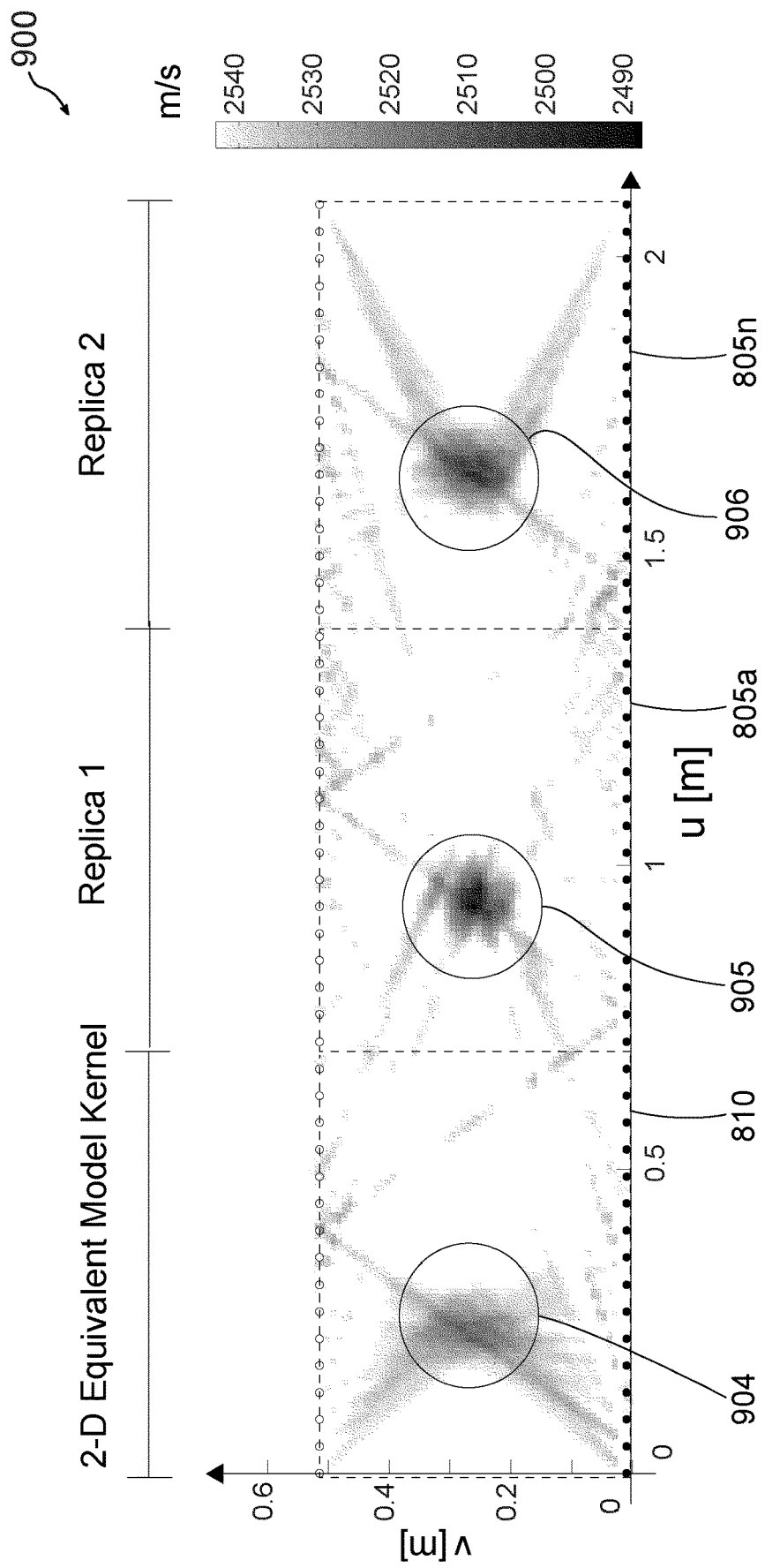
FIG. 9 depicts an example 2-D equivalent model as represented as a wall thickness map for a pipe, according to an embodiment.

FIG. 9 depicts an example 2-D equivalent model 900 as represented as a wall thickness map for pipe 101. As can be seen, the wall thickness map implementing original data 810 depicts a region of interest 904 that has reduced wall thickness in pipe 101. The wall thickness map implementing first replicated data 805*a* depicts a region of interest 905 that is the same region of interest of pipe 101 as depicted by region of interest 904. The wall thickness map implementing second replicated data 805*n* depicts a region of interest 906 that is same region of interest of pipe 101 as depicted by regions of interest 904 and 905. However, as can be seen, the wall thickness maps depicting the reduced wall thickness in pipe 101 increases in resolution for each set of two-dimensional data associated with each increased replicated data. For example, second replicated data 805*n* depicts region of interest 906 in higher resolution than region of interest 904 depicted with original data 810.

As noted above, pre-processing system 203 may also remove artifacts from the three-dimensional data generated as guided ultrasonic waves 104 propagate through pipe 101. Artifacts include data points included in the three-dimensional data that may depict non-uniform wall thickness when in actuality the three-dimensional data is representative of another aspect of pipe 101 that is unrelated to the wall thickness of pipe 101. For example, temperature may be an artifact in the three-dimensional data due to a change in temperature for pipe 101 delaying the propagating of guided ultrasonic waves 104 through pipe 101. The time delay due to the temperature change may be attributed to non-uniform wall thickness for pipe 101 when in actuality the temperature change provides substantially no indication of non-uniform wall thickness for pipe 101.

The impact on the propagation of guided ultrasonic waves 104 through pipe 101 based on a temperature change may be uniform throughout pipe 101 rather than being isolated to a portion of pipe 101. The phase velocities of guided ultrasonic waves 104 may be uniformly slowed from initial excitation by transmit ultrasonic transducers 102 and continue to propagate at the slowed phase velocity until reaching receive ultrasonic transducers 106. However, the impact on the propagation of guided ultrasonic waves 104 through pipe 101 due to non-uniform wall thickness is isolated to a portion of pipe 101. As noted above, guided ultrasonic waves 104 propagate through pipe 101 at a uniform phase velocity before entering a region of non-uniform wall thickness, then slow down during propagation through the region of non-uniform wall thickness, and then speed up when departing the region of non-uniform wall thickness.

The time delay for the propagation of guided ultrasonic waves 104 due to temperature change presents a predictable pattern in the three-dimensional data generated by the propagation of guided ultrasonic waves 104 through pipe 101. Three-dimensional data that depicts this predictable pattern that indicates a time delay due to temperature change may be identified in the three-dimensional data and removed from the three-dimensional data that is eventually analyzed to determine wall thickness of pipe 101. As a result, artifacts resulting from the temperature change may be removed improving the accuracy of the wall thickness map displayed to the operator.

Returning to FIG. 2, inversion system 204 receives the two-dimensional processed data 209 from pre-processing system 203 and produces a wall thickness map 210 with the two-dimensional processed data 209. As noted above, after the time delay in the propagation of guided ultrasonic waves 104 is determined at receive ultrasonic transducers 106, point by point phase velocities may be determined for each guided ultrasonic wave 104 for each point along the travel path of guided ultrasonic wave 104 through pipe 101. As a result, the decrease in phase velocity for each guided ultrasonic wave 104 during propagation through region of interest 105 may be determined relative to the increase in phase velocity for each when propagating through other portions of pipe 101 with uniform wall thickness.

Figure 10:
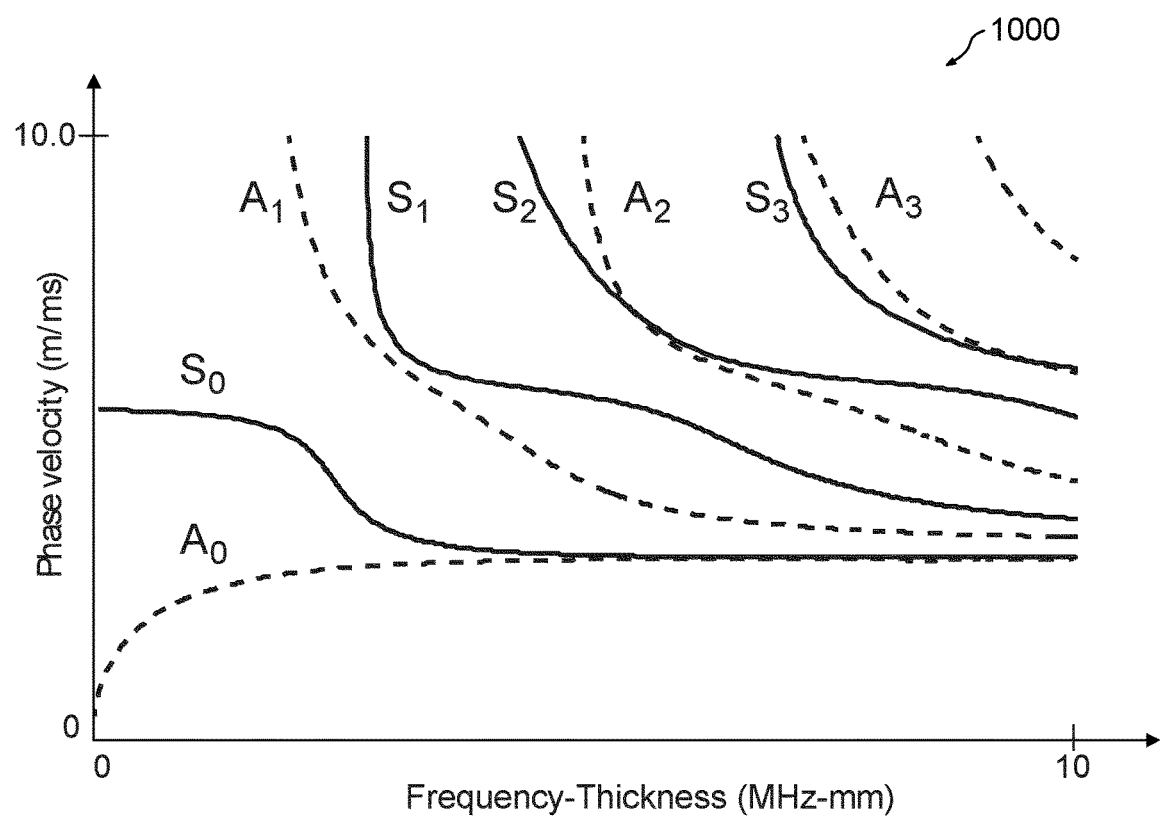
FIG. 10 depicts an example dispersion characteristic relationship of Lamb waves, according to an embodiment.

FIG. 10 depicts an example dispersion characteristic relationship 1000 of Lamb waves. Example dispersion characteristic relationship 1000 exhibits the point by point phase velocity for guided ultrasonic wave 104 as a function of the product of frequency, f with wall thickness, t, for all the Lamb modes that can propagate in pipe 101. With the frequency, f, for each guided ultrasonic wave 104 fixed and the point by point phase velocity for each guided ultrasonic wave 104 determined, inversion system 204 may determine the point by point wall thickness of pipe 101 based on example dispersion characteristic relationship 1000.

Inversion system 204 determines the point by point wall thickness of pipe 101 in a two-dimensional data format that is not comprehensible to the operator so that the operator may adequately monitor the wall thickness of pipe 101. As a result, inversion system 204 then discretizes the point by point wall thickness of pipe 101 so each point by point wall thickness is converted to a corresponding pixel. Inversion system 204 may assign a value to each pixel based on the wall thickness for each corresponding wall thickness point on pipe 101. Each value assigned to each pixel may have a color associated to it that corresponds to the wall thickness of the corresponding wall thickness point for each pixel. For example, the coloration of pixels may increase in shading as the wall thickness decreases so that pixels with dark colorations depict wall thickness loss.

Figure 11:
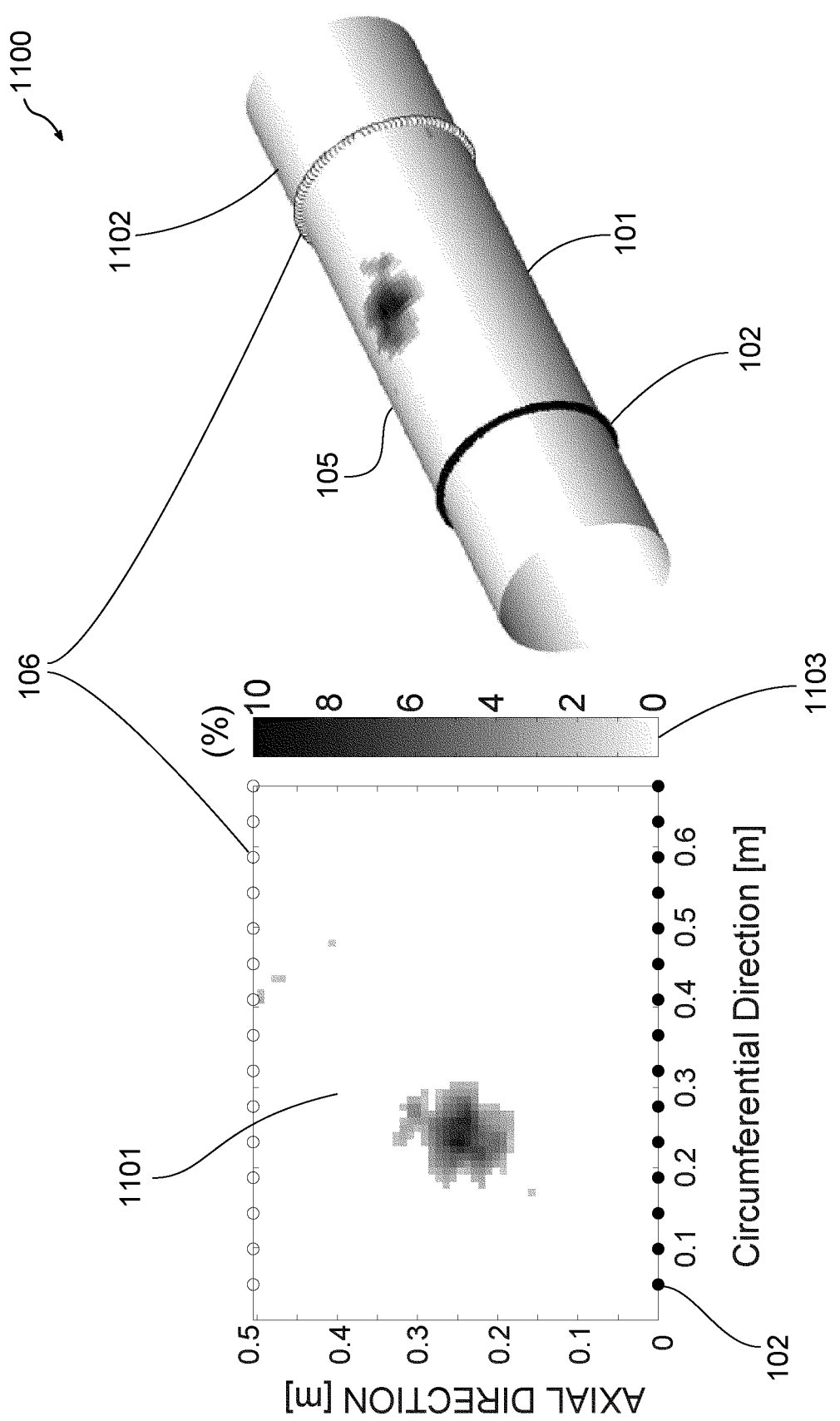
FIG. 11 illustrates an example wall thickness map, according to an embodiment.

After inversion system 204 has assigned a value to each pixel that corresponds to each wall thickness point for pipe 101, inversion system 204 may generate a wall thickness map. An example wall thickness map 1100 is depicted in FIG. 11. Example wall thickness map 1100 depicts a 3-D rendering 1102 which models region of interest 105 with a non-uniform wall thickness for pipe 101 in three-dimensions. Example wall thickness map 1100 also depicts a 2-D rendering 1101 which models region of interest 105 with a non-uniform wall thickness for pipe 101 in two-dimensions.

Gray levels 1103 may be associated with the wall thickness for pipe 101. As the wall thickness for pipe 101 decreases, the shading applied to portions of pipe 101 associated with decreased wall thickness may become darker. As the wall thickness for pipe 101 increases, the shading applied to portions of pipe 101 associated with increased wall thickness becomes lighter. As can be seen, region of interest 105 is located between transmit ultrasonic transducers 102 and receive ultrasonic transducers 106 as positioned on pipe 101.

Referring back to FIG. 2, inversion system may provide wall thickness map 210 to operator terminal 205. Operator terminal 205 may then display wall thickness map 210 to the operator. The operator may easily monitor the wall thickness of pipe 101 to determine if portions of pipe 101 decreases in wall thickness, such as region of interest 105 depicted in example wall thickness map 1100. The operator may be able to identify the location in pipe 101 that has the decreased wall thickness and as a result may be able to efficiently take pre-emptive measures to address the decreased wall thickness before damage to pipe 101 and/or to the environment surrounding pipe 101 occurs.

Transducer system 201, control system 202, pre-processing system 203, inversion system 204, and/or operator terminal 205 as described above may be used by thickness mapping system 200. Examples of functionality performed by each system are referenced in the above discussion. However, the above references are examples and are not limiting. The functionality of each system may be performed individually by each system and/or be shared among any combination of systems. As referred to herein, a system may be any type of processing (or computing) device having one or more processors. For example, a system can be an individual processor, workstation, mobile device, computer, cluster of computers, set-top box, game console or other device having at least one processor. In an embodiment, multiple systems may be implemented on the same processing device. Such a processing device may include software, firmware, hardware, or a combination thereof. Software may include one or more applications and an operating system. Hardware can include, but may not be limited to, a processor, memory, and/or graphical user display.

Detailed Discussion of Thickness Mapping System

The following provides a detailed discussion of thickness mapping system 200 which goes into further detail of how transducer system 201, control system 202, pre-processing system 203, inversion system 204, and/or operator terminal 205 function.

Referring back to FIG. 1, transmit aperture 103 includes one or more curves belonging to the surface of complex structure 101 and contains N transmit ultrasonic transducers 102, where N is an integer greater to or equal to one. Each ultrasonic transducer 102 launches guided ultrasonic wave 104 that travels along complex structure 101 within its wall, interacts with region of interest 105 where a reduction in wall thickness may occur, and may then be detected by plurality of receive ultrasonic transducers 106 of receive aperture 107.

Receive aperture 107 may include M receive ultrasonic transducers 106, where M is an integer greater to or equal to one arranged along one or more curves of the surface of complex structure 101. Transmit ultrasonic transducers 102 of transmit aperture 103 operate sequentially with each transmit ultrasonic transducer 102 launching a wave only after the wave excited by the previous transducer has decayed. On the other hand, receive ultrasonic transducers 106 of receive aperture 107 may receive in parallel, sequentially or with a combination of both. Due to the principle of reciprocity the function of transmit aperture 103 and receive aperture 107 may be interchanged, thus receive aperture 107 can be used as transmit aperture 103 and vice versa. Regardless of how the signals are received a total of N×M signals are stored.

Guided ultrasonic waves 104 may result from the interaction of bulk longitudinal and shear waves with the boundaries of complex structure 101. The boundaries may force the ultrasonic signal to propagate over a long distance thus allowing the wave to insonify a large part of complex structure 101 from a single transmitter position. In an embodiment, guided ultrasonic waves 104 may include Lamb waves. Lamb waves which are a class of guided ultrasonic waves propagate along a flat plate. The velocity at which the phase of a Lamb wave signal propagates depends on the type of Lamb mode, frequency of the signal, elastic properties of the plate and its thickness. The dependence of the phase velocity on some of these parameters is shown in FIG. 10. FIG. 10 depicts the dispersion characteristic relationship 1000 of Lamb waves. Dispersion characteristic relationship 1000 exhibits the phase velocity as a function of the product of frequency, f, with plate thickness, t, for all the Lamb modes that can propagate in a steel plate in the 0 to 10 MHz-mm f-t range. The curves can be obtained for any material by solving the Rayleigh-Lamb dispersion equation. The modes are grouped in two families: the asymmetric modes labeled $A_0$, $A_1$, $A_2$, and $A_3$, and the symmetric modes labeled $S_0$, $S_1$, $S_2$, and $S_3$.

$A_0$ is the fundamental flexural mode which exhibits a phase velocity that increases with the frequency-thickness (f-t) product monotonically. Since the center frequency of the guided wave signal is constant, the $A_0$ mode slows down as it travels across an area of reduced thickness (t is smaller) with the largest speed reduction occurring where the thickness loss is greatest. Conversely, the velocity of the $S_0$ mode decreases with the f-t product monotonically meaning that the guided mode accelerates as it travels through a region of reduced thickness. Similar considerations apply to the other modes.

In an embodiment, the interaction of guided ultrasonic waves with an area of reduced wall thickness in complex structure 101 such as that shown in FIG. 1 may be described using a two-dimensional (2-D) acoustic model hereafter referred to as the 2-D equivalent model. In the 2-D equivalent model, guided ultrasonic signals propagate along a planar surface, without thickness. The method to obtain the 2-D equivalent model is illustrated in the block diagram shown in FIG. 12.

Figure 12:
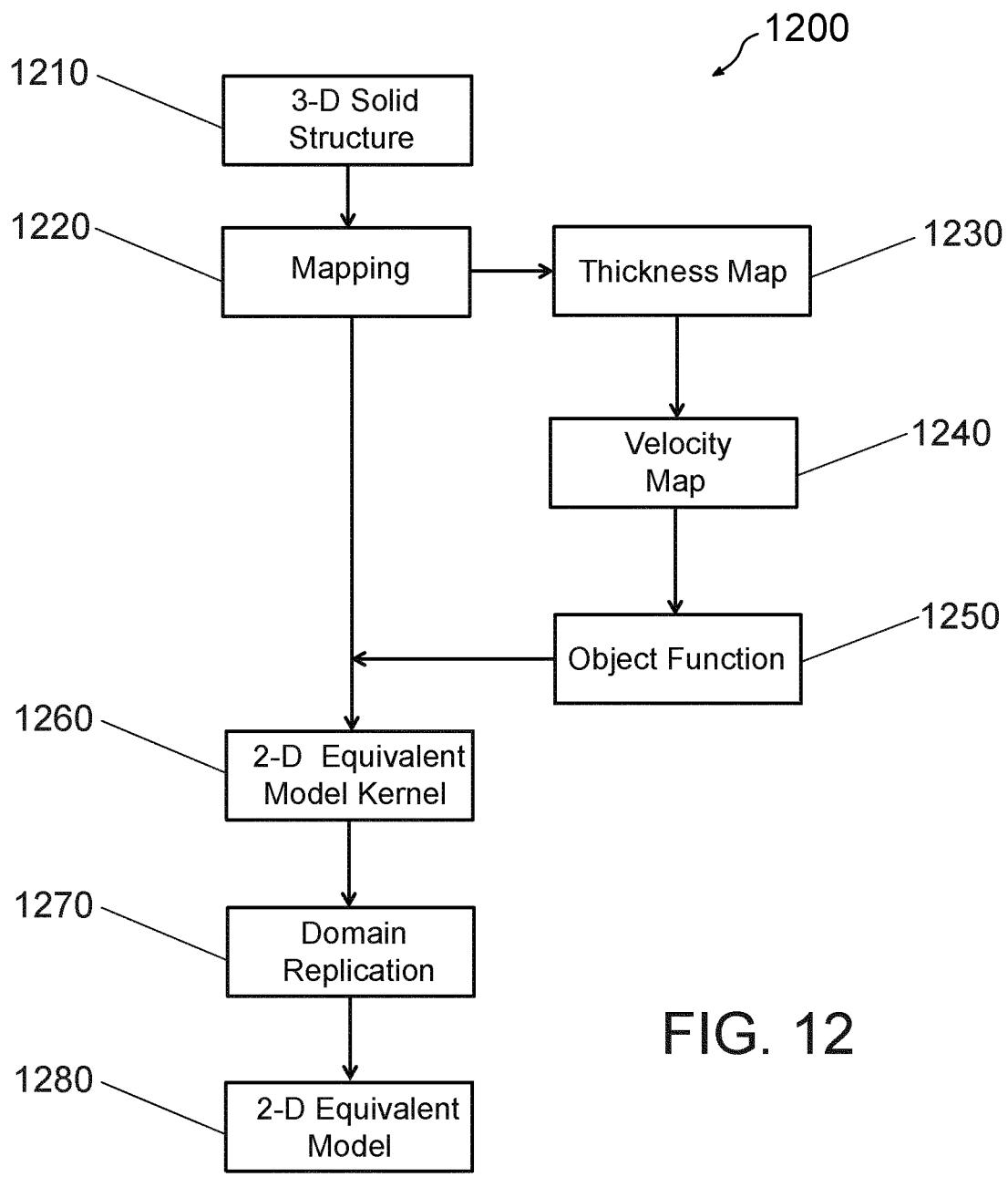
FIG. 12 is a flowchart showing an example method for generating the 2-D equivalent model, according to an embodiment.

FIG. 12 is a flowchart showing an example method 1200 for generating the 2-D equivalent model. As shown in FIG. 12, method 1200 begins at stage 1210 where the volume of the solid structure is collapsed onto a three-dimensional (3-D) surface by removing the thickness dimension from the solid structure. For example, a plate may be transformed into a plane. In another example, a straight section of a pipe may be transformed into a circular cylinder. In a further example, a pipe bend becomes a section of a torus. In step 1220, a mapping may transform the 3-D surface into a 2-D geometrical model.

Figure 13:
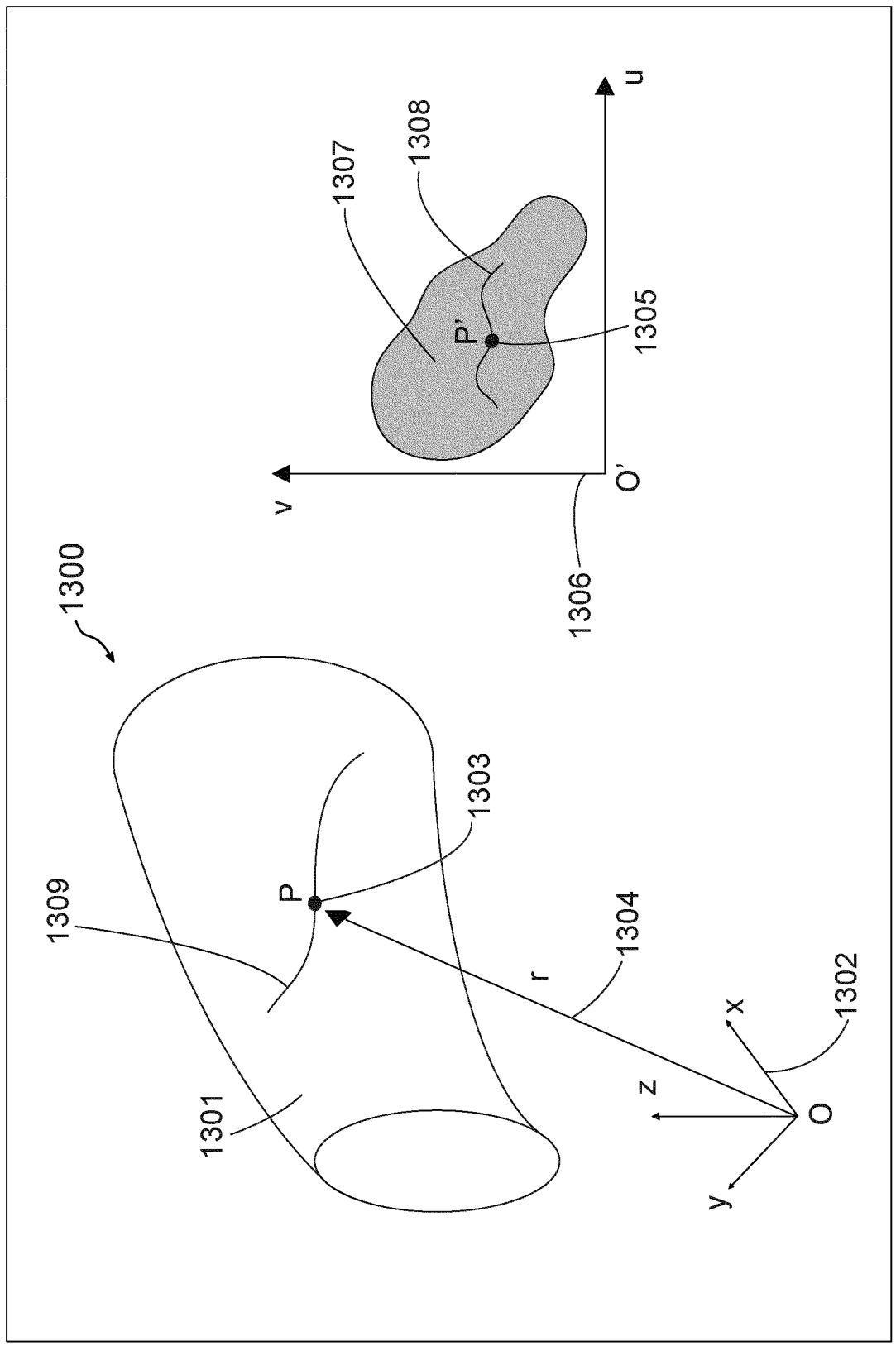
FIG. 13 depicts a mapping configuration that illustrates a 3-D surface mapped to a 2-D thickness map, according to an embodiment.

At stage 1230, 2-D thickness map may be generated. The mapping may be based on a suitable parameterization of the 3-D surface as illustrated in FIG. 12. FIG. 13 depicts a mapping configuration 1300 that illustrates a 3-D surface mapped to a 2-D thickness map. FIG. 13 includes a 3-D surface 1301 that is displayed in reference to a set of Cartesian coordinates 1302. For example, the 3-D surface 1301 is displayed in reference to the Cartesian coordinates of {O, x, y, z}. Position of a point P 1303 located on the 3-D surface 1301 may be uniquely determined by a vector r 1304 generated from the coordinates {O, x, y, z}. Point P 1303 corresponds to mapped point P' 1305 that in the 2-D domain 1306 may be uniquely defined by coordinates u and v.

According to these definitions, a parametric representation of 3-D surface 1301 may be given by the vectorial equation:

$$r = r(u, v), \quad (1)$$

with u and v belonging to a subset 1307 of the 2-D domain. This representation may be used to map a 2-D curve 1308 in the 2-D domain to one and only one 3-D curve 1309 on the 3-D surface 1301. In one embodiment the parametric expression of 2-D curve 1308 in the 2-D domain may be given by:

$$v = g(u), \quad (2)$$

where g(•) is a prescribed function and u varies within a finite interval of r. The corresponding 3-D curve 1309 on the 3-D surface 1301 is given by:

$$r = r[u, g(u)]. \quad (3)$$

In a preferred embodiment of the invention, the parameterization in EQ. (1) may satisfy the orthogonality condition:

$$\partial r/\partial u \cdot \partial r/\partial v = 0. \quad (4)$$

Figure 14:
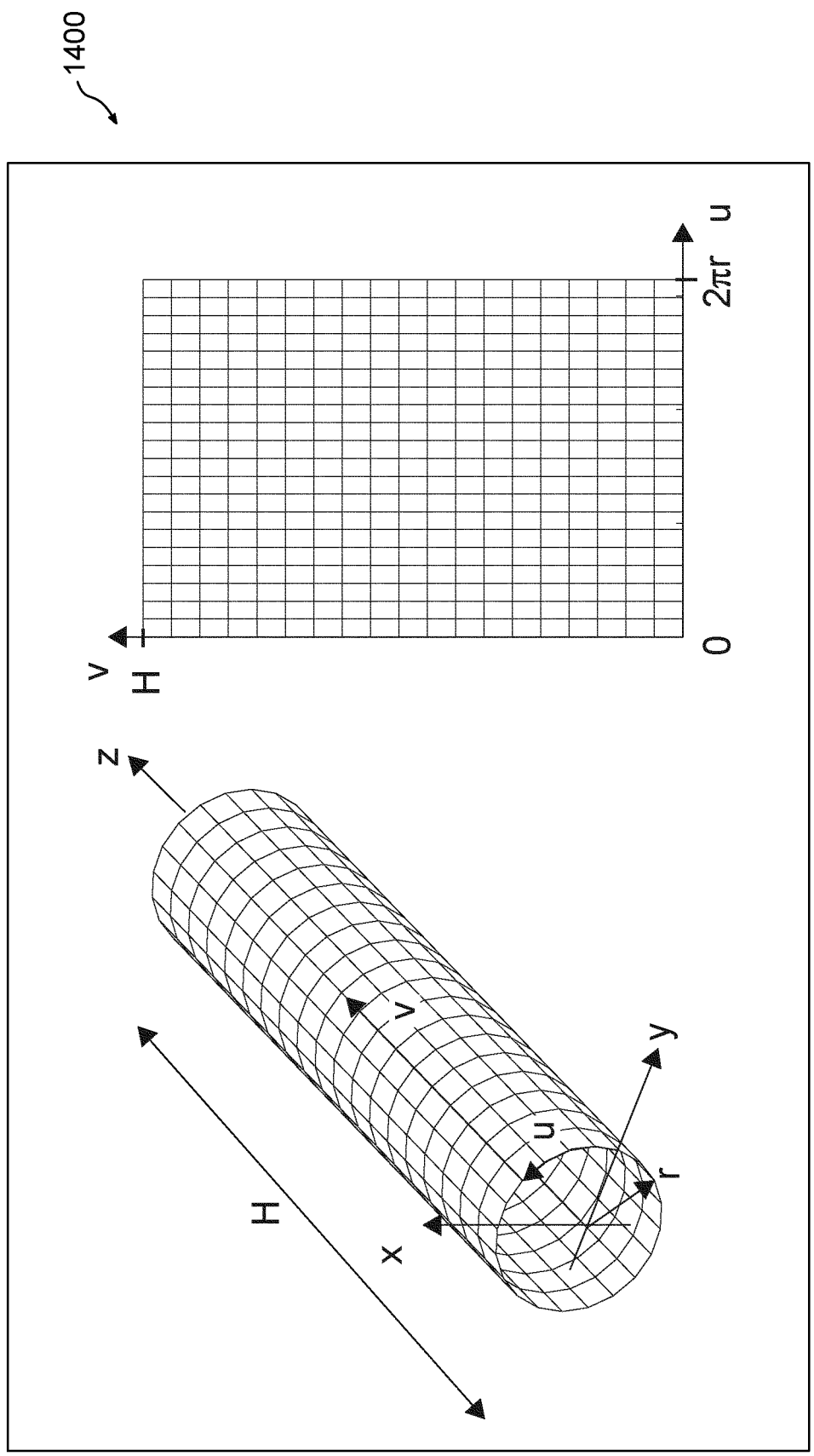
FIG. 14 depicts a cylinder configuration, according to an embodiment.

This condition together with the choice of a suitable velocity field for the 2-D space ensures traveltime preservation. In particular, the traveltime of a signal along any 2-D curve 1308 in the 2-D space is the same as the traveltime of the guided wave signal propagating along the corresponding 3-D curve 1309 on the 3-D surface 1301. In an exemplary embodiment the mapping of point P 1303 of a circular cylinder is defined as:

$$x = r \sin u, \quad (5)$$

$$y = r \cos u, \quad (6)$$

$$z = v, \quad (7)$$

where r is the radius of the cylinder and $u \in [0\ 2\pi r]$ and $v \in [0\ H]$, with H being the length of the section of cylinder as shown as cylinder configuration 1400 in FIG. 14.

Figure 15:
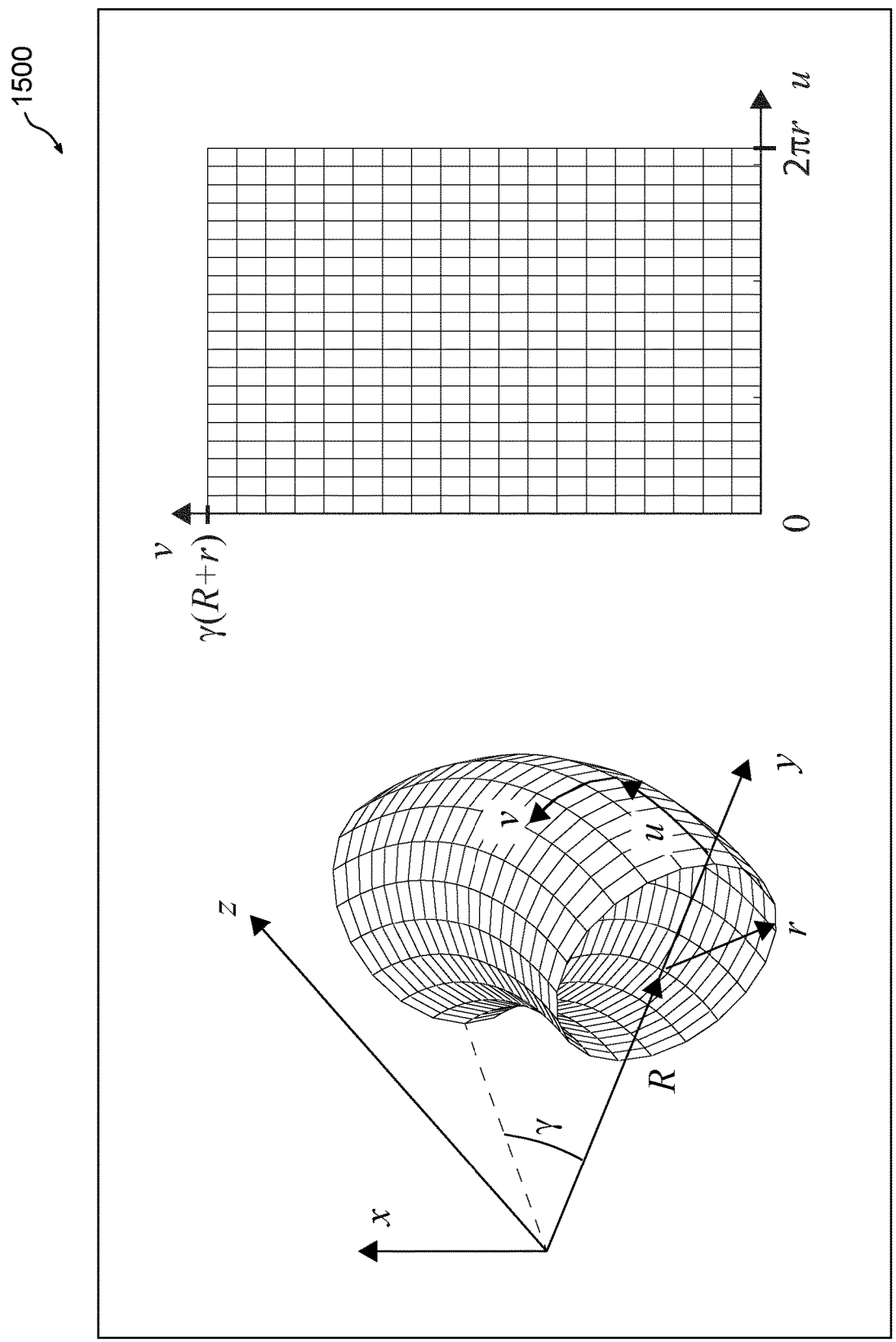
FIG. 15 depicts a mapping configuration, according to an embodiment.

In another exemplary embodiment, the mapping of a section of torus of angle $\Gamma$, radius of curvature R and tube radius r shown as mapping configuration 1500 in FIG. 15 is:

$$x = r \sin u/r, \quad (8)$$

$$y = (R + r \cos u/r) \cos(v/(R+r)), \quad (9)$$

$$z = (R + r \cos u/r) \sin(v/(R+r)), \quad (10)$$

with $$u \in [0\ 2\pi r], \quad (11)$$

$$v \in [0 (R+r)\Gamma]. \quad (12)$$

At stage 1240, the 2-D thickness map generated in stage 1230 may be used to generate a velocity map with a dispersion equation and the 2-D thickness map generated in stage 1230. The propagation of guided ultrasonic waves and their interaction with regions of reduced wall thickness may be approximated according to the theory of 2-D acoustic scattering. Point P' 1305 included in subset 1307 of the 2-D domain as shown in FIG. 13 may be associated with a value of ultrasonic velocity with equation (1).

In one embodiment, the value of ultrasonic velocity may be determined from the thickness of the structure at the corresponding point P 1303 and the frequency of the selected guided wave using a dispersion curve. Specifically, letting $c_M$ be the phase velocity of mode M where M can refer to one of the modes of the symmetric or antisymmetric family of the Rayleigh-Lamb characteristic equation. The Rayleigh-Lamb characteristic equation may be used to calculate $c_M$ for a range of f×t values where the function $$c_M = c_M(ft), \quad (13)$$

is known. Letting t(r) be the thickness of the structure at point P 1303 may be identified by vector r 1304 then the ultrasonic velocity at point P' 1305 that leads to travel time preservation may be given by the expression for an inhomogeneous and elliptically anisotropic velocity field $$c_M(u,v,\theta) = c_u[r(u,v)] c_v[r(u,v)] / \{c_u^2[r(u,v)] \sin^2\theta + c_v^2[r(u,v)] \cos^2\theta\}^{1/2}$$

$$c_u[r(u,v)] = c_M\{ft[r(u,v)]\}^{-1} |\partial r/\partial u| \text{ and } c_v[r(u,v)] = c_M\{ft[r(u,v)]\}^{-1} |\partial r/\partial v| \quad (14a)$$

where $\theta$ may be the angle representing the propagation direction relative to the u-axis. Wave propagation in such a medium may be described by the anisotropic wave equation $$\varphi(u,v,f) + c_u^2(u,v)/(2\pi f)^2 \partial^2 \varphi(u,v,f)/\partial u^2 + c_v^2(u,v)/(2\pi f)^2 \partial^2 \varphi(u,v,f)/\partial v^2 = 0 \quad (14b)$$

where $\varphi(u, v, f)$ may be a scalar potential function. In the short wavelength limit EQ. (14b) may be approximated by the anisotropic eikonal equation $$c_u^2(u,v) \partial^2 t(u,v)/\partial u^2 + c_v^2(u,v) \partial^2 t(u,v)/\partial v^2 = 1 \quad (14c)$$

where the function $\tau(u, v)$ is the travel time of the guided wave to point (u, v).

The use of the Rayleigh-Lamb characteristic equation to calculate the function $c_M(\cdot)$ may be sufficiently accurate when the thickness of the structure is small compared to the local radius of curvature.

At stage 1250, the velocity map generated in stage 1240 may then be used to determine the object function through the use of suitable differential equations. A scattering model may be used to describe the interaction of the guided wave with the region of reduced wall thickness based on a suitable treatment of the anisotropic wave equation. For a straight pipe section the parametric representation in EQS. (5)-(7) leads to an isotropic field $[|\partial r/\partial u| = |\partial f/\partial v| = 1]$ with $c_M(u, v, q) = c_M\{ft[r(u, v)]\}$. For illustration purposes the following descriptions will be limited to the straight pipe case, the generalization to curved pipe sections may require mathematical treatments that are within the knowledge of one skilled in the art.

In one embodiment, the guided wave is represented by a scalar potential field $\varphi(u, v, f)$ that in the frequency domain satisfies the inhomogeneous Helmholtz equation:

$$\Delta^2 \varphi(u,v,f) + k^2 \varphi(u,v,f) = -4\pi O(u,v,f) \varphi(u,v,f), \quad (15)$$

where $\Delta^2 \varphi(u, v, f)$ denotes the Laplacian of the field function $\varphi(u, v, f)$ and $k = 2\pi f/c^0_M(f)$ is the background wave number obtained from the phase velocity in the undamaged structure $c^0_M(f)$. $O_H(u, v, f)$ is the object function defined as:

$$O_H(u,v,f) = k^2/4\pi[(c^0_M(f)/c_M(u,v,f))^2 - 1]. \quad (16)$$

The object function vanishes outside the region of reduced wall thickness as $c_M(u, v, f) = c^0_M(f)$. Equations (15) and (16) provide a mathematical description of how a guided ultrasonic wave is scattered by a region of reduced wall thickness.

In another embodiment, the propagation of the guided wave may be described by an asymptotic approximation of the Helmholtz equation known as the eikonal equation:

$$(\partial \tau/\partial u)^2 + (\partial \tau/\partial v)^2 = O_e(u,v), \quad (17)$$

where the function $\tau(u, v)$ is the travel time of the guided wave to point (u, v) and the object function $O_e(u, v)$ is now defined as:

$$O_e(u,v) = 1/c_M(u,v)^2 \quad (18)$$

where $c_M(u, v)$ refers to the phase velocity of the signal at the center frequency. The eikonal equation leads to ray theory which can account for refraction effects but neglects diffraction. In an additional embodiment, the eikonal model may be completed by approximations of Helmholtz equation under the Born or Rytov linearized models.

At stage 1260, the 2-D geometrical model and the object function may constitute the kernel of the 2-D equivalent model. Referring back to FIG. 7A, FIG. 7A depicts a tubular thickness mapping configuration 700. In the presence of closed surfaces or tubular structures such as a pipe as shown with pipe 101 in FIG. 7A, the 2-D kernel may be extended to include waves that wrap around pipe 101 before reaching receive ultrasonic transducers 106. As a result, the first step may be to represent transmit aperture 103 and receive aperture 107 in the 2-D geometrical model. The position of a transducer on the surface of pipe 101 may be mapped onto a point in the 2-D geometrical model using the mapping in EQ. (1) satisfying the orthogonality condition in EQ. (4). Therefore, a generic transducer of the transmit array, $T_i$, corresponds to point $T_i^1$ in the 2-D geometrical model and a generic transducer of the receive array, $R_j$, corresponds to point $R_j^1$ as shown in FIG. 7A.

In an embodiment, transmit ultrasonic transducers 102 and receive ultrasonic transducers 106 may be closed curves encircling pipe 101. The section of pipe 101 enclosed within the two arrays may then be represented in the 2-D geometrical model by the domain enclosed by boundaries 760, 765, 775, and 785 as shown in FIG. 7B. Boundary 760 corresponds to plurality of transmit ultrasonic transducers 102 of transmit aperture 103 and boundary 765 corresponds to receive ultrasonic transducer 106 of receive aperture 107. Boundary 775 corresponds to any curve of 3-D surface joining transmit ultrasonic transducers 102 $T_1$ and receive ultrasonic transducer 106 $R_1$. Boundary 785 may be the rigid translation of boundary 775 by an amount L corresponding to the length of a full turn around the structure in the direction of the u parameter. Boundary 785 also maps onto the curve on 3-D surface joining transmit ultrasonic transducer 102 $T_1$ and receive ultrasonic transducer 106 $R_1$.

The propagation of guided ultrasonic wave 104 from transmit ultrasonic transducer 102 $T_i$ to receive ultrasonic transducer 106 $R_j$ may be calculated by using the 2-D geometrical model considering the propagation from transmit ultrasonic transducer 102 $T_i^1$ to receive ultrasonic transducer 106 $R_j^1$. In the absence of wall thickness loss, the wave field at a point P′ resulting from a point source at transmit ultrasonic transducer 102 $T_i^1$ is given by $$\varphi(T_i^1, P', f) = A(f) G(P', T_i^1, f). \tag{19}$$

where $A(f)$ is a complex constant describing the phase and amplitude of transmit ultrasonic transducer 102 and $G(P', T_i^1, f)$ is the 2-D Green's function for a uniform phase velocity field $$G(P', T_i^1, f) = -\frac{i}{4} H_0\left(\frac{2\pi f}{c_M^0(f)} |P' - T_i^1|\right), \tag{20}$$

where $H_0$ is the zero order Hankel function of the first kind and $|P'-T_i^1|$ is the distance between P′ and $T_i^1$. The arrival time of a continuous wave signal of frequency, f, traveling from first transmit ultrasonic transducer 702 at location $T_i$ on pipe 101 to first receive ultrasonic transducer 706 at location $R_j$ on pipe 101 is then $$\tau(R_j, T_i, f) = \frac{|R_j^1 - T_i^1|}{c_M^0(f)} + \tau_A, \tag{21}$$

where $\tau_A$ is a constant defining the time at which the signal is launched by first transmit ultrasonic transducer 702 at $T_i$, $c_M^0(f)$ is the phase velocity in pipe 101 of uniform thickness and $|R_j^1-T_i^1|$ is the distance between points $R_j^1$ and $T_i^1$ in the 2-D geometrical model. The use of the distance $|R_j^1-T_i^1|$ may be justified by Fermat's principle and orthogonality condition in EQ. (4). For a straight pipe section EQS (5)-(7) yield an arc-length parameterization therefore the length of straight path 795, in the 2-D geometrical model, is the same as the length of the corresponding path along 3-D surface. Moreover, in the 2-D domain, straight path 795 is the shortest path that can join receive ultrasonic transducer 706 $R_j^1$ and first transmit ultrasonic transducers 702 $T_i^1$. In the absence of damage this path results in the shortest travel time thus satisfying Fermat's principle. For a curved pipe section, the length $|R_j^1-T_i^1|$ is replaced by the length of the curved acoustic ray joining points $R_j^1$ and $T_i^1$ and the travel time in EQ. (21) obtained by applying ray tracing techniques to the model provided by EQ. (14).

At domain replication stage 1270, additional paths may be described in the 2-D geometrical model by extending the domain in the 2-D geometrical model by adding additional replicas of the 2-D equivalent kernel. The path from transmit ultrasonic transducer 702 $T_i^1$ to receive ultrasonic transducer 706 $R_j^1$ may correspond to a curve on 3-D surface that performs one or more full turns around the tubular section. Moreover, for each path that wraps around pipe 101 multiple times in one direction there exists another path in the opposite direction. In order to describe these additional paths, the domain in the 2-D geometrical mode may be extended by adding replicas of the 2-D equivalent domain kernel as shown in FIG. 8. FIG. 8 depicts a tubular thickness mapping configuration 800. Adding n replicas may be sufficient to describe waves that perform n full turns around tubular pipe 101. Each replica contains a set of N virtual transmit ultrasonic transducers and M virtual receive ultrasonic transducers. The coordinates of plurality of transmit ultrasonic transducers and plurality of receive ultrasonic transducers for the n-th replica are $$T_i^{n+1} = T_i^1 + nL\hat{u}, \tag{22}$$

$$R_j^{n+1} = R_j^1 + nL\hat{u}, \tag{23}$$

where L is the length of a full turn along the curve of 3-D surface that corresponds to the line v=0 in the 2-D model and $\hat{u}$ is the unit vector parallel to the u-axis in the 2-D geometrical model. Similarly the object function, may be replicated using the object function within the kernel of the 2-D equivalent model as the template, i.e.

$$O(P^n) = O(P^n - nL\hat{u}), \tag{24}$$

where $P^n$ is the vector defining the position of a point inside the n-th replica. The arrival time of a signal traveling from first transmit ultrasonic transducer 702 at location $T_i$ on pipe 101 to a receive ultrasonic transducer 706 at location $R_j$ and undergoing n full turns around the structure is $$\tau^n(R_j, T_i, f) = \frac{|R_j^1 + nL\hat{u} - T_i^1|}{c_M^0(f)} + \tau_A. \tag{25}$$

The arrival time of the signal wrapping n times in the opposite direction is $$\tau^n(R_j, T_i, f) = \frac{|R_j^1 - T_i^1 + nL\hat{u}|}{c_M^0(f)} + \tau_A. \quad (26)$$

Expressions (25) and (26) can be combined into a single formula $$\tau^m(R_j, T_i, f) = \frac{|R_j^1 - T_i^1 + mL\hat{u}|}{c_M^0(f)} + \tau_A, \quad (27)$$

with $$m = \begin{cases} n, \\ 0, \\ -n, \end{cases} \quad (28)$$

where positive and negative values of m are used to describe waves wrapping in opposite directions, and m=0 corresponds to the direct paths that do not perform a full turn. Formula (27) provides a general expression to describe wave paths in a straight pipe.

Due to the dispersion phenomenon the arrival time of a broadband signal centered around frequency f is given by $$\tau^m(R_j, T_i, f) = \frac{|R_j^1 - T_i^1 + mL\hat{u}|}{v_M^0(f)} + \tau_A, \quad (29)$$

where $v_M^0(f)$ is the group velocity defined through the frequency dependent mode wave number $k_M^0(f) = 2\pi f/c_M^0(f)$ as $$v_M^0(f) = c_M^0(f) + k_M^0(f) \frac{dc_M^0}{dk_M^0}. \quad (30)$$

For a curved pipe section, the arrival time in EQ. (29) is computed numerically by means of ray tracing methods applied to the anisotropic model given in EQ. (14).

An important prerogative of the 2-D equivalent model is that the physical transmit and receive arrays that consist of N and M transducers respectively may be transformed into virtual arrays consisting of $N'=N\times(m_{max}+1)$ and $M'=M\times(m_{max}+1)$ virtual transducers when up to $m_{max}$ full turns are considered. If the guided waves cannot wrap around pipe 10a, the domain replication stage 1270 may be omitted and the 2-D equivalent model kernel may be used as the 2-D equivalent model.

At stage 1280, the 2-D equivalent model is generated. The 2-D equivalent model defines a forward scattering model and may be used to predict the outcome of GWT measurements through a region of reduced wall thickness provided that the spatial distribution of the wall thickness loss is known. In particular, the forward scattering model may be used to predict the N×M physical transmission measurements. In an embodiment, the object function O(u, v, f) determined from EQ. (15) may be used in EQ. (16) to estimate the distribution of the guided wave phase velocity, $\tilde{c}_M$ (u, v, f) in the 2-D geometrical model where $$\tilde{c}_M(u, v, f) = \frac{c_M^0}{\sqrt{1 + \frac{O_H(u, v, f)c_M^{0^2}}{\pi f^2}}}. \quad (31)$$

In another embodiment, the distribution of phase velocity is given by $$\tilde{c}_M(u, v) = \frac{1}{\sqrt{O_e(u, v)}}. \quad (32)$$

In other embodiments, the phase velocity is obtained by inverting the appropriate object function corresponding to the assumed differential equation.

Defining $C_M^{-1}$ as the inverse of the function in EQ. (13) the thickness at point P' of the 2-D equivalent model is $$t(u, v) = \frac{1}{f} C_M^{-1} [\tilde{c}_M(u, v)]. \quad (33)$$

This is also the thickness of the structure at the point P corresponding to P' through the parametric representation in EQ. (1), the difference between the thickness of the undamaged structure and the value given by EQ. (33) provides the wall thickness loss.

Transducer System

The following provides a detailed discussion of transducer system 201 which goes into further detail of how transducer system 201 functions. Returning to FIG. 1, the necessary quantity of transmit ultrasonic transducers 102 and receive ultrasonic transducers 106 may depend on a desired level of accuracy in the estimation of the wall thickness loss. Two governing parameters may be the aperture of transmit ultrasonic transducers 102 and the aperture of receive ultrasonic transducers 106 and also the spacing between neighboring transmit ultrasonic transducers 102 and receive ultrasonic transducers 106.

To satisfy Nyquist sampling criterion, the spacing should be half of the wavelength, λ, of the probing guided wave signal. Reducing the distance between transmit ultrasonic transducers 102 and/or receive ultrasonic transducers 106 below λ/2 does not yield additional information. On the other hand, transducer spacing above λ/2 can lead to information loss and possible artifacts. Conversely, the larger the aperture of transmit ultrasonic transducers 102 and receive ultrasonic transducers 106 the better the accuracy of the wall thickness estimation. Spacing transmit ultrasonic transducers 102 and/or receive ultrasonic transducers 106 by λ/2 apart may not be practical in many situations as it may require a vast number of transmit ultrasonic transducers 102 and/or receive ultrasonic transducers to populate pipe 101, therefore more sparse transmit ultrasonic transducers 102 and/or receive ultrasonic transducers 106 may be used at the cost of reduced accuracy.

The fixtures may be designed to be permanently installed for monitoring purposes or removable. In an embodiment, the fixtures for continuous monitoring include flexible metallic strips with a clamping mechanism at one end that allows the strip to be fastened around the pipe circumference. The strip carries metallic inserts that may be used to secure transmit ultrasonic transducers 102 and/or receive ultrasonic transducers 106 to the strip and hence to pipe 101.

In another embodiment, each fixture includes two rigid half-rings connected by one hinge at one end and by a clamping mechanism at the other end.

In order to simplify signal interpretation, transmit ultrasonic transducers 102 and/or receive ultrasonic transducers may be designed to excite and/or detect one single guided wave mode at a time. In an embodiment, transmit ultrasonic transducers 102 excite and detect the fundamental flexural mode $A_0$ while minimizing any spurious signal corresponding to the other modes that may propagate in the same frequency range, such as the $S_0$ mode. In another embodiment, the center frequency of the $A_0$ signal may be selected so that the frequency-thickness product is such that the $A_0$ mode group velocity is in the constant group velocity (CGV) region centered at the point of maximum group velocity of the $A_0$ mode. For steel, the frequency-thickness product corresponding to the CGV is $f-t \approx 1.4$ MHz-mm. At this point, the group velocity of $A_0$ is approximately constant and the attenuation due to liquid loading may be minimal. In another embodiment, the selective excitation of the $A_0$ mode may be achieved by means of an omni-directional EMAT optimized to yield a high $A_0/S_0$ sensitivity ratio. The omni-directional EMAT enables guided wave tomography using the $A_0$ mode without significant interference from signals due to the $S_0$ mode.

Returning to FIG. 4, FIG. 4 depicts conventional transmit transducer configuration 400. Conventional transmit transducer configuration 400 may be used for spot-by-spot wall thickness measurements. In the case of a standard transducer, a cylindrical permanent magnet or conventional cylindrical magnet 401 may be used to produce an essentially normal magnetic flux density $B_0$ 402 in pipe 101 located below the standard transducer. A conventional spiral coil 404 driven by an alternating current $I_c$ may be placed between the specimen and the magnet. The alternating magnetic field produced by this primary coil current generates a secondary eddy current in a thin surface layer of the specimen. The moving charge carriers included in the eddy current experience a Lorentz force acting normal to both the magnetic flux lines and the velocity direction of the moving charge carriers. This force gives radial momentum which is transferred to the lattice structure of the specimen via thermal collisions, resulting in radially polarized shear wave radiation normal to the specimen surface. When used for reception, the same principles enable the EMAT to convert an incident acoustic signal to an electrical signal across the coil terminals.

When transmitting, conventional transmit transducer configuration 400 as shown in FIG. 4 may generate axisymmetric tangential traction in the transducer's radial direction on the surface of an electrically conductive specimen. Returning to FIG. 3, FIG. 3 depicts an example wall 300 of pipe 101. On wall 300, surface traction may generate cylindrically diverging guided wave modes as illustrated schematically in FIG. 3. The amplitude ratio $A_0/S_0$ may be controlled within certain limits by changing the angle of inclination θ of the surface traction produced by the Lorentz force.

Figure 16:
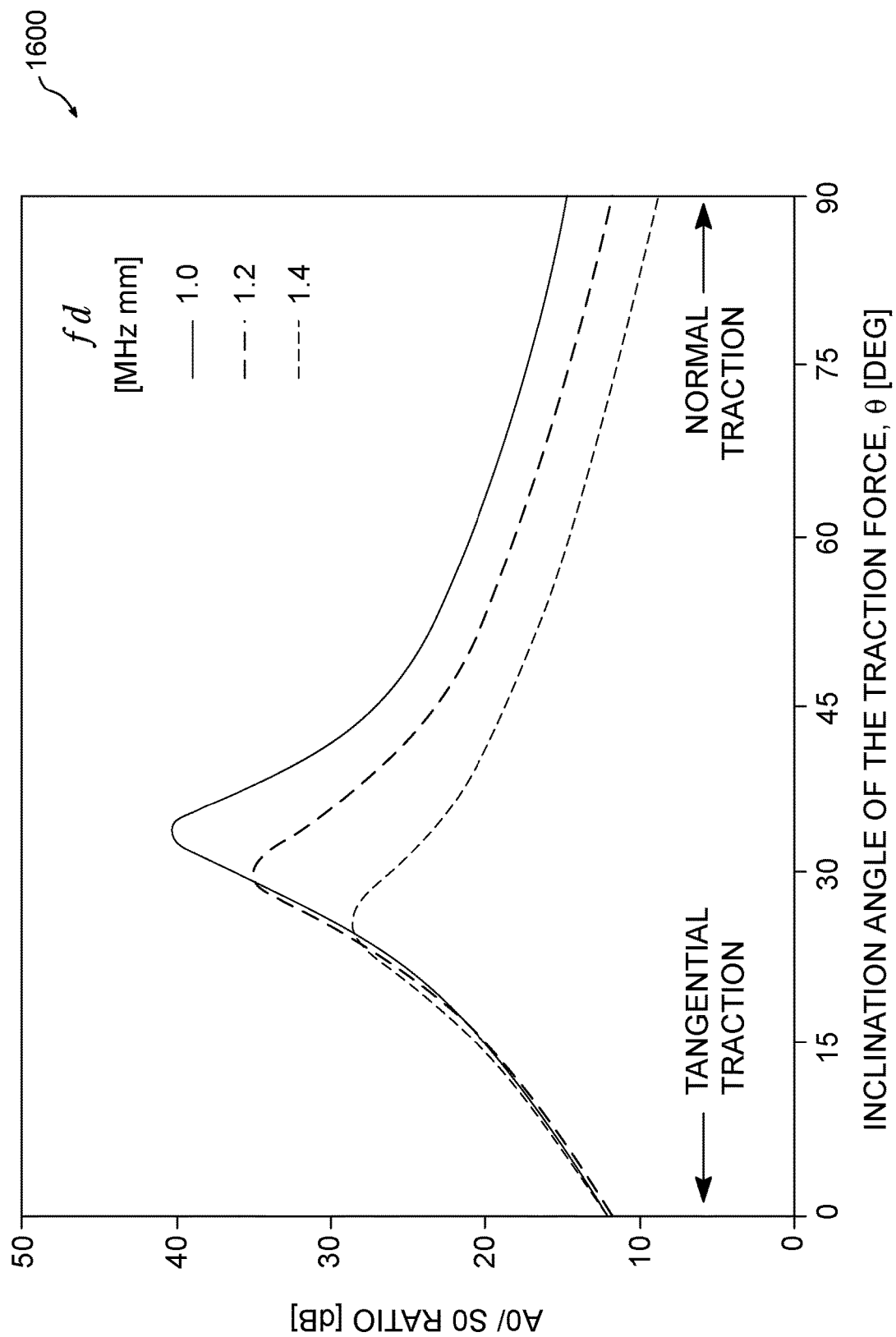
FIG. 16 depicts $A_0/S_0$ ratio, according to an embodiment.

FIG. 16 depicts $A_0/S_0$ ratio 1600. FIG. 16 depicts the $A_0/S_0$ ratio as a function of traction inclination angle in a steel plate for three different frequency-thickness products (density $\varrho = 7,900$ kg/m³, Young's modulus E=200 GPa, Poisson's ratio v=0.33). In this example, the outer diameter of the circular area subjected to traction was assumed equal to the plate thickness t. In the case of pure tangential traction (θ=0°) both the $S_0$ and $A_0$ modes may be generated due to the resulting in-plane extension and out-of-plane bending, respectively. When increasing the inclination angle, the $A_0/S_0$ ratio first increases because of stronger bending. Above an inclination angle of θ≈20°, the $A_0/S_0$ ratio may peak and then decrease. In this range, the $A_0/S_0$ ratio may decrease with plate thickness t because of the increasing flexural stiffness of the plate compared to its less affected in-plane stiffness.

Returning to FIGS. 5A and 5B, spacer magnetic flux concentrator 500 and spacer cone flux concentrator 550 may bend the Lorentz force so that the preferred mode is excited without exciting any unwanted modes. The Lorentz force is an electromagnetic force resulting from the interaction of the magnetic field emitted by cylindrical magnet 510, with the mirror current induced by the AC current flowing in coil 530. The Lorentz force pushes electrons that collide against the lattice of the metal of pipe 101 and induces guided ultrasonic waves 104. Small-diameter spacer magnet 520 and spacer cone 570 rotate the Lorentz force. FIG. 16 depicts the optimal angle to rotate the Lorentz force and achieve an optimal $A_0/S_0$ ratio 1600 where the $A_0$ mode amplitude is dominant relative to the $S_0$ mode amplitude, the optimal angle being about 30 degrees.

Control System

The following provides a detailed discussion of control system 202 which goes into further detail of how control system 202 functions. Control system 202 may be configured to generate electric signals that drive transmit ultrasonic transducers 102 included in transmit aperture 103 of transducer system 201 and receives and digitizes the signals detected by receive ultrasonic transducers 106 in receive aperture 107. For the purposes of discussing control system 202 in greater detail below, a quantity of transmit ultrasonic transducers 102 may be substantially equal to a quantity of receive ultrasonic transducers 106 for discussion purposes. However, the quantity of transmit ultrasonic transducers 102 may be different than the quantity of receive ultrasonic transducers 106 and/or any other quantity of transducers that will be apparent to those skilled in the relevant art(s) without departing from the spirit and scope of the present disclosure.

Figure 17:
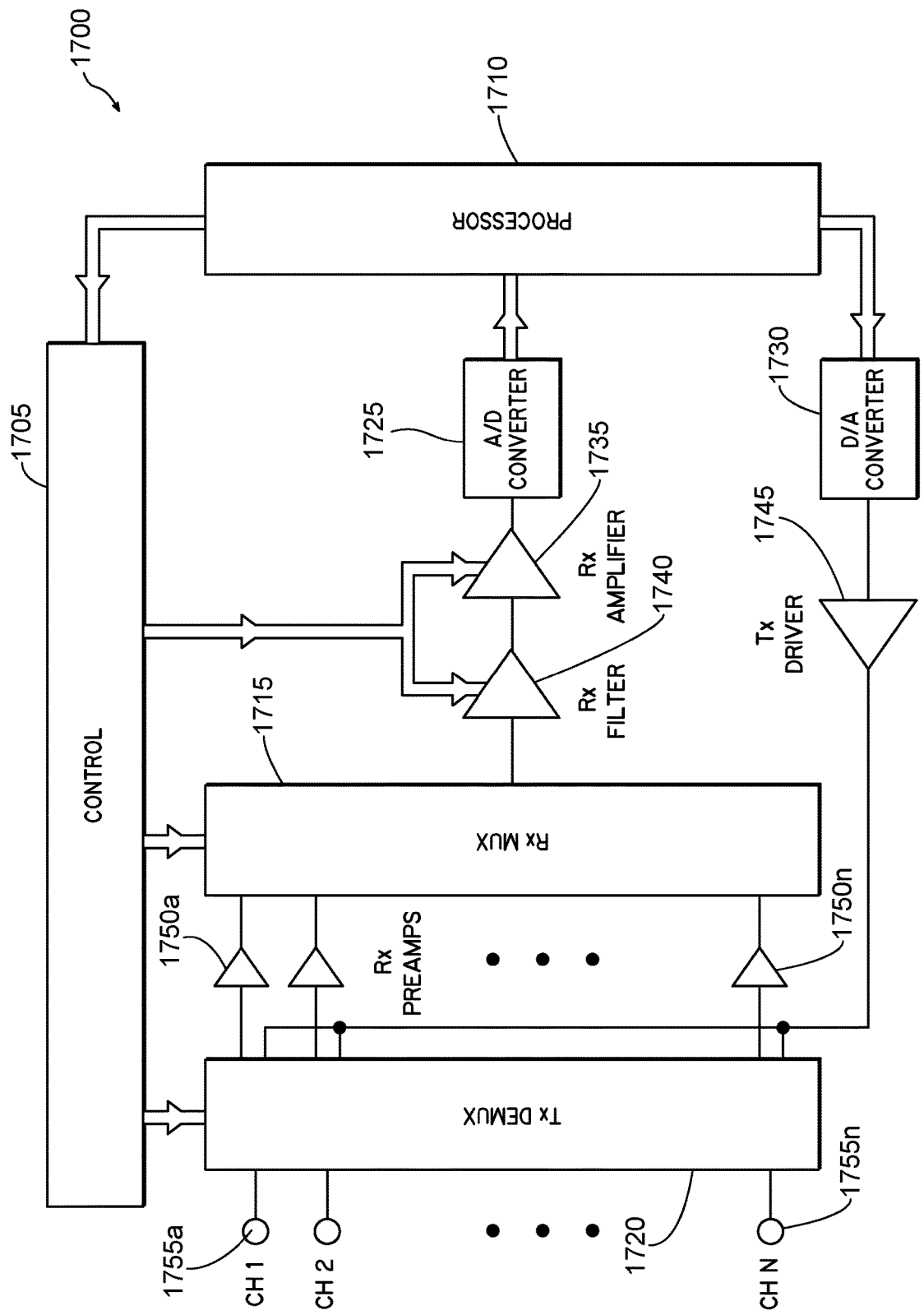
FIG. 17 depicts a first control system configuration, according to an embodiment.

FIG. 17 depicts a first control system configuration 1700. First control system configuration 1700 includes a controller 1705, a processor 1710, a receive multiplexor 1715, a transmit demultiplexor 1720, a single channel analog to digital (A/D) converter 1725, a digital to analog (D/A) converter 1730, a receive amplifier 1735, a receive filter 1740, a transmit driver 1745, a plurality of receive preamplifiers 1750a through 1750n, and a plurality of channels 1755a through 1755n.

Plurality of channels 1755a through 1755n may be processed sequentially. Processor 1710 and D/A converter 1730 form an arbitrary waveform generator (AWG). Based on selected inspection parameters, processor 1710 may calculate a numerical representation of the desired excitation waveform and D/A converter 1730 may transform this digital data into an analog signal. The AWG signal may then be amplified to a power level necessary for driving the transmitting EMAT to achieve sufficient signal-to-noise ratio (SNR) on the receiver side. For example, the AWG signal is amplified to a power level between 500 W and 5,000 W.

Transmit driver 1745 may also include an impedance matching network to maximize the electric power available for transduction in the transmitting EMAT. The transmitter demultiplexor 1720 may select the EMAT to be used as a transmitter and may pass through the signals of all other EMATs to each of their respective receive preamplifiers 1750a through 1750n which may also include impedance matching networks at their inputs to maximize the SNR. The outputs of receive preamplifiers 1750*a* through 1750*n* may then be sent to receive multiplexor 1715 that selects the input channel to be used for reception.

Due to the limited sensitivity of EMATs, the received signals may be weak. Parallel preamplification may be applied to the receive signals before the receive signals are multiplexed without degrading the SNR. For example, parallel preamplification of 30-50 dB is applied to the receive signals. The output of receive multiplexor 1715 may be filtered by programmable receive filter 1740 and further amplified by programmable receive amplifier 1735 before being digitized by single-channel A/D converter 1725. For example, digitization is executed at a 4 MHz sampling rate and 14-bit resolution to satisfy the stringent specifications required for guided wave tomography.

Figure 18:
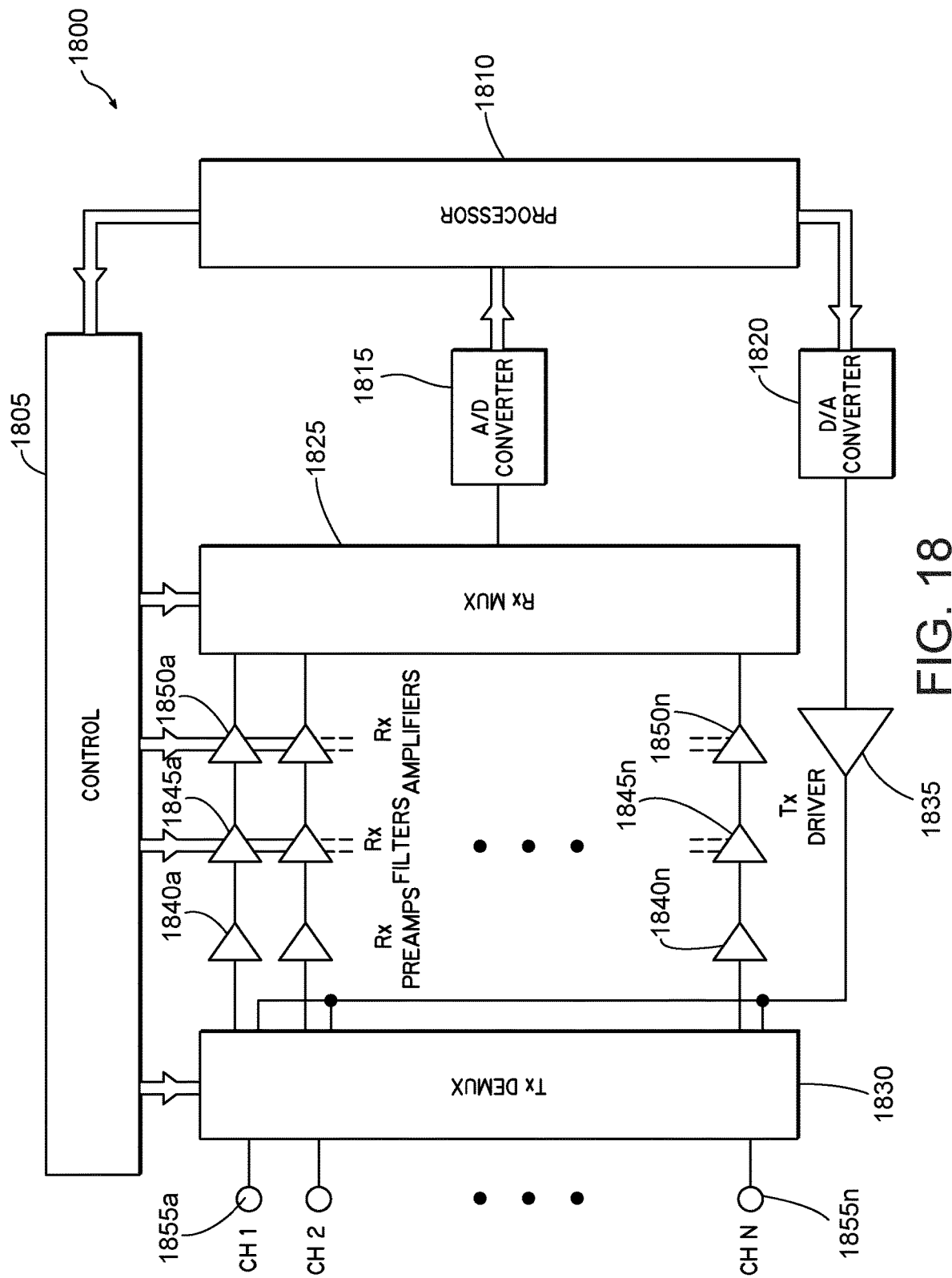
FIG. 18 depicts a second control system configuration, according to an embodiment.

FIG. 18 depicts a second control system configuration 1800. Second control system configuration 1800 includes a controller 1805, a processor 1810, a N-channel high-speed A/D converter 1815, an A/D multiplexor 1825, a transmit multiplexor 1830, a transmit driver 1835, a plurality of receive preamplifiers 1840*a* through 1840*n*, a plurality of receive filters 1845*a* through 1845*n*, a plurality of receive amplifiers 1850*a* through 1850*n*, and a plurality of channels 1855*a* through 1855*n*. Plurality of channels 1855*a* through 1855*n* may be processed in parallel. The signals from all EMATs may be passed through transmit multiplexor 1830 to their respective receive preamplifiers 1840*a* through 1840*n* followed by separate programmable receiving filters 1845*a* through 1845*n* and programmable receive amplifiers 1850*a* through 1850*n*. Each of the pre-processed analog signals may then be digitized by an N-channel high-speed A/D converter 1815 that may be shared by each of the channels 1855*a* through 1855*n* via A/D multiplexor 1825.

For example, the second control system configuration 1800 may digitize 16-32 channels at 100-500 MHz sampling rate and 14-bit resolution so that the effective sampling rate of each channel is 3-30 MHz. The parallel processing of second control system configuration 1800 may offer faster overall data acquisition than the sequential processing of first control system configuration 1700 at the expense of added electronics. However the faster overall data acquisition may be crucial for guided wave tomography that requires that no changes occur in the monitored structure before a complete data set is acquired. Alternatively, parallel processing may also be exploited for reaching higher SNR, and thereby higher measurement accuracy, through more extensive averaging of subsequent firings of the same transmitting EMAT.

Pre-Processing System

The following provides a detailed discussion of pre-processing system 203 which goes into further detail of how pre-processing system 203 functions. Digitized guided ultrasonic wave data 208 generated by control system 202 may be transferred to pre-processing system 203 to generate two-dimensional processed data 209 for inversion system 204. The generation of digitized guided ultrasonic wave data 208 requires the interpretation of digitized guided ultrasonic wave data 208 to extract information that is compatible with the 2-D equivalent model.

As discussed in detail above regarding FIGS. 7A, 7B, and 8, pre-processing system 203 may map the three-dimensional data generated by guided ultrasonic waves 104 into two-dimensional data by unwrapping the three-dimensional cylindrical aspects of pipe 101 into a two-dimensional rectangle. In doing so, pre-processing system 203 may generate a parametric representation of the surface for the three-dimensional cylinder of pipe 101. Based on the parametric representation, pre-processing system 203 may sweep the surface for the three-dimensional cylinder of pipe 101 and unwrap the three-dimensional surface to generate the two-dimensional rectangle.

However, generating the parametric representation when there is a bend in pipe 101 becomes more difficult. Pre-processing system 203 may generate the two-dimensional rectangle that represents the three-dimensional cylinder of pipe 101 in an anisotropic medium when encountering a bend in pipe 101. The anisotropic medium is where the speed of sound differs in direction rather than being in the same direction. Pre-processing system 203 may generate an elliptically anisotropic wave field to model the bend in pipe 101. As a result, pre-processing system 203 may generate an orthogonal parameterization for a bend in pipe 101.

Figure 19:
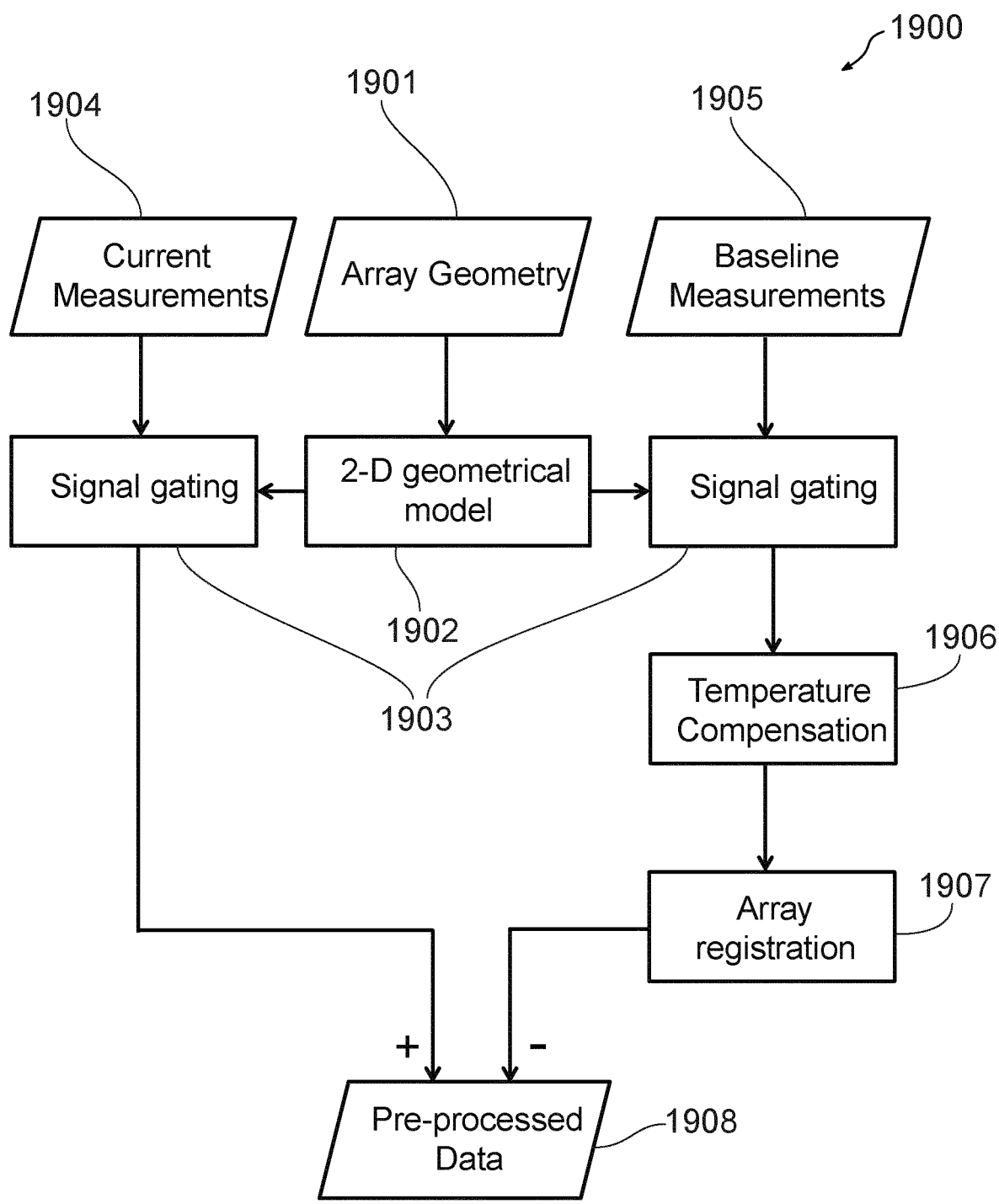
FIG. 19 depicts a pre-processing configuration, according to an embodiment.

FIG. 19 depicts a pre-processing configuration 1900. Pre-processing configuration 1900 includes array geometry 1901, a 2-D geometrical model 1902, a signal gating 1903, a current measurement 1904, a baseline measurement 1905, temperature compensation 1906, a geometrical array registration 1907, and a pre-processed data 1908. Pre-processing configuration 1900 may generate 2-D geometrical model 1902 from the true array configuration in the 3-D space 1901 using the mapping in EQ. (1) with arc-length parameterization and satisfying the orthogonality condition in EQ. (4), thus producing the coordinates of the virtual transmit and receive arrays consisting of $N'=N\times(m_{max}+1)$ and $M'=M\times(m_{max}+1)$ transducers, respectively. Signal gating 1903 may then be applied to the current measurements 1904 and the baseline measurements 1905.

In an embodiment, baseline measurements 1905 are the N×M signals measured using transmit aperture 103 and receive aperture 107 on the same structure, such as pipe 101 and/or on a calibration structure. In continuous monitoring the baseline signals may be measured immediately after transmit aperture 103 and receive aperture 107 are installed on pipe 101. For applications in which transmit aperture 103 and receive aperture 107 are not permanently mounted, baseline measurements 1905 may be measured in a portion of pipe 101 with known thickness distribution or on separate structure with the same geometrical and material characteristics hereafter referred to as the calibration structure. Current measurements 1904 are the N×M signals measured during the inspection of the structure. Temperature compensation 1906 and geometrical array registration 1907 may be applied to baseline measurements 1905 to ensure that baseline measurements 1905 are consistent with current measurements 1904. Current measurements 1904 and compensated baseline measurements 1905 may be compared to produce pre-processed data 1908.

Signal gating 1903 may be based on calculations of the time required by a guided wave signal to travel from a transmit ultrasonic transducer 102 $T_i$ to a receive ultrasonic transducer 106 $R_j$ along a direct path or multiple wrapping paths around pipe 101 according to the formula in EQ. (29) or calculated using ray tracing methods in the case of curved pipe sections. The arrival time provided by EQ. (29) (or ray tracing) may be used to center the position of a window that has a temporal duration inversely proportional to the bandwidth of the signal. The window may be used to extract a wave packet corresponding to a selected wave path on a surface of the structure.

Figure 20A:
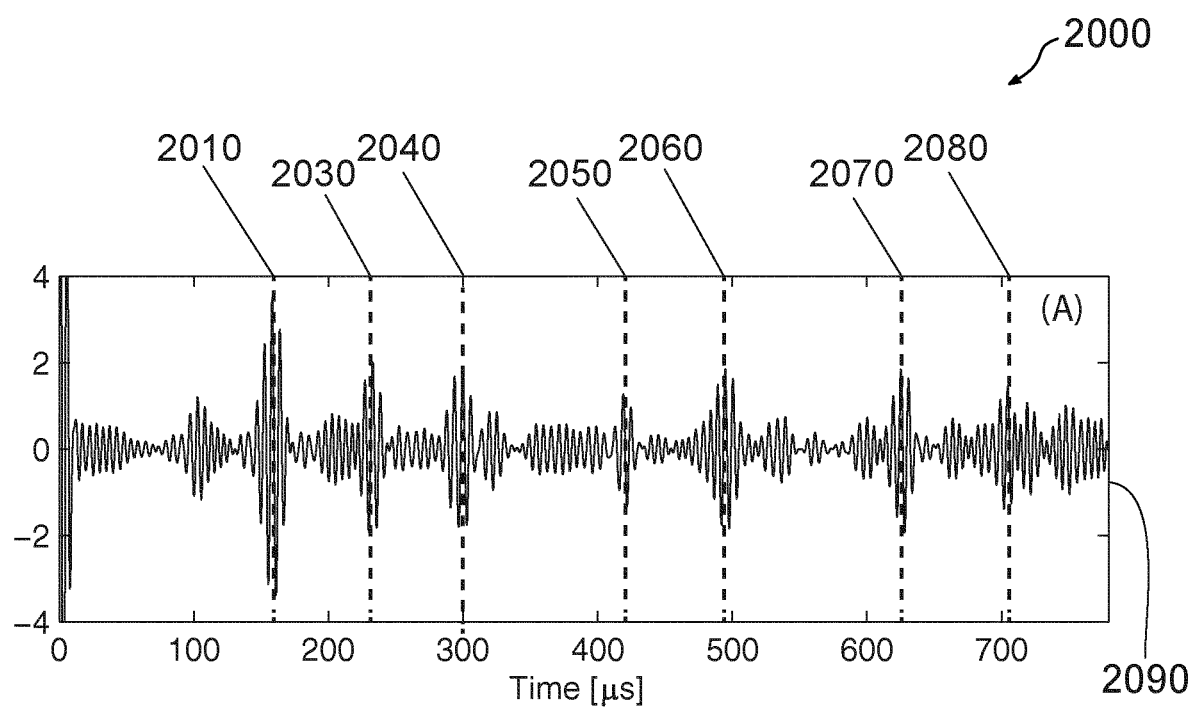
FIG. 20A depicts a windowing configuration, according to an embodiment.
Figure 20B:
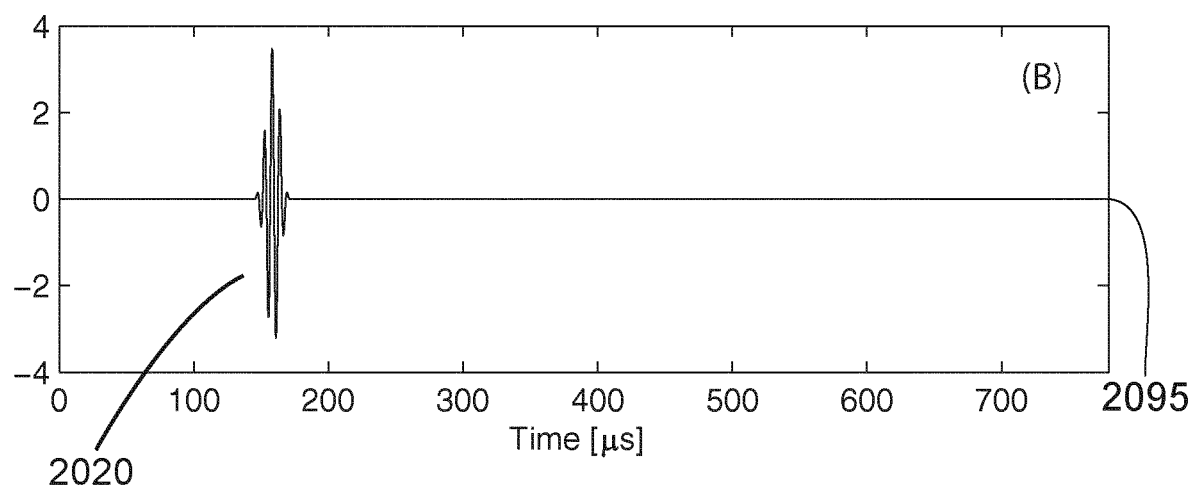
FIG. 20B depicts a Hann windowing configuration that may be centered around the dashed line to gate the signal and return a single wave packet, according to an embodiment.
Figure 21:
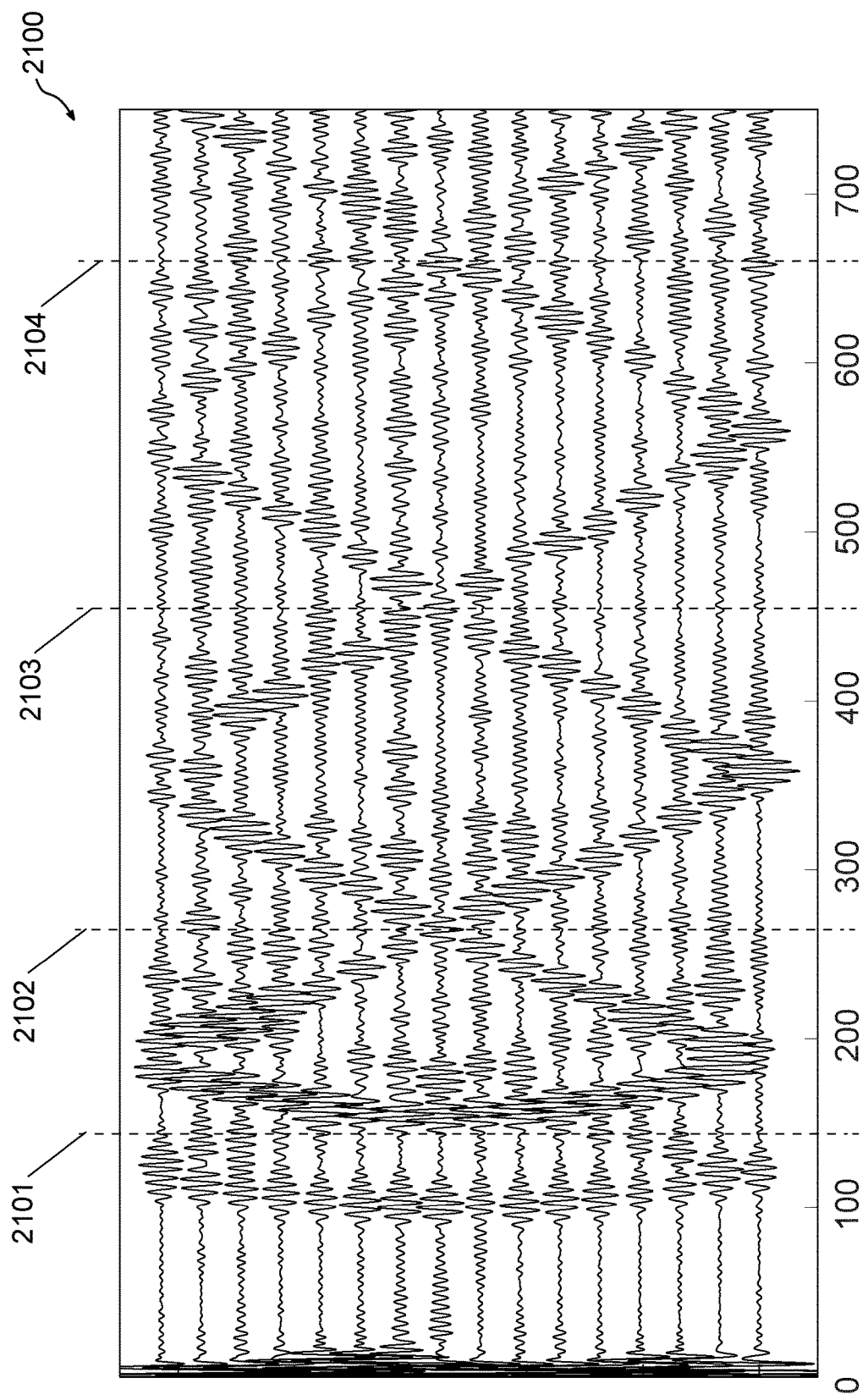
FIG. 21 depicts a signal configuration, according to an embodiment.

FIG. 20A depicts a windowing configuration 2000. Windowing may be performed according to windowing configuration 2000. Signal 2090 may be measured with the experimental setup shown in FIG. 20 and is obtained with one pair of transmit and receive transducers. A dashed line 2010 indicates the arrival time of the $A_0$ mode at 180 kHz calculated through EQ. (29) for m=0. FIG. 20B depicts a Hann windowing configuration 2095 may be centered around the dashed line to gate the signal and return a single wave packet 2020. Windowing configuration 2000 depicts a pipe with multiple arrivals 2030 through 2080. Multiple arrivals 2030 through 2080 correspond to $A_0$ performing multiple turns around the pipe. Multiple arrivals 2030 through 2080 may be extracted using a substantially similar windowing procedure as used for single wave packet 2020 and calculating the arrival times corresponding to different path lengths through EQ. (29).

For example, signal configuration 2100 depicts signals received by each of the sixteen transducers of transmit ultrasonic transducers 102 in FIG. 1. The arrival times of $A_0$ corresponding to m=0 fall between a first time 2101 and a second time 2102, the arrivals for m=±1 are in second time 2102 and interval 2103 and those for m=±2 are in the interval 2103 and current measurements 2104.

Figure 22:
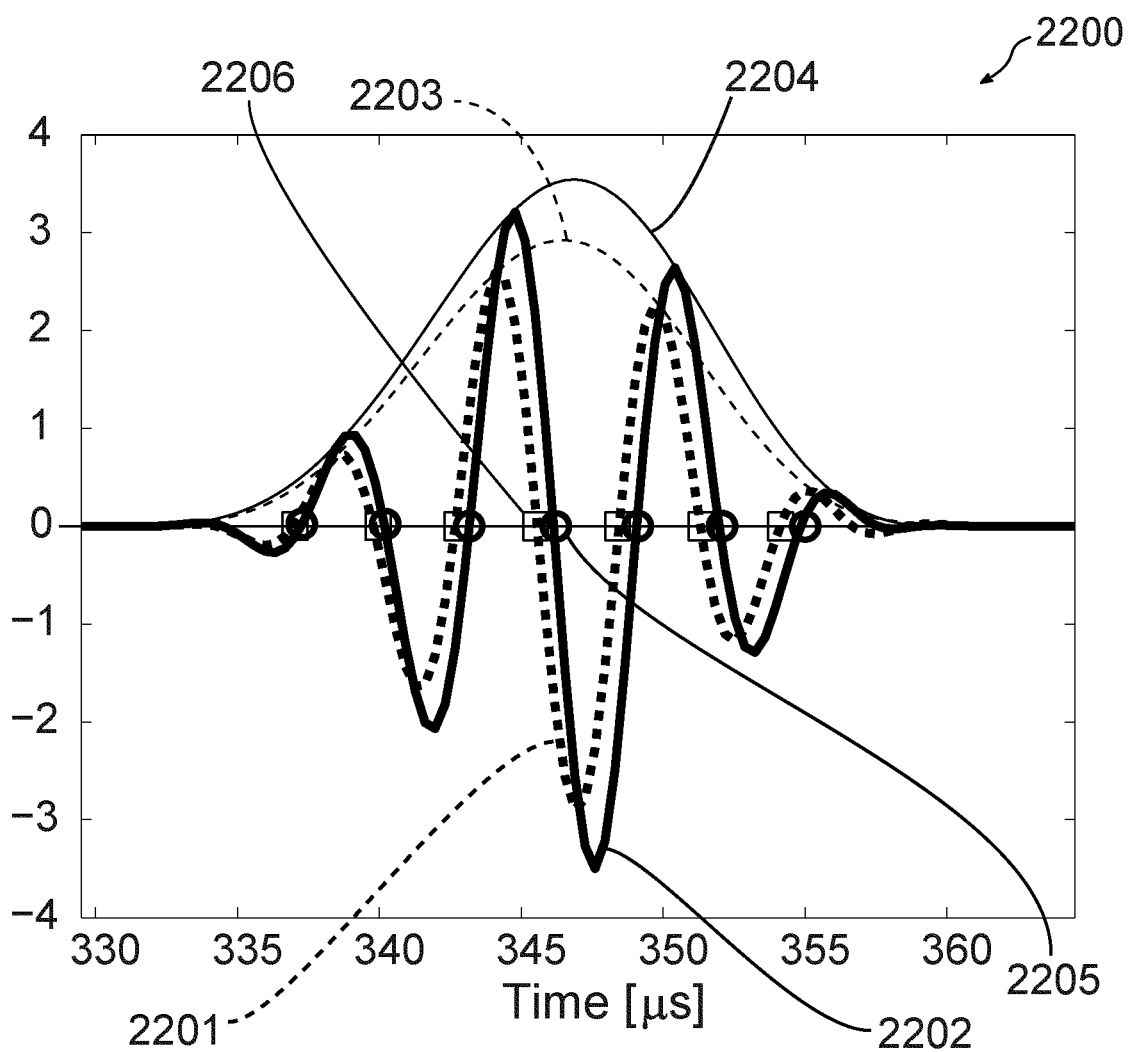
FIG. 22 depicts zero-crossing configuration, according to an embodiment.

The changes between the current measurements 2104 and baseline measurements 2105 may be used to reconstruct the wall thickness loss map. The arrival time difference between current measurements 2104 and baseline measurements 2105 may be measured for all the N×M signals and for multiple paths around the structure. FIG. 22 depicts zero-crossing configuration 2200. Zero-crossing configuration 2200 includes baseline signal 2201, current signal 2202, signals 2203, and envelopes 2204. Zero crossings may be defined as the points in time where the wave packet intersects the time axis, such as at current signal 2205 and baseline signal 2206. To estimate the arrival time difference, the zero-crossing point of baseline signal 2206 may be subtracted from the corresponding zero crossing of the current signal 2205.

In an embodiment, the zero crossings of current signal 2205 may be mapped to the zero crossings of baseline signal 2206 by considering their position relative to a reference point in envelope 2204, such as the envelope peak. When using the $A_0$ mode around the CGV point, the envelope 2204 of signal 2203 does not shift even in the presence of wall thickness loss and therefore the mapping may be carried out considering absolute points in time. The arrival time difference may be measured by considering a single zero crossing per signal and/or a set of them. Regarding the set of zero crossings per signal, the average zero crossing may be defined as the weighted average $$\bar{\tau} = \frac{\sum_{i=1}^{l} W_i \tau_i}{\sum_{i=1}^{l} W_i}, \tag{34}$$

where l is the number of zero-crossing points per signal and $W_i$ are the weights associated to each zero crossing $\tau_i$.

In another embodiment, the weight $W_i$ may be substantially equal to the amplitude of envelope 2204 at time $\tau_i$. The arrival time difference may then be obtained by subtracting the average zero crossing of baseline signal 2206 from the average zero-crossing of the current signal 2205.

In another embodiment, the arrival time difference may be obtained using the complex phase of the signals. Letting $s_b(t)$ and $s_c(t)$ be the baseline signal 2206 and the current signal 2205 after windowing and generating $S_b(\omega)$ and $S_c(\omega)$ from their Fourier transforms respectively, the difference between the arrival time of the current signal, $\tau_c$, and that of the baseline signal, $\tau_b$, is $$\tau_c - \tau_b = \frac{\angle S_c(\omega) - \angle S_b(\omega)}{\omega}, \tag{35}$$

where $\angle S_c(\omega)$ and $\angle S_b(\omega)$ are the unwrapped phases of $S_b(\omega)$ and $S_c(\omega)$, and $\omega$ is the angular frequency, $\omega=2\pi f$.

In another embodiment, the arrival time difference may be calculated using the true phase angle, Φ, determined from the measured signal according to the method described in G. Instanes, A. Pedersen, M. Toppe, and P. B. Nagy, "Constant group velocity ultrasonic guided wave inspection for corrosion and erosion monitoring in pipes," in *Review of Progress in Quantitative Nondestructive Evaluation*, 2009, vol. 1096, pp. 1386-1393 which is incorporated by reference in its entirety. The true phase angle is related to the arrival time of the group, $\tau^g$, and that of the phase, $\tau^p$, of the signal according to $$\Phi = \omega(\tau^g - \tau^p), \tag{36}$$

which may be used to express the difference between the arrival time of the phase of the current signal $\tau_c^p$ and the baseline signals $\tau_b^p$ as $$\tau_c^p - \tau_b^p = \tau_c^g - \tau_b^g - \frac{\Phi_c - \Phi_b}{\omega}. \tag{37}$$

For the $A_0$ mode the difference in arrival times of the group, $\tau_c^g - \tau_b^g$ may be negligible compared to the difference in arrival times of the phase, $\tau_c^p - \tau_b^p$, and therefore the latter may be determined from the difference of the measured true phase, $\Phi_c - \Phi_b$, as $$\tau_c^p - \tau_b^p \approx -\frac{\Phi_c - \Phi_b}{\omega}.$$

In another embodiment, the arrival time difference may be calculated using a cross-correlation method. This may be achieved by computing the cross-correlation function, R(Δ)

$$R(\Delta) = \int s_c(t) s_b(t+\Delta) dt, \tag{39}$$

and choosing as the arrival time difference, the value of Δ for which R(Δ) has an absolute maximum.

Figure 23:
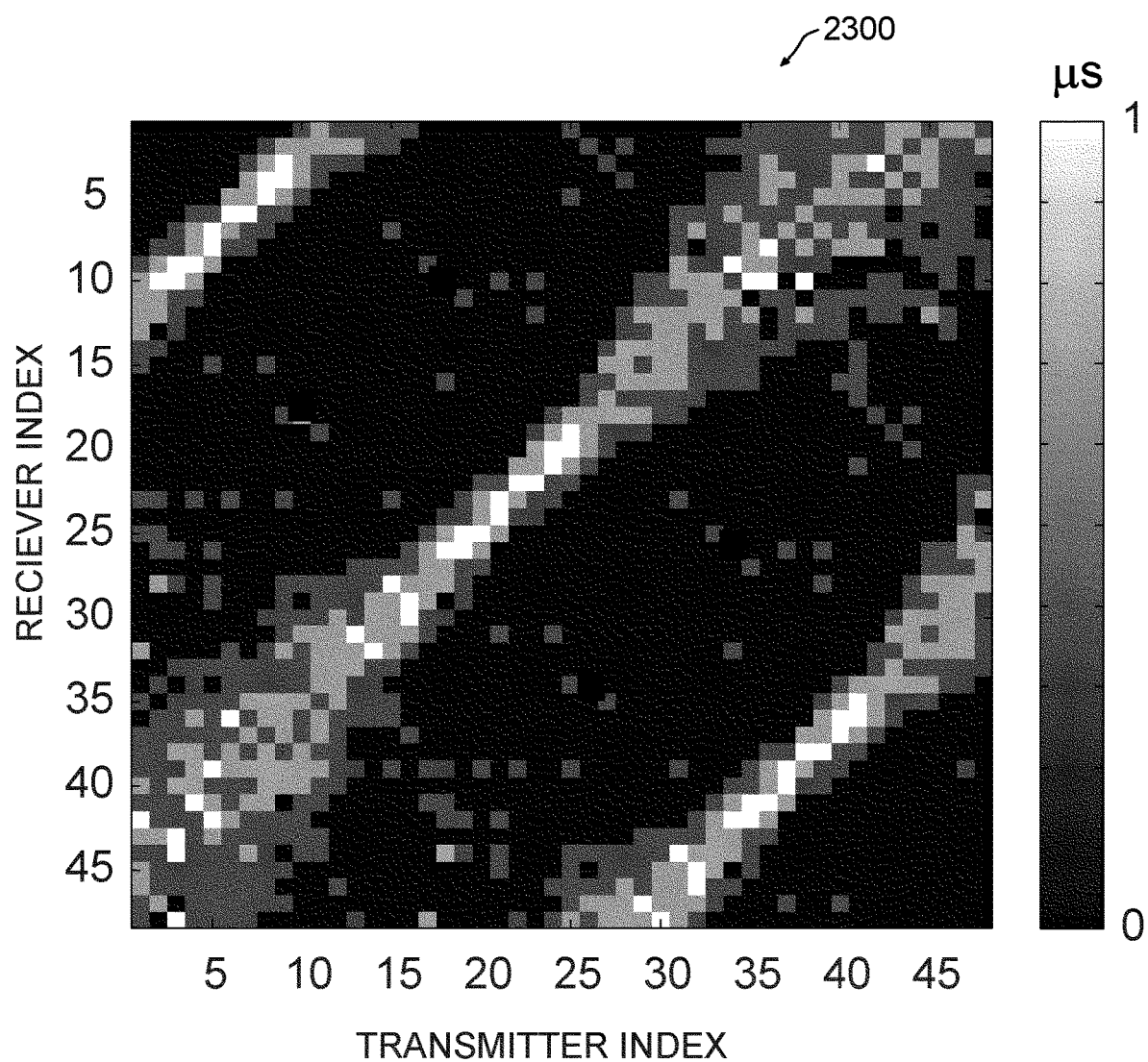
FIG. 23 depicts an arrival time configuration, according to an embodiment.

Each of embodiments for the estimation of the arrival time difference, target the phase of the guided wave signal and therefore are dependent on the phase velocity of the signal rather than its group velocity. FIG. 23 depicts an arrival time configuration 2300. Arrival time configuration 2300 refers to first control system configuration 1700 in FIG. 17 where an irregular wall thickness loss distribution with maximum depth equal to 10% of the wall thickness was introduced. The data is formatted according to a matrix whose j-i entry is the arrival time difference obtained when transmitting with an i-th transmit ultrasonic transducer 102 and receiving with a j-th receive ultrasonic transducer 106. Transmit ultrasonic transducers 102 and receive ultrasonic transducers 106 may be extended arrays obtained using $m_{max}$ replicas as shown in FIG. 8.

Arrival time configuration 2300 was generated with sixteen transmit ultrasonic transducers 102 and sixteen receive ultrasonic transducers 106. The paths around pipe 101 are helixes and the arrival time difference matrix in FIG. 23 is formed using paths that make up to two full turns around pipe 101, i.e. m∈{−2, −1, 0, 1, 2}. As a result, transmit ultrasonic transducers 102 and receive ultrasonic transducers 106 each contain forty-eight ultrasonic transducers leading to a 48×48 matrix of arrival time differences.

In addition to the arrival time differences, pre-processing configuration 1900 outputs the spectra of the windowed signals. At each frequency the complex value of the spectrum corresponding to the signal traveling from the i-th transmit ultrasonic transducer 102 to the j-th receive ultrasonic transducer 106 is stored in the j-i th entry of a complex matrix referred to as the multistatic matrix. Two multistatic matrices are formed considering the current and baseline signals separately, leading to matrices $K^c$ and $K^b$, respectively. In one embodiment, pre-processing system 203 output a normalized matrix, $K^N$ defined as $$K_{ji}^N = \frac{K_{ji}^c}{K_{ji}^b}. \tag{40}$$

In another embodiment, the pre-processing system 203 outputs the difference between the current and baseline multistatic matrices, and/or solely the current multistatic matrix.

Temperature Compensation

The changes between current signal 2202 and baseline signal 2206 represent two-dimensional processed data 209 for inversion system 204. For accurate wall thickness loss mapping, changes in signal due to the wall loss is distinguished from changes in the signal due to other benign factors, such as temperature variations. For example, an increase in temperature in metals causes a decrease in the ultrasonic bulk longitudinal and shear velocities at a rate of about 1 m sec$^{-1}$° C.$^{-1}$. As a result, temperature variations alter the phase and group velocity of Lamb waves in a frequency dependent fashion. The temperature variations also affect the arrival time difference estimation when the temperature of the structure varies between current signal 2205 measurements and baseline signal 2206 measurement. Temperature compensation may be required to eliminate this effect from the measurements.

In an embodiment, temperature compensation may correct baseline signal 2206 measurements to match the temperature of current signal 2205 measurements. Let $\tau^b(\Theta_b)$ be the matrix of absolute arrival times obtained from baseline signal 2206 measurements at temperature $\iota_b$ and $\tau^c(\Theta_c)$ with the matrix of absolute arrival times obtained from current signal 2206 measurements at temperature $\Theta_c$. In general, $\tau^c(\Theta_c)$ may be measured in the presence of wall thickness loss. Defining $\Delta c_M(f)$ as the phase velocity change due to the temperature difference $\Theta_c - \Theta_b$, the j–i entry of the baseline arrival time matrix at temperature $\Theta_c$ is $$\tau_{ji}^b(\Theta_c) = \tau_{ji}^b(\Theta_b) - \frac{D_{ji} \Delta c_M(f)}{c_M^b(f)[\Delta c_M(f) + c_M^b(f)]}, \tag{41}$$

where $D_{ji}$ is the distance between the i-th transducer of the virtual transmit array and the j-th transducer of the virtual receive array, and $c_M^b(f)$ s the phase velocity at the temperature of the baseline measurements—assumed to be known.

In another embodiment, $\Delta c_M(f)$, may be calculated by minimizing the residual between $\tau^c(\Theta_c)$ and $\tau^b(\Theta_c)$. This may be achieved by omitting the frequency dependence and through a least squares criterion based on the minimization the cost function $$E(\Delta c_M) = \sum_{i=1}^{N'} \sum_{j=1}^{M'} w_{ji} \left[ \tau_{ji}^c(\Theta_c) - \tau_{ji}^b(\Theta_b) + \frac{D_{ji} \Delta c_M}{c_M^b(\Delta c_M + c_M^b)} \right]^2, \tag{42}$$

where N' and M' are the number of transducers in the virtual transmit and receive arrays, respectively and $w_{ij}$ are weights chosen to reduce or exclude the contribution of some measurements. The value of $\Delta c_M$ resulting in a global minimum for the cost function E, $\Delta c_M^\dagger$, provides the best estimate for the change in phase velocity between the current and baseline temperatures, i. e.

$$\Delta c_M^\dagger = \arg \min_{\Delta c_M} E(\Delta c_M). \tag{43}$$

The temperature compensated arrival time difference matrix is then $$\Delta \tau_{ji} = \tau_{ji}^c(\Theta_c) - \tau_{ji}^b(\Theta_b) + \frac{D_{ji} \Delta c_M^\dagger}{c_M^b(\Delta c_M^\dagger + c_M^b)}. \tag{44}$$

In another embodiment, the temperature of the structure may be recorded during baseline signal 2206 measurements and current signal 2205 measurements. To estimate the value of $\Delta c_M^\dagger$, the bulk shear and longitudinal velocities are obtained at temperatures $\Theta_c$ and $\Theta_b$ from tabulated values. The set of bulk ultrasonic velocities at temperature $\Theta_b$ is substituted into the Rayleigh-Lamb dispersion equation to obtain the phase velocity at temperature $\Theta_b$ and frequency f, $c_M(f, \Theta_b)$. Similarly, the set of bulk ultrasonic velocities at temperature $\Theta_c$ is substituted in the Rayleigh-Lamb dispersion equation to obtain the phase velocity at temperature $\Theta_c$ and frequency f, $c_M(f, \Theta_c)$. The phase velocity variation is then given by $$\Delta c_M^\dagger(f, \Theta_b, \Theta_c) = c_M(f, \Theta_c) - c_M(f, \Theta_b). \tag{45}$$

The temperature compensated arrival time difference matrix is obtained by substituting this value into EQ. (44).

Array Geometrical Registration

In an embodiment, transmit ultrasonic transducers 102 and receive ultrasonic transducers 106 may not be permanently installed onto pipe 101 and the relative position of transmit ultrasonic transducers 102 and receive ultrasonic transducers 106 may be different from that used during baseline signal 2206 measurements and current signal 2205 measurements. These changes cause the arrival times of current signals 2205 to be different from those of baseline signals 2206. The objective of array geometrical registration may be to adjust the arrival times of baseline signal 2206 measurements and current signal 2206 measurements to the relative configuration of receive ultrasonic transducers 106 and transmit ultrasonic transducers 102 during current signal 2205 measurements.

Figure 24:
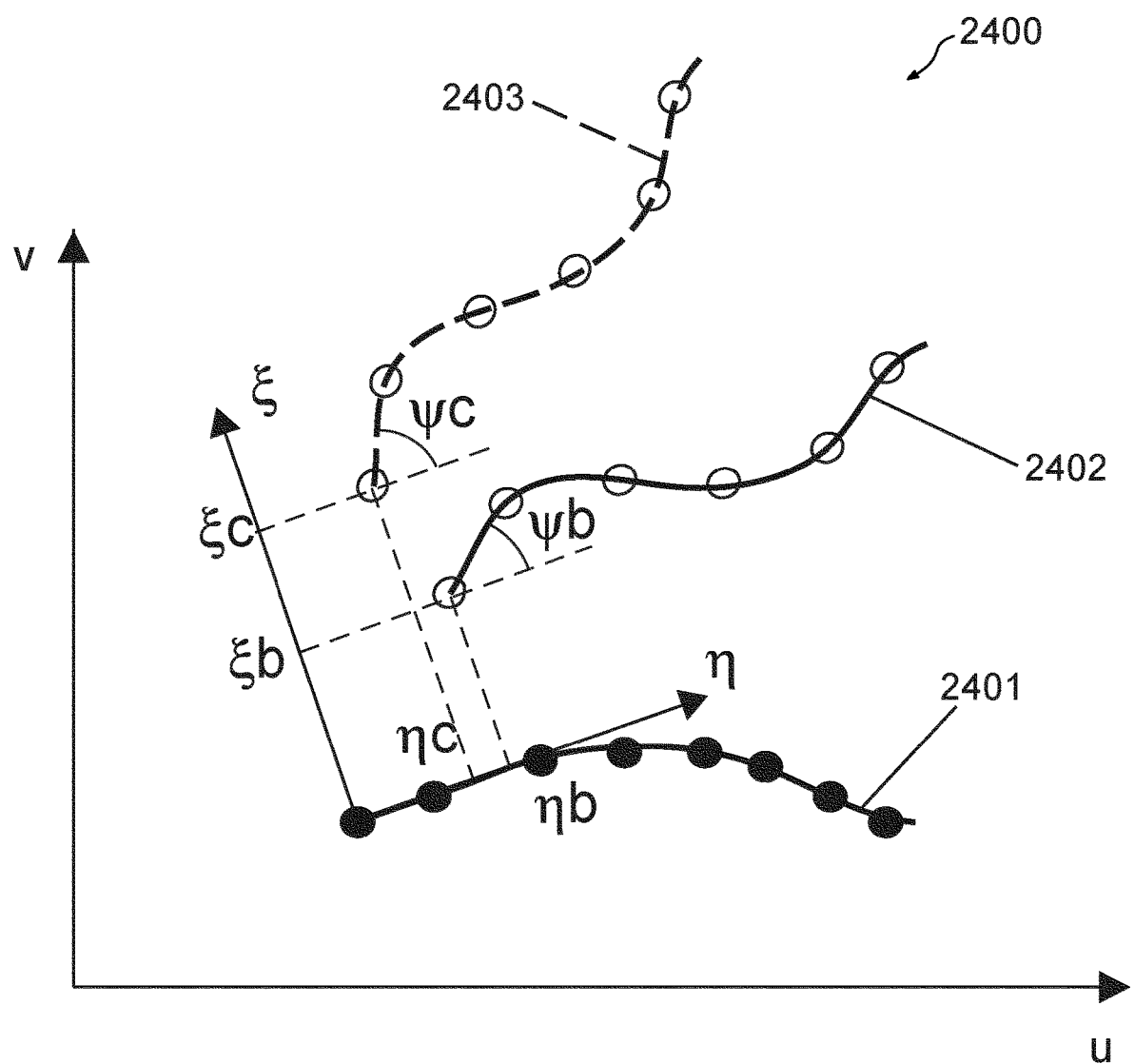
FIG. 24 depicts an array geometrical registration configuration, according to an embodiment.

First the case in which no temperature variations between baseline signal 2206 and current signal 2205 measurements may be considered. FIG. 24 depicts an array geometrical registration configuration 2400. The position of receive array 2402 relative to the position of transmit array 2401 may be determined by three degrees of freedom in the 2-D equivalent model.

For example, the coordinates of one ultrasonic transducer and one angle is shown in FIG. 24. Let $\xi_b$, $\eta_b$, and $\psi_b$ be the degrees of freedom describing the position of receive array 2402 relative to transmit array 2401 during baseline signal 2206 measurements and $\xi_c$, $\eta_c$, and $\psi_c$ with the parameters describing the position of receive array 2402 during current measurements 2403. The path length from i-th ultrasonic transducer of virtual transmit array 2401 to j-th ultrasonic transducer of virtual receive array 2402 is a known function of the three degrees of freedom $$D_{ji} = D_{ji}(\xi, \eta, \psi). \tag{46}$$

Let $\tau^b(\xi_b, \eta_b, \psi_b)$ be the matrix of absolute arrival times measured in the baseline configuration. The arrival time matrix of baseline signals 2206 adjusted to the current configuration, $\tau^b(\xi_c, \eta_c, \psi_c)$, is $$\tau^b_{ji}(\xi_c, \eta_c, \psi_c) = \tau^b_{ji}(\xi_b, \eta_b, \psi_b) + \frac{D_{ji}(\xi_c, \eta_c, \psi_c) - D_{ji}(\xi_b, \eta_b, \psi_b)}{c_M}, \tag{47}$$

where the frequency dependence has been omitted to simplify the notation.

In an embodiment, the parameters of the current configuration $\xi_c$, $\eta_c$, $\psi_c$ are obtained by considering the residual between the adjusted baseline arrival times and the measured arrival times in the current configuration, $\tau^c_{ji}(\xi_c, \eta_c, \psi_c)$, according to a least squares criterion. For this purpose, the cost function is defined as $$H(\xi_c, \eta_c, \psi_c) = \sum_{i=1}^{N'} \sum_{j=1}^{M'} w_{ji} [\tau^c_{ji}(\xi_c, \eta_c, \psi_c) - \tau^b_{ji}(\xi_c, \eta_c, \psi_c)]^2, \tag{48}$$

where N' and M' are the number of transducers in virtual transmit array 2401 and receive array 2402, respectively and $w_{ji}$ are the weights defined earlier for the cost function in EQ. (42). The optimal values of the parameters that minimize the cost function $\xi_c^\dagger$, $\eta_c^\dagger$, $\psi_c^\dagger$, correspond to the global minimum of H(•), according to $$[\xi_c^\dagger, \eta_c^\dagger, \psi_c^\dagger] = \arg \min_{\xi_c, \eta_c, \psi_c} H(\xi_c, \eta_c, \psi_c). \tag{49}$$

In another embodiment, $\xi_c^\dagger$, $\eta_c^\dagger$, $\psi_c^\dagger$ are measured directly on pipe 101. In both cases, the adjusted matrix of the baseline arrival times is the obtained by substituting the values of $\xi_c$, $\eta_c$, $\psi_c$ on the right-hand side of EQ. (47) with $\xi_c^\dagger$, $\eta_c^\dagger$, $\psi_c^\dagger$.

In an embodiment temperature compensation and array registration may be performed simultaneously. The adjusted matrix of baseline arrival times for the current configuration and temperature $\tau^b(\xi_c, \eta_c, \psi_c, \Theta_c)$ is $$\tau^b_{ji}(\xi_c, \eta_c, \psi_c, \Theta_c) = \tau^b_{ji}(\xi_b, \eta_b, \psi_b, \Theta_b) + \tag{50}$$
$$\frac{D_{ji}(\xi_c, \eta_c, \psi_c) - D_{ji}(\xi_b, \eta_b, \psi_b)}{c_M^b + \Delta c_M} - \frac{D_{ji}(\xi_b, \eta_b, \psi_b) \Delta c_M}{c_M^b (c_M^b + \Delta c_M)}.$$

In another embodiment, the parameters of the current configuration $\xi_c$, $\eta_c$, $\psi_c$, and the phase velocity change $\Delta c_M$ may be obtained by considering the residual between the adjusted baseline arrival times and the measured arrival times in the current configuration, $\tau^c_{ji}(\xi_c, \eta_c, \psi_c, \Theta_c)$, according to a least squares criterion. For this purpose, the cost function is defined as $$I(\xi_c, \eta_c, \psi_c, \Delta c_M) = \tag{51}$$
$$\sum_{i=1}^{N'} \sum_{j=1}^{M'} w_{ji} [\tau^c_{ji}(\xi_c, \eta_c, \psi_c, \Theta_c) - \tau^b_{ji}(\xi_c, \eta_c, \psi_c, , \Theta_c)]^2,$$

where N' and M' are the number of transducers in virtual transmit array 2401 and receive array 2402, respectively and $w_{ji}$ are the weights defined earlier for the cost function in EQ. (42). The optimal values of the parameters that minimize the cost function $\xi_c^\dagger$, $\eta_c^\dagger$, $\psi_c^\dagger$, $\Delta c_M^\dagger$, correspond to the global minimum of I(•), according to $$[\xi_c^\dagger, \eta_c^\dagger, \psi_c^\dagger, \Delta c_M^\dagger] = \arg \min_{\xi_c, \eta_c, \psi_c, \Delta c_M} I(\xi_c, \eta_c, \psi_c, \Delta c_M). \tag{52}$$

In another embodiment, the values of $\xi_c^\dagger$, $\eta_c^\dagger$, $\psi_c^\dagger$ are measured directly on the structure and $\Delta c_M$ may be obtained from the measured temperature variation through EQ. (45). The values of $\xi_c^\dagger$, $\eta_c^\dagger$, $\psi_c^\dagger$, and $\Delta c_M^\dagger$, are substituted into EQ. (50) to obtain the corrected baseline.

Inversion System

The following provides a detailed discussion of inversion system 204 which goes into further detail of how inversion system 204 functions. Two-dimensional processed data 209 from pre-processing system 203 may be further processed by inversion system 204 to obtain a map of residual thickness distribution. The inversion of two-dimensional processed data 209 may be based on the 2-D equivalent model and is aimed at reconstructing the distribution of phase velocity across the surface of pipe 101 for the selected guided mode and at the selected frequency. To represent the velocity map and other field functions, the 2-D equivalent domain may be discretized using a regular grid of points with the values of the field functions given at the nodes of the grid. The field functions may be represented in the format of an image in which each pixel corresponds to a node of the grid.

Figure 25:
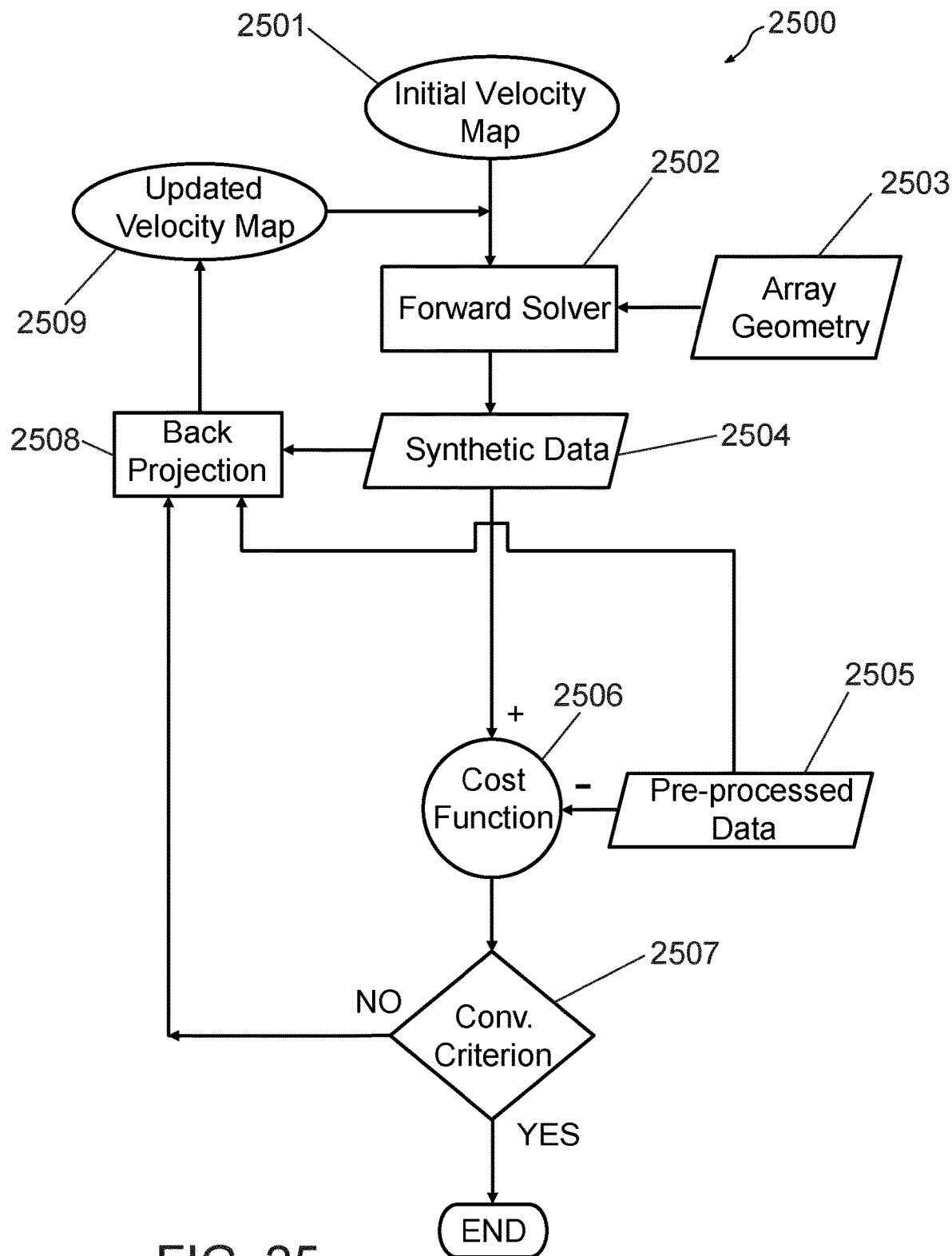
FIG. 25 depicts a nonlinear inversion system that inverts data, according to an embodiment.

FIG. 25 depicts a first nonlinear inversion system 2500 that inverts two-dimensional processed data 209. First nonlinear inversion system 2500 includes an initial velocity map 2501, forward solver 2502, virtual array geometry 2503, synthetic data 2504, pre-processed data 2505, cost function 2506, convergence criterion 2507, back projection 2508, and updated velocity map 2509.

An initial guess for phase velocity map $c_M(u, v)$ 2501 may be passed to forward solver 2502 that uses phase velocity map 2501 in conjunction with virtual array geometry 2503 to generate the object function consistent with the chosen differential equation and to simulate the result of transmission measurements from the transducers of the virtual transmit array to the transducers of the virtual receive array, thus providing a set of synthetic data 2504. Synthetic data 2504 and pre-processed data 2505 from pre-processing system 203 may then be used to evaluate cost function 2506 which is a measure of the residual between the two sets of data based on a least squares criterion. The value of cost function 2506 may then be passed to convergence criterion 2507 based on a threshold level. If the cost function is below the threshold, the synthetic dataset may be a good approximation of pre-processed data 2505 and therefore the assumed velocity map, $c_M(u, v)$ 2501, closely reproduces the true guided wave velocity distribution across the structure.

However, assumed velocity map 2501 is inaccurate when cost function 2506 is above the threshold. In this case, synthetic data 2504 and pre-processed data 2505 are used by back-projection algorithm 2508 to generate an updated velocity map 2509. The updated velocity map 2509 may then be passed to forward solver 2502 to obtain a new set of synthetic data 2504 that may be used to estimate the new value of cost function 2506. If convergence criterion 2507 is not met a new updated velocity map 2509 may be generated until convergence criterion 2507 is satisfied. Virtual array geometry 2503 refers to the geometry of the virtual transmit and receive arrays consisting of N' virtual transmit transducers and M' virtual receive transducers. Similarly pre-processed data 2505 contains information about the N'×M' virtual signals.

In an embodiment, the first nonlinear inversion system 2500 may execute a method of Bent Ray Tomography (BRT) also known as Curved Ray Tomography. Forward solver 2502 may model wave propagation using the approximation of ray theory described by the two dimensional eikonal equation (17). At each iteration step, the differential equation is solved using the object function $O_e=1/c_M(u, v)^2$ where $c_M(u, v)$ is updated velocity map 2509.

In another embodiment, EQ. (17) is solved with the ray-tracing method. Equation (17) is used to calculate the arrival times from the transducers of the virtual transmit array to the transducers of the virtual receive array, leading to a matrix containing N'×M' arrival times. The matrix of arrival time differences is obtained by subtracting from this matrix the arrival times calculated for propagation in a medium with constant velocity $c_M^0$ and leads to a synthetic arrival time difference matrix, $\Delta\tau_{syn}$. This matrix is then compared to the arrival time difference matrix passed from pre-processing system 203, $\Delta\tau_{pp}$, defining a cost function as $$A = \sum_{i=1}^{N'} \sum_{j=1}^{M'} (\Delta\tau_{syn} - \Delta\tau_{pp})^2. \tag{53}$$

If A is larger than the threshold level, convergence criterion 2507 is not satisfied and matrices $\Delta\tau_{syn}$ and $\Delta\tau_{pp}$ are processed by the back-projection algorithm to produce an updated object function. In an embodiment, the updated object function may be computed through the nonlinear conjugate gradient method based on the Fletcher-Reeves formula and a back-tracking line search method as described by A. Hormati, I. Jovanovic, O. Roy, and M. Vetterli, "Robust ultrasound traveltime tomography using the bent ray model," in *SPIE* vol. 7629, 762901, 2010, and is incorporated by reference in its entirety. A uniform velocity distribution, $c_M(u, v)=c_M^0$ may be used as the initial estimate at the beginning of the iteration.

Returning to FIG. 9, FIG. 9 depicts a 2-D equivalent model 900 where updated velocity map 2509 may be obtained at the end of the iteration using the $A_0$ mode arrival time difference matrix shown in FIG. 9 which is obtained considering helical modes wrapping around the pipe up to two times $m_{max}=2$. 2-D equivalent model 900 includes two replicas, first replicated data 805a and second replicated data 805n, each generated by 16×3=48 virtual transducers. Each gray level in 2-D equivalent model 900 corresponds to a value of phase velocity in m/s. The regions 904 through 906 represent regions of reduced wall thickness in the actual pipe.

Back-projection 2508 included in first nonlinear inversion system 2500 illustrated in FIG. 25 does not use prior knowledge that includes that velocity map 2501 should be the same inside each replica and the 2-D equivalent model kernel. Velocity maps 2801 in the kernel and in original data 810 are degraded compared to the image in second replicated data 805n. The latter may be more accurate because a greater number of rays intersects this region from virtual transmit array to virtual receive array.

Figure 26:
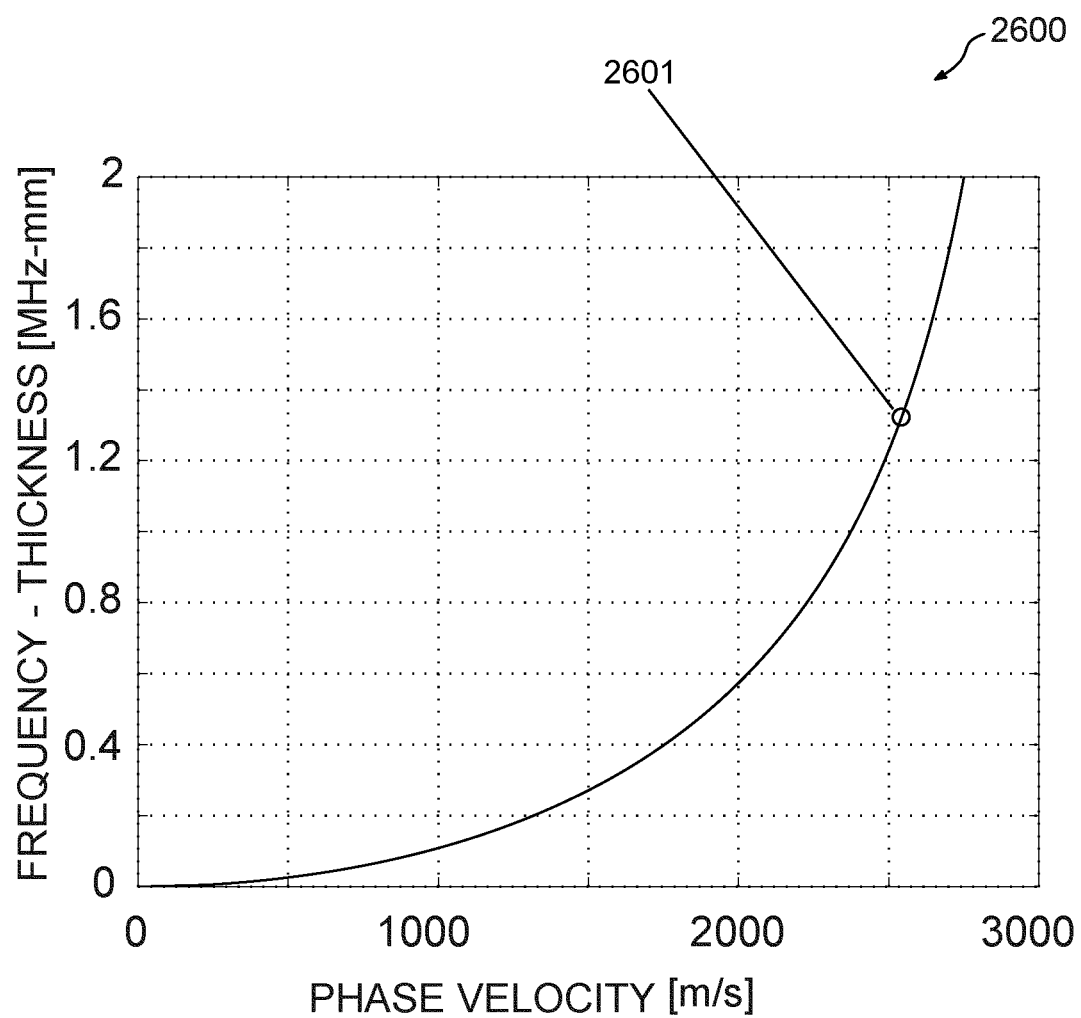
FIG. 26 depicts an inverse function configuration, according to an embodiment.

In another embodiment prior knowledge may be incorporated into first nonlinear inversion system 2500 as discussed in further detail below in the context of regularization techniques. In another embodiment, the central replica at the end of the iteration may be used to represent the phase velocity distribution on the pipe. FIG. 26 depicts an inverse function configuration 2600. Inverse function configuration 2600 depicts that the thickness distribution is obtained through EQ. (33) using tabulated values of the inverse function $C_M^{-1}$ for the $A_0$ mode shown in FIG. 26.

For example, the pipe wall thickness is 7.4 mm and the center frequency of the guided wave signal is 180 kHz, corresponding to a background phase velocity $c_M^0=2547$ m/s as indicated by point 2601. Returning to FIG. 11 depicts a wall thickness map 1100. Wall thickness map 1100 depicts a 2-D map 1101 and a 3-D rendering 1102 obtained using the mapping in EQ. 5. The gray levels 1103 provide the wall thickness loss as a percentage of the pipe nominal wall thickness for each spatial point included between transmit ultrasonic transducers 102 and receive ultrasonic transducers 106.

In another embodiment, first nonlinear inversion system 2500 implements the method of Full Wave Inversion (FWI). Forward solver 2502 in FIG. 25 may model wave propagation using the Helmholtz equation (15) or its one-way approximation which are solved using numerical techniques such as the Finite Difference Method (FDM) or the Finite Element Method (FEM). The forward solver simulates the multistatic matrix at a selected frequency, $K_{syn}$, which is then compared to the measured multistatic matrix at the same frequency from the pre-processing system $K_{pp}$ through the definition of the cost function $$B = \sum_{i=1}^{N'} \sum_{j=1}^{M'} \| K_{syn} - K_{pp} \|^2. \tag{54}$$

$K_{sys}$ and $K_{pp}$ are used to produce an updated object function through the back-projection algorithm when the cost function is above convergence criterion 2507. In an embodiment, the back-projection algorithm may use the non linear conjugate gradient method where the gradient direction is calculated by back-propagating the wave field. In another embodiment, the iteration may be performed for a set of frequencies within the bandwidth of the signal. The first set of iteration may be performed using the lowest frequency within the bandwidth of the signal and the velocity map from the BRT method as the initial velocity map 2501 in FIG. 25. The velocity map obtained at the end of the first set of iteration is then used as initial velocity map 2501 for the next set of iteration at the next higher frequency.

Figure 27:
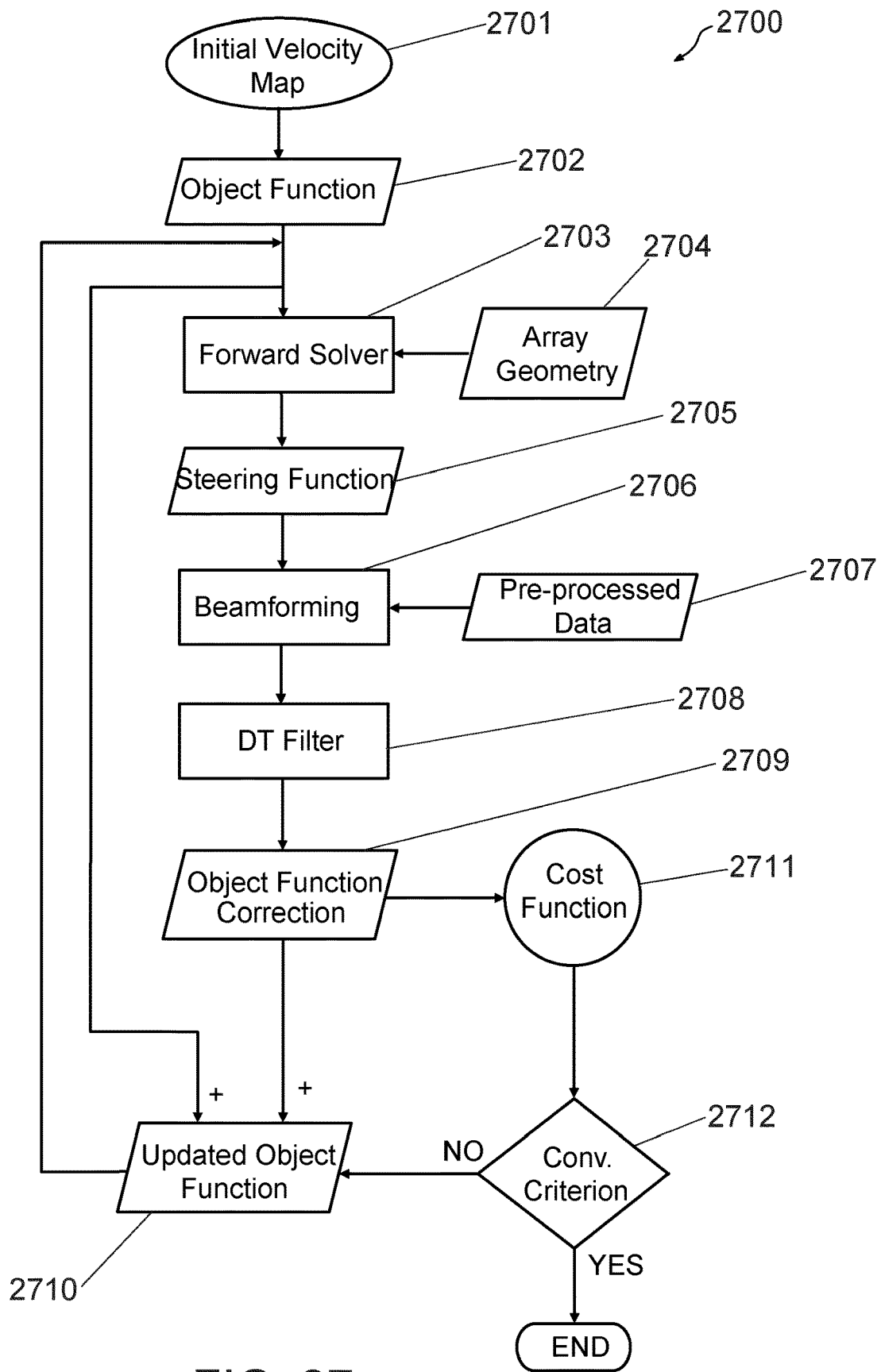
FIG. 27 depicts a second nonlinear inversion system, according to an embodiment.

FIG. 27 depicts a second nonlinear inversion system 2700 that implements an inversion scheme according to P. Huthwaite and F. Simonetti, "Damage detection through sound speed reconstruction," in *Review of Progress in Quantitative Nondestructive Evaluation*, 2012, vol. 1430, pp. 777-784, which is incorporated in its entirety. Initial velocity map 2701 may be used to generate the object function 2702.

In an embodiment, the initial velocity map may be obtained using the BRT method described above. Object function 2702 may then be passed to forward solver 2703 that uses array geometry 2703 to generate steering function 2705. Steering function 2705, S(T,P), describes the wave field at point P due to a point source at point T in the 2-D equivalent model. Forward solver 2703 may use the eikonal equation (17) or the Helmholtz equation (15). Steering function 2705 may then be used by beam forming algorithm 2706 that takes the multistatic matrix from pre-processed data 2707 to form an image that is then processed using the Diffraction Tomography filter 2708 according to the method proposed by F. Simonetti and L. Huang, "From beamforming to diffraction tomography," *J. Appl. Phys.*, vol. 103, pp. 103110, 2009 and P. Huthwaite and F. Simonetti, "High-resolution imaging without iteration: A fast and robust method for breast ultrasound tomography," *J. Acoust. Soc. Am.*, vol. 132, pp. 1249-1252, 2012, which is incorporated by reference in its entirety.

The filter returns a correction to object function 2702 which if sufficiently large is added to object function 2702 to generate an updated object function 2710 used to perform the next iteration cycle. The process continues until the correction to object function correction 2709 becomes negligible. This is assessed through a cost function 2711 which is a measure of object function correction 2709. In another embodiment, cost function 2711 may be obtained using the Frobenius norm of the matrix containing the values of object function correction 2709 at each node of the discretization grid. Convergence criterion 2712 stops the iteration when cost function 2711 drops below a threshold level.

The accuracy and stability of first nonlinear inversion system 2500 and second nonlinear inversion system 2700 described above may be substantially improved by the use of the modes that wrap around the structure multiple times since the number of virtual signals is $m_{max}+1$ times greater than the direct signals, therefore the larger $m_{max}$ the greater the accuracy of the thickness reconstruction. In practice, the value of $m_{max}$ is limited by the fact that the arrival times of wave packets corresponding to large values of m tend to be very close to each other, especially as the distance between the transmit and receive arrays increases. As a result, it becomes increasingly more difficult to resolve in time the wave packets corresponding to different paths. We have found that in practical applications it is possible to use $m_{max}=2$.

The accuracy and the stability of first nonlinear inversion system 2500 and second nonlinear inversion system 2700 may be implemented using regularization techniques that make effective use of prior knowledge. The prior knowledge may be used at each iterative step when the updated velocity maps and object functions are generated. Further discussion of regularization techniques are discussed in further detail below.

Phase Velocity Extrema

The phase velocity of a Lamb wave is a monotonic function of the frequency-thickness product as shown in FIG. 10. For a Lamb mode whose phase velocity is an increasing function of the frequency-thickness product, such as the $A_0$ mode, a wall thickness loss can only cause a reduction in phase velocity. In this case the regularization condition is $c_M(u, v) \leq c_M^o$. The regularization may be performed by setting any value of the phase velocity map larger than $c_M^o$ equal to $c_M^o$. Conversely, for a Lamb mode whose phase velocity is a decreasing function of the frequency-thickness product, such as the $S_0$ mode, a wall thickness loss can only lead to an increase in phase velocity. In this case, the regularization is performed by setting any value of the phase velocity map below $c_M^o$ equal to $c_M^o$.

Object Function Replicas

The regularization may be performed by imposing that in each updated velocity map and/or object function, the replicas in the 2-D equivalent model contain identical maps. In an embodiment, this may be achieved by using the central replica as the template. With reference to the example shown in FIG. 9, first replicated data 805a is used as the template to replace the velocity map for the 2-D equivalent model kernel and for first replicated data 805a at each iterative step. In another embodiment, the template may be obtained as a weighted average of the velocity maps within each replica giving a larger weight to the central replicas.

Embodiments can work with software, hardware, and/or operating system implementations other than those described herein. Any software, hardware, and operating system implementations suitable for performing the functions described herein can be used. Embodiments are applicable to both a client and to a server or a combination of both.

The Brief Summary and Abstract sections may set forth one or more but not all example embodiments and thus are not intended to limit the scope of the present disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptation and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A system for measuring wall thickness in a region of interest included in a structure, comprising:

a plurality of transducers configured to transmit a plurality of ultrasonic waves through the region of interest and convert the ultrasonic waves to propagated electrical signals that encode a three-dimensional representation of a wall thickness loss distribution of the region of interest;

a pre-processing system configured to virtually replicate data generated by virtual representations of the propagated electrical signals excited by a plurality of virtual transducers in addition to data associated with the propagated electrical signals excited by the plurality of transducers to generate a two-dimensional model for analysis of the wall thickness loss distribution; and an inversion system configured to generate a wall thickness loss distribution map from the two-dimensional model, wherein the wall thickness loss distribution map provides the wall thickness loss distribution for the region of interest; and wherein the pre-processing system is further configured to:
generate the plurality of virtual transducers that are virtual replicas of each transducer;
expand the three-dimensional representation of the wall thickness loss distribution to include data generated by the plurality of virtual transducers;
generate virtual representations of the propagated electrical signals based on data associated with the propagated electrical signals and the data generated by the virtual representations of the propagated electrical signals excited by the plurality of virtual transducers;
provide additional detail to the three-dimensional representation of the wall thickness loss distribution of the region of interest based on the virtual representations; and
convert the three-dimensional representation to a two-dimensional model for analysis of the wall thickness loss distribution.

2. The system of claim 1, further comprising:
a control system configured to send initial electronic signals to be converted into the ultrasonic waves and digitize the propagated electrical signals received from the transducer system for the analysis of the wall thickness loss distribution of the region of interest.

3. The system of claim 1, further comprising:
an operator terminal configured to provide an interface for an operator to analyze the wall thickness loss distribution map.

4. The system of claim 1, wherein the pre-processing system is further configured to:
convert three-dimensional data generated by the propagated electrical signals propagated by the plurality of transducers as the propagated electrical signals wrap around the structure to two-dimensional data that depicts the propagated electrical signals propagating directly between corresponding transducers without wrapping around the structure; and
generate the two-dimensional model for analysis of the wall-thickness distribution based on the two-dimensional data that depicts the propagated electrical signals propagating directly between corresponding transducers wrapping around the structure.

5. The system of claim 1, wherein the pre-processing system is further configured to:
determine each travel time of a preferred guided wave mode from each virtual transducer;
gate each wave pulse that corresponds to each travel time of the preferred guided wave mode from each virtual transducer; and
assign data included in each gated wave pulse to each corresponding virtual transducer.

6. The system of claim 5, wherein the pre-processing system is further configured to:
identify a pattern in the electrical signal that is not associated with the wall thickness loss distribution of the region of interest; and
remove the pattern from the analysis of the wall thickness loss distribution.

7. The system of claim 6, wherein the pre-processing system is further configured to:
identify that a predictable pattern in the electrical signal is associated with a uniform change in the electrical signal and is associated with a temperature change in the structure rather than the wall thickness loss distribution of the region of interest; and
remove the predictable pattern from the analysis of the wall thickness loss distribution as the predictable pattern is associated with the temperature change in the structure.

8. The system of claim 7, wherein the pre-processing system is further configured to:
monitor a phase velocity associated with each of the propagated electrical signals as the electrical signals propagate through the structure;
determine whether a decrease in the phase velocity associated with each of the propagated electrical signals as the electrical signals propagate through the structure continues to be uniform as the electrical signals propagate through the structure;
identify that the decrease in the phase velocity being uniform is caused by a temperature change in the structure; and
remove data associated with the phase velocity being uniform from the analysis of the wall thickness loss distribution as the phase velocity being uniform is associated with the temperature change in the structure.

9. The system of claim 8, wherein the pre-processing system is further configured to: monitor the phase velocity associated with each of the propagated electrical signals as the electrical signals propagate through the structure;
determine whether a decrease in the phase velocity associated with each of the propagated signals as the electrical signals propagate through the structure ceases and then transitions into an increase resulting in the propagation of the electrical signals through the structure being non-uniform;
identify that the decrease in the phase-velocity being non-uniform is caused by the wall thickness loss distribution; and
include the data associated with the phase velocity being non-uniform in the analysis of the wall thickness loss distribution as the phase velocity being non-uniform is associated with the wall thickness loss distribution of the structure.

10. The system of claim 1, wherein the pre-processing system is further configured to generate a parametric representation of the three-dimensional representation of the wall thickness loss distribution of the region of interest to map the three-dimensional representation to the two-dimensional model based on an orthogonality condition and elliptically anisotropic velocity model that preserves travel time for the ultrasonic waves.

11. The system of claim 9, wherein the inversion system is further configured to reconstruct a distribution of phase velocity across the two-dimensional model for the preferred guided wave mode at a selected frequency.

12. The system of claim 11, wherein the inversion system is further configured to regularize the two-dimensional model by imposing that each of the virtual transducers be identical.

13. The system of claim 1, wherein the inversion system is further configured to:
discretize the two-dimensional model to a grid of points;
generate a value of a field function at each node of the grid of points; and
format the two-dimensional model to the grid of points to generate the wall-thickness loss distribution map, wherein each pixel in the wall thickness loss distribution map corresponds to each node of the grid of points.

14. A method for measuring wall thickness in a region of interest included in a structure, comprising:
transmitting, by a plurality of transducers, a plurality of ultrasonic waves through the region of interest and convert the ultrasonic waves to propagated electrical signals that encode a three-dimensional representation of a wall thickness loss distribution of the region of interest;
virtually replicating data generated by virtual representations of the propagated electrical signals excited by a plurality of virtual transducers in addition to data associated with the propagated electrical signals excited by the plurality of transducers to generate a two-dimensional model for analysis of the wall thickness loss distribution; and
generating a wall thickness loss distribution map from the two-dimensional model, wherein the wall thickness loss distribution map provides the wall thickness loss distribution for the region of interest; and
wherein the step of virtually replicating data comprises:
generating the plurality of virtual transducers that are virtual replicas of each transducer; expanding the three-dimensional representation of the wall thickness loss distribution to include data generated by the plurality of virtual transduces;
generating virtual representations of the propagated electrical signals based on data associated with the propagated electrical signals and the data generated by the virtual representations of the propagated electrical signals excited by the plurality of virtual transducers;
providing additional detail to the three-dimensional representation of the wall thickness loss distribution of the region of interest based on the virtual representations; and
converting the three-dimensional representation to a two-dimensional model for analysis of the wall thickness loss distribution.

15. The method of claim 14, further comprising:
sending initial electronic signals to be converted into the ultrasonic waves and digitize the propagated electrical signals received from the transducer system for the analysis of the wall thickness loss distribution of the region of interest.

16. The method of claim 14, further comprising:
providing an interface for an operator to analyze the wall thickness loss distribution map.

17. The method of claim 14, further comprising:
converting three-dimensional data generated by the propagated electrical signals excited by the plurality of transducers as the propagated electrical signals wrap around the structure to two-dimensional data that depicts the propagated electrical signals propagating directly between corresponding transducers without wrapping around the structure; and
generating the two-dimensional model for analysis of the wall thickness loss distribution based on the two-dimensional data that depicts the propagated electrical signals propagating directly between corresponding transducers wrapping around the structure.

18. The method of claim 14, further comprising:
determining each travel time for a preferred guided wave mode from each virtual transducer;
gating each wave pulse that corresponds to each travel time of the preferred guided wave mode from each virtual transducer; and
assigning data included in each gated wave pulse to each corresponding virtual transducer.

19. The method of claim 18, further comprising:
identifying a pattern in the electrical signal that is not associated with the wall thickness
loss distribution of the region of interest; and
removing the pattern from the analysis of the wall thickness loss distribution.

20. The method of claim 19, further comprising:
identifying a predictable pattern in the electrical signal is associated with a uniform change in the electrical signal and is associated with a temperature change in the structure rather than the wall thickness loss distribution of the region of interest; and
removing the predictable pattern from the analysis of the wall thickness loss distribution as the predictable pattern is associated with the temperature change in the structure.

21. The method of claim 20, further comprising:
monitoring a phase velocity associated with each of the propagated electrical signals as the electrical signals propagate through the structure;
determining whether a decrease in the phase velocity associated with each of the propagated electrical signals as the electrical signals propagate through the structure continues to be uniform as the electrical signals propagate through the structure;
identifying the decrease in the phase velocity being uniform is caused by a temperature change in the structure; and
removing data associated with the phase velocity being uniform from the analysis of the wall thickness loss distribution as the phase velocity being uniform is associated with the temperature change in the structure.

22. The method of claim 21, further comprising:
monitoring the phase velocity associated with each of the propagated electrical signals as the electrical signals propagate through the structure;
determining whether a decrease in the phase velocity is associated with each of the propagated signals as the electrical signals propagate through the structure ceases and then transitions into an increase resulting in the propagation of the electrical signals through the structure being non-uniform;
identifying that the decrease in the phase velocity being non-uniform is caused by the wall thickness loss distribution; and
including the data associated with the phase velocity being non-uniform in the analysis of the wall thickness loss distribution as the phase velocity being non-uniform is associated with the wall thickness loss distribution of the structure.

23. The method of claim 14, further comprising:
generating a parametric representation of the three-dimensional representation of the wall thickness loss distribution of the region of interest to map the three-dimensional representation to the two-dimensional model based on an orthogonality condition and elliptically anisotropic velocity model that preserves travel time for the ultrasonic waves.

24. The method of claim 14, wherein generating of the wall thickness loss distribution map comprises:
reconstructing a distribution of phase velocity across the two-dimensional model for the preferred guided wave mode at a selected frequency.

25. The method of claim 24, wherein the generating of the wall thickness loss distribution map further comprises:
regularizing the two-dimensional model by imposing that each of the virtual transducers be identical.

26. The method of claim 25, wherein the generating of the wall thickness loss distribution map further comprises:
discretizing the two-dimensional model to a grid of points;
generating a value of a field function at each node of the grid of points; and
formatting the two-dimensional model to the grid of points to generate the wall-thickness loss distribution map, wherein each pixel in the wall-thickness loss distribution map corresponds to each node of the grid of points.

27. A system for measuring wall thickness in a region of interest included in a structure, comprising:
a plurality of transducers configured to transmit a plurality of ultrasonic waves through the region of interest and convert the ultrasonic waves to propagated electrical signals that encode a three-dimensional representation of a wall thickness loss distribution of the region of interest;
a pre-processing system configured to:
generate a plurality of virtual transducers that are virtual replicas of each transducer,
expand the three-dimensional representation of the wall thickness loss distribution to include data generated by the plurality of virtual transducers,
generate virtual representations of the propagated electrical signals based on information associated with the propagated electrical signals and the data generated by the plurality of virtual transducers,
provide additional detail to the three-dimensional representation of the wall thickness loss distribution of the region of interest based on the virtual representations, and
convert the three-dimensional representation to a two-dimensional model for analysis of the wall thickness distribution; and
an inversion system configured to generate a wall thickness loss distribution map from the two-dimensional model, wherein the wall thickness loss distribution map provides the wall thickness loss distribution for the region of interest.

28. The system of claim 27, wherein the pre-processing system is further configured to:
determine each travel time of a preferred guided wave mode from each virtual transducer;
gate each wave pulse that corresponds to each travel time of the preferred guided wave mode from each virtual transducer; and
assign the information included in each gated wave pulse to each corresponding virtual transducer.

29. The system of claim 27, wherein the pre-processing system is further configured to generate a parametric representation of the three-dimensional representation of the wall thickness loss distribution of the region of interest to map the three-dimensional representation to the two-dimensional mode based on an orthogonality condition and elliptically anisotropic velocity model that preserves travel time for the ultrasonic waves.

30. The system of claim 27, wherein the pre-processing system is further configured to:
identify a pattern in the electrical signal that is not associated with the wall thickness loss distribution of the region of interest; and
remove the pattern from the analysis of the wall thickness loss distribution.

31. A method for measuring wall thickness in a region of interest included in a structure, comprising:
transmitting, by a plurality of transducers, a plurality of ultrasonic waves through the region of interest and convert the ultrasonic waves to propagated electrical signals that encode a three-dimensional representation of a wall thickness loss distribution of the region of interest;
generating a plurality of virtual transducers that are virtual replicas of each transducer;
expanding the three-dimensional representation of the wall thickness loss distribution to include data generated by the plurality of transducers;
generating virtual representations of the propagated electrical signals based on information associated with the propagated electrical signals and the data generated by the plurality of virtual transducers;
providing additional detail to the three-dimensional representation of the wall thickness loss distribution of the region of interest based on the virtual representations;
converting the three-dimensional representation to a two-dimensional model for analysis of the wall thickness distribution; and
generating a wall thickness loss distribution map from the two-dimensional model, wherein the wall thickness loss distribution map provides the wall thickness loss distribution of the region of interest.

32. The method of claim 31, further comprising:
determining each travel time of the propagated electrical signal from each virtual transducer;
gating each wave pulse that corresponds to each travel time of a preferred guided wave mode from each virtual transducer; and
assigning the information included in each gated wave pulse to each corresponding virtual transducer.

33. The method of claim 31, further comprising:
generating a parametric representation of the three-dimensional representation of the wall thickness loss distribution of the region of interest to map the three-dimensional representation to the two-dimensional mode based on an orthogonality condition and elliptically anisotropic velocity model that preserves travel time for the ultrasonic waves.

34. The method of claim 31, further comprising:
identifying a pattern in the electrical signal that is not associated with the wall thickness loss distribution of the region of interest; and
removing the pattern from the analysis of the wall thickness loss distribution.

* * * * *

UNITED STATES PATENT AND TRADEMARK OFFICE
CERTIFICATE OF CORRECTION

PATENT NO. : 10,704,901 B2
APPLICATION NO. : 15/632725
DATED : July 7, 2020
INVENTOR(S) : Geir Instanes et al.

It is certified that error appears in the above-identified patent and that said Letters Patent is hereby corrected as shown below:

In the Specification

Column 1, Lines 45-46, "such a pipe." should be --such as a pipe.--.

Column 4, Line 8, "affect" should be --effect--.

Column 4, Line 52, "pipe 101 may be exposed." should be --pipe 101 may be exposed to.--.

Column 6, Line 39, "transducers" should be --transducer--.

Column 7, Line 49, "induces" should be --induce--.

Column 9, Lines 22-23, "magnetic flux by generated by" should be --magnetic flux generated by--.

Column 9, Line 29, "acts a magnetic flux guide" should be --acts as magnetic flux guide--.

Column 13, Line 30, "increases" should be --increase--.

Column 15, Line 8, "decreases" should be --decrease--.

Column 27, Line 3, "configuration 2095 may be centered" should be --configuration 2095 that may be centered--.

Column 30, Lines 4-5, "minimization the cost function" should be --minimization of the cost function--.

Column 31, Line 6, "is shown" should be --are shown--.

Column 31, Line 54, "is the obtained by" should be --is obtained by--.

Signed and Sealed this
Thirteenth Day of October, 2020

Andrei Iancu
*Director of the United States Patent and Trademark Office*

Column 34, Lines 59-60, "non linear" should be --nonlinear--.

In the Claims

Column 39, Line 39 (Claim 14), "plurality of virtual transduces;" should be --plurality of virtual transducers;--.